United States Patent
Takata et al.

(10) Patent No.: US 10,533,136 B2
(45) Date of Patent: Jan. 14, 2020

(54) LIQUID CRYSTALLINE COMPOUND HAVING FLUOROBIPHENYL GROUP AND NEGATIVE DIELECTRIC ANISOTROPY, LIQUID CRYSTAL COMPOSITION, AND LIQUID CRYSTAL DISPLAY ELEMENT

(71) Applicants: JNC CORPORATION, Tokyo (JP); JNC PETROCHEMICAL CORPORATION, Tokyo (JP)

(72) Inventors: Akihiro Takata, Chiba (JP); Atsushi Sakamoto, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/125,783

(22) Filed: Sep. 10, 2018

(65) Prior Publication Data

US 2019/0078020 A1    Mar. 14, 2019

(30) Foreign Application Priority Data

Sep. 11, 2017 (JP) ................. 2017-173922

(51) Int. Cl.
| | |
|---|---|
| *G02F 1/1333* | (2006.01) |
| *C09K 19/34* | (2006.01) |
| *C09K 19/30* | (2006.01) |
| *G02F 1/1334* | (2006.01) |
| *G02F 1/1337* | (2006.01) |

(52) U.S. Cl.
CPC ...... *C09K 19/3402* (2013.01); *C09K 19/3001* (2013.01); *C09K 19/3003* (2013.01); *C09K 19/3066* (2013.01); *C09K 19/3068* (2013.01); *C09K 2019/301* (2013.01); *C09K 2019/3004* (2013.01); *C09K 2019/3009* (2013.01); *C09K 2019/3016* (2013.01); *C09K 2019/3077* (2013.01); *C09K 2019/3083* (2013.01); *C09K 2019/3422* (2013.01); *G02F 1/1334* (2013.01); *G02F 1/133788* (2013.01)

(58) Field of Classification Search
CPC ............ C09K 19/3402; C09K 19/3001; C09K 19/3003; C09K 19/3066; C09K 19/3068; C09K 2019/3004; C09K 2019/3009; C09K 2019/301; C09K 2019/3016; C09K 2019/3077; C09K 2019/3083; C09K 2019/3422; G02F 1/1333; G02F 1/1334; G02F 1/133788
USPC ....................................... 252/299.61
See application file for complete search history.

(56) References Cited

U.S. PATENT DOCUMENTS

| | | | |
|---|---|---|---|
| 7,306,831 B1 | 12/2007 | Yamamoto | |
| 2019/0078020 A1* | 3/2019 | Takata | ............... C09K 19/3402 |

FOREIGN PATENT DOCUMENTS

| | | |
|---|---|---|
| JP | 2005298733 | 10/2005 |
| WO | 2016152405 | 9/2016 |

* cited by examiner

*Primary Examiner* — Geraldina Visconti
(74) *Attorney, Agent, or Firm* — JCIPRNET

(57) ABSTRACT

The disclosure provides a liquid crystalline compound that has at least one of physical properties such as high stability with respect to heat and light, a high clearing point (or a high upper limit temperature), a low lower limit temperature of a liquid crystal phase, a low viscosity, suitable optical anisotropy, large negative dielectric anisotropy, a suitable elastic constant, favorable compatibility with other liquid crystalline compounds at room temperature and low temperatures, a liquid crystal composition including the compound, and a liquid crystal display element including the composition. The compound is represented by Formula (1).

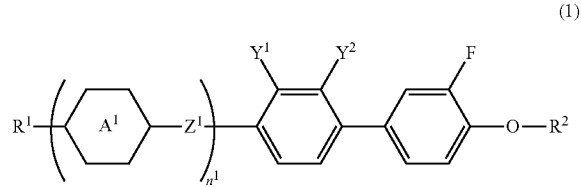

(1)

Here, $R^1$ is an alkyl group having 2 to 10 carbon atoms in which one —$CH_2CH_2$— is substituted with —CH═CH—; $R^2$ is an alkyl group having 1 to 8 carbon atoms; ring $A^1$ is 1,4-cyclohexylene; $Y^1$ and $Y^2$ are hydrogen or fluorine; $Z^1$ is a single bond; and $n^1$ is 1 or 2.

20 Claims, No Drawings

LIQUID CRYSTALLINE COMPOUND HAVING FLUOROBIPHENYL GROUP AND NEGATIVE DIELECTRIC ANISOTROPY, LIQUID CRYSTAL COMPOSITION, AND LIQUID CRYSTAL DISPLAY ELEMENT

CROSS-REFERENCE TO RELATED APPLICATIONS

This application claims the priority benefit of Japanese application serial no. 2017-173922, filed on Sep. 11, 2017. The entirety of the above-mentioned patent application is hereby incorporated by reference herein and made a part of this specification.

BACKGROUND

Technical Field

The disclosure relates to a liquid crystalline compound, a liquid crystal composition, and a liquid crystal display element, and more specifically, to a liquid crystalline compound having a fluorobiphenyl group and negative dielectric anisotropy, a liquid crystal composition including the same, and a liquid crystal display element including the composition.

Description of Related Art

Liquid crystal display elements are widely used for displays of personal computers, televisions, and the like. In these elements, physical properties such as optical anisotropy and dielectric anisotropy of a liquid crystalline compound are used. Operation modes of liquid crystal display elements include phase change (PC), twisted nematic (TN), super twisted nematic (STN), bistable twisted nematic (BTN), electrically controlled birefringence (ECB), optically compensated bend (OCB), in-plane switching (IPS), vertical alignment (VA), fringe field switching (FFS), and polymer sustained alignment (PSA) modes. In a PSA mode element, a liquid crystal composition including a polymer is used. In this composition, it is possible to control alignment of liquid crystal molecules with the polymer.

In such a liquid crystal display element, a liquid crystal composition having suitable physical properties is used. In order to further improve characteristics of the element, a liquid crystalline compound contained in the composition preferably has the following physical properties (1) to (8), (1) high stability with respect to heat and light, (2) a high clearing point, (3) a low lower limit temperature of a liquid crystal phase, (4) a low viscosity (η), (5) suitable optical anisotropy (Δn), (6) large dielectric anisotropy (Δε), (7) a suitable elastic constant (K), and (8) favorable compatibility with other liquid crystalline compounds.

Effects of physical properties of a liquid crystalline compound on characteristics of an element are as follows. As in (1), a compound having high stability with respect to heat and light increases a voltage holding ratio of the element. Therefore, the lifespan of the element increases. As in (2), a compound having a high clearing point widens a temperature range in which the element can be used. As in (3), a compound having a low lower limit temperature of a liquid crystal phase such as a nematic phase or a smectic phase, and particularly, a low lower limit temperature of a nematic phase, also widens a temperature range in which the element can be used. As in (4), a compound with a low viscosity shortens a response time of the element.

According to a design of the element, a compound having suitable optical anisotropy, that is, large optical anisotropy or small optical anisotropy as in (5), is necessary. When a response time is shortened by reducing a cell gap of the element, a compound having large optical anisotropy is suitable. A compound having large dielectric anisotropy as in (6) lowers a threshold voltage of the element. Accordingly, power consumption of the element is reduced. On the other hand, a compound having small dielectric anisotropy lowers the viscosity of the composition and thus a response time of the element is shortened. The compound increases an upper limit temperature of the nematic phase and thus widens a temperature range in which the element can be used.

Regarding (7), a compound having a large elastic constant shortens a response time of the element. A compound having a small elastic constant lowers a threshold voltage of the element. Therefore, a suitable elastic constant is necessary according to characteristics to be improved. A compound having favorable compatibility with other liquid crystalline compounds as in (8) is preferable. This is because liquid crystalline compounds having different physical properties are mixed to adjust physical properties of the composition. Since the element is used at a temperature below the freezing points thereof in some cases, compounds having favorable compatibility at low temperatures is preferable.

Various liquid crystalline compounds having large optical anisotropy have been synthesized so far. Liquid crystalline compounds with a low viscosity have also been synthesized. This is because it is expected that novel compounds will have favorable physical properties which are not obtained in compounds of the related art. This is because novel compounds may provide a suitable balance between at least two physical properties in the composition. Under such circumstances, a compound having favorable physical properties and suitable balance regarding the above physical properties (1) to (8) is desired.

Patent Document 1 discloses Compound (S-1) in page 29.

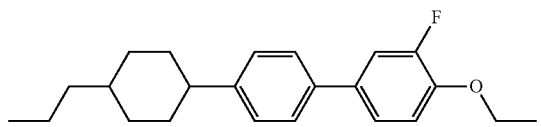

(S-1)

Patent Document 2 discloses Compound (S-2) in page 35.

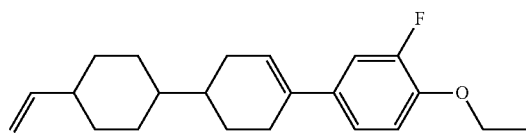

(S-2)

PATENT DOCUMENTS

[Patent Document 1] Japanese Unexamined Patent Application Publication No. 2005-298733

[Patent Document 2] PCT International Publication No. WO 2016/152405

SUMMARY

The disclosure provides a liquid crystalline compound that has at least one of physical properties such as high stability with respect to heat and light, a high clearing point (or a high upper limit temperature of a nematic phase), a low lower limit temperature of a liquid crystal phase, a low viscosity, suitable optical anisotropy, large negative dielectric anisotropy, a suitable elastic constant, and favorable compatibility with other liquid crystalline compounds at room temperature and low temperatures. This is to provide a compound having large optical anisotropy, a low viscosity, and favorable compatibility with other liquid crystalline compounds at low temperatures. The disclosure further provides a liquid crystal composition that includes the compound and has at least one of physical properties such as high stability with respect to heat and light, a high upper limit temperature of a nematic phase, a low lower limit temperature of a nematic phase, a low viscosity, suitable optical anisotropy, large negative dielectric anisotropy, a large specific resistance, and a suitable elastic constant. This is to provide a liquid crystal composition having a suitable balance between at least two physical properties. The disclosure further provides a liquid crystal display element that includes this composition and has a wide temperature range in which an element can be used, a short response time, a high voltage holding ratio, a low threshold voltage, a large contrast ratio, a low flicker rate, and a prolonged lifespan.

A compound represented by Formula (1).

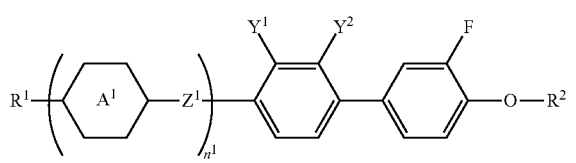

in Formula (1), $R^1$ is an alkyl group having 2 to 10 carbon atoms in which one —$CH_2CH_2$— is substituted with —CH=CH—, at least one —$CH_2$— is optionally substituted with —O—, and one hydrogen atom is optionally substituted with fluorine or chlorine;

$R^2$ is an alkyl group having 1 to 8 carbon atoms or an alkenyl group having 2 to 8 carbon atoms;

ring $A^1$ is 1,4-cyclohexylene, tetrahydropyran-2,5-diyl, 1,3-dioxane-2,5-diyl, 1,4-phenylene, or 2-fluoro-1,4-phenylene;

$Y^1$ and $Y^2$ are both hydrogen, or alternatively, one of $Y^1$ and $Y^2$ is hydrogen and the other is fluorine;

$Z^1$ is a single bond, —$CH_2CH_2$—, —$CH_2O$—, —$OCH_2$—, or —CH=CH—; and $n^1$ is 1 or 2

DESCRIPTION OF THE EMBODIMENTS

In the present disclosure, a first effect is to provide a liquid crystalline compound that has at least one of physical properties such as high stability with respect to heat and light, a high clearing point (or a high upper limit temperature of a nematic phase), a low lower limit temperature of a liquid crystal phase, a low viscosity, suitable optical anisotropy, large negative dielectric anisotropy, a suitable elastic constant, and favorable compatibility with other liquid crystalline compounds. A compound having larger optical anisotropy, a lower viscosity, and more favorable compatibility with other compound at low temperatures than similar compounds is provided (Comparative Example 1 and Comparative Example 2). A second effect is to provide a liquid crystal composition that includes the compound and has at least one of physical properties such as high stability with respect to heat and light, a high upper limit temperature of a nematic phase, a low lower limit temperature of a nematic phase, a low viscosity, suitable optical anisotropy, large negative dielectric anisotropy, a large specific resistance, and a suitable elastic constant. This effect is to provide a liquid crystal composition having a suitable balance between at least two physical properties. A third effect is to provide a liquid crystal display element that includes the composition and has a wide temperature range in which an element can be used, a short response time, a high voltage holding ratio, a low threshold voltage, a large contrast ratio, a low flicker rate, and a prolonged lifespan.

The terms used herein are used as follows. The terms "liquid crystalline compound," "liquid crystal composition," and "liquid crystal display element" may be abbreviated as a "compound," a "composition," and an "element." A "liquid crystalline compound" generally refers to a compound having a liquid crystal phase such as a nematic phase or a smectic phase and a compound which does not have a liquid crystal phase and is added in order to adjust physical properties of a composition such as an upper limit temperature, a lower limit temperature, a viscosity, and dielectric anisotropy. This compound has a six-membered ring such as 1,4-cyclohexylene or 1,4-phenylene and a rod-like molecular structure. A "liquid crystal display element" generally refers to a liquid crystal display panel and a liquid crystal display module. A "polymerizable compound" is a compound that is added to form a polymer in the composition.

The liquid crystal composition is prepared by mixing a plurality of liquid crystalline compounds. An additive is added to this composition in order to further adjust physical properties. Additives such as a polymerizable compound, a polymerization initiator, a polymerization inhibitor, an optically active compound, an antioxidant, a UV absorber, a light stabilizer, a heat stabilizer, a dye, and an antifoaming agent are added as necessary. A liquid crystalline compound and additives are mixed in such a procedure. Even when additives are added, a proportion (content) of a liquid crystalline compound is expressed as a weight percentage (weight %) on the basis of a weight of a liquid crystal composition containing no additives. A proportion (amount added) of additives is expressed as a weight percentage (weight %) on the basis of a weight of a liquid crystal composition containing no additives. Parts per million (ppm) by weight may be used. Proportions of a polymerization initiator and a polymerization inhibitor are otherwise expressed on the basis of a weight of a polymerizable compound.

The "clearing point" is a transition temperature of a liquid crystal phase-isotropic phase in a liquid crystalline compound. A "lower limit temperature of a liquid crystal phase" is a transition temperature of a solid-liquid crystal phase (such as a smectic phase and a nematic phase) in a liquid crystalline compound. An "upper limit temperature of a nematic phase" is a transition temperature of a nematic phase-isotropic phase in a mixture of a liquid crystalline compound and a mother liquid crystal, or a liquid crystal composition, and may be abbreviated as an "upper limit temperature." A "lower limit temperature of a nematic phase" may be abbreviated as a "lower limit temperature."

The expression "increase dielectric anisotropy" means that a value increases positively when a composition has positive dielectric anisotropy, and means that a value increases negatively when a composition has negative dielectric anisotropy. The expression "a voltage holding ratio is high" means that a voltage holding ratio is high not only at room temperature but also at a temperature close to the upper limit temperature when an element is in an initial stage of use, and thus, after the element is used for a long time, it has a high voltage holding ratio not only at room temperature but also at a temperature close to the upper limit temperature. Characteristics of compositions and elements may be examined before and after an aging test (including an accelerated deterioration test).

The compound represented by Formula (1) may be abbreviated as Compound (1). At least one compound selected from the group consisting of compounds represented by Formula (1) may be abbreviated as Compound (1). "Compound (1)" refers to one compound represented by Formula (1), a mixture of two compounds, or a mixture of three or more compounds. These rules apply to compounds represented by other formulae. In Formulae (1) to (15), symbols such as $A^1$, $B^1$, and $C^1$ surrounded by a hexagon correspond to rings such as ring $A^1$, ring $B^1$, and ring $C^1$, respectively. A hexagon refers to a six-membered ring such as cyclohexane or benzene. A hexagon may refer to a condensed ring such as naphthalene or a crosslinked ring such as adamantane.

In a chemical formula of a component compound, the symbol of a terminal group $R^{11}$ is used for a plurality of compounds. In these compounds, two groups represented by any two $R^{11}$ groups may be the same as or different from each other. For example, there may be a case in which $R^{11}$ of Compound (2) is an ethyl group and $R^{11}$ of Compound (3) is an ethyl group. There may also be a case in which $R^{11}$ of Compound (2) is an ethyl group and $R^{11}$ of Compound (3) is a propyl group. These rules also apply to symbols such as $R^{12}$, $R^{13}$, and $Z^{11}$. When i is 2 in Compound (15), there are two rings $E^1$. In this compound, two groups represented by two rings $E^1$ may be the same as or different from each other. When i is greater than 2, this rule also applies to any two rings $E^1$. These rules also apply to other symbols.

The expression "at least one 'A'" means that the number of 'A's is arbitrary. The expression "at least one 'A' is optionally substituted with 'B' means that, when the number of 'A's is one, the position of the 'A' is arbitrary and when the number of 'A's is two or more, the positions thereof can be selected without limitation. These rules also apply to the expression "at least one 'A' is substituted with 'B'". The expression "at least one 'A' is optionally substituted with 'B,' 'C,' or 'D' means that any 'A' is substituted with 'B,' any 'A' is substituted with 'C,' any 'A' is substituted with 'D,' or a plurality of 'A's are substituted with at least two of 'B,' 'C,' and/or 'D.' For example, "an alkyl group in which at least one —CH$_2$— is optionally substituted with —O— or —CH═CH—" includes an alkyl group, an alkoxy group, an alkoxyalkyl group, an alkenyl group, an alkoxyalkenyl group, and an alkenyloxyalkyl group. Here, it is not preferable for two consecutive —CH$_2$—'s to be substituted with —O— and —O—O— formed. In an alkyl group and the like, it is not preferable for —CH$_2$— in a methyl moiety (—CH$_2$—H) to be substituted with —O— and —O—H formed.

The expression "$R^{11}$ and $R^{12}$ are independently an alkyl group having 1 to 10 carbon atoms or an alkenyl group having 2 to 10 carbon atoms, and in these alkyl and alkenyl groups, at least one —CH$_2$— is optionally substituted with —O—, and in these groups, at least one hydrogen atom is optionally substituted with fluorine" may be used. In this expression, "in these groups" may be interpreted literally. In this expression, "these groups" refer to an alkyl group, an alkenyl group, an alkoxy group, and an alkenyloxy group. That is, "these groups" indicate all of groups shown before the expression "in these groups." This common interpretation also applies to the expressions "in these monovalent groups" and "in these divalent groups." For example, "these monovalent groups" indicate all of groups shown before the expression "in these monovalent groups."

A halogen includes fluorine, chlorine, bromine, and iodine. A preferable halogen is fluorine or chlorine. A more preferable halogen is fluorine. An alkyl group of a liquid crystalline compound is linear or branched, and does not contain a cyclic alkyl group. Generally, a linear alkyl group is more preferable than a branched alkyl group. This also applies to a terminal group such as an alkoxy group and an alkenyl group. Regarding the configuration, the trans configuration of 1,4-cyclohexylene is more preferable than the cis configuration in order to increase the upper limit temperature. 2-Fluoro-1,4-phenylene refers to the following two divalent groups. In the chemical formulae, fluorine may be leftward (L) or rightward (R). These rules also apply to an asymmetric divalent group that is formed by removing two hydrogen atoms from a ring such as tetrahydropyran-2,5-diyl.

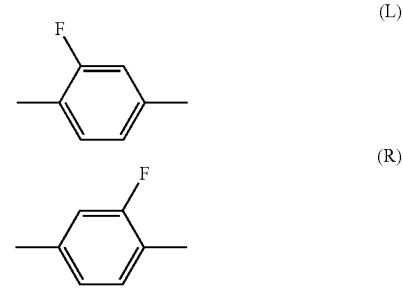

The disclosure includes the following items.
Item 1. Compound represented by Formula (1),

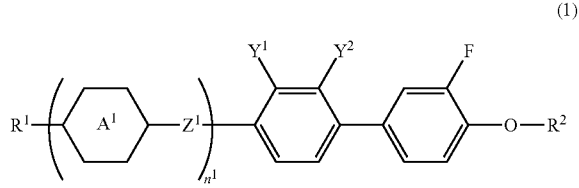

in Formula (1), $R^1$ is an alkyl group having 2 to 10 carbon atoms in which one —CH$_2$CH$_2$— is substituted with —CH═CH—, at least one —CH$_2$— is optionally substituted with —O—, and one hydrogen atom is optionally substituted with fluorine or chlorine;

$R^2$ is an alkyl group having 1 to 8 carbon atoms or an alkenyl group having 2 to 8 carbon atoms;

ring $A^1$ is 1,4-cyclohexylene, tetrahydropyran-2,5-diyl, 1,3-dioxane-2,5-diyl, 1,4-phenylene, or 2-fluoro-1,4-phenylene;

$Y^1$ and $Y^2$ are both hydrogen, or alternatively, one of $Y^1$ and $Y^2$ is hydrogen and the other is fluorine;

$Z^1$ is a single bond, —$CH_2CH_2$—, —$CH_2O$—, —$OCH_2$—, or —CH=CH—; and $n^1$ is 1 or 2.

Item 2. The compound according to Item 1 represented by any one of Formulae (1-1) to (1-3),

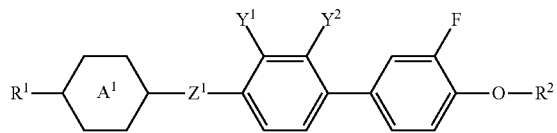
(1-1)

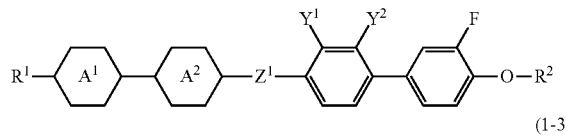
(1-2)

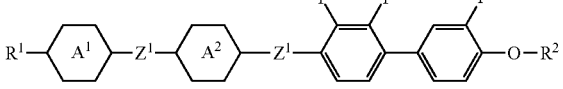
(1-3)

in Formulae (1-1) to (1-3), $R^1$ is an alkyl group having 2 to 10 carbon atoms in which one —$CH_2CH_2$— is substituted with —CH=CH—, at least one —$CH_2$— is optionally substituted with —O—, and one hydrogen atom is optionally substituted with fluorine or chlorine;

$R^2$ is an alkyl group having 1 to 8 carbon atoms or an alkenyl group having 2 to 8 carbon atoms; ring $A^1$ and ring $A^2$ are independently 1,4-cyclohexylene, tetrahydropyran-2,5-diyl, 1,4-phenylene, or 2-fluoro-1,4-phenylene;

$Y^1$ and $Y^2$ are both hydrogen, or alternatively, one of $Y^1$ and $Y^2$ is hydrogen and the other is fluorine; and $Z^1$ is a single bond, —$CH_2CH_2$—, —$CH_2O$—, —$OCH_2$—, or —CH=CH—.

Item 3. The compound according to Item 2 in which, in Formulae (1-1) to (1-3), $R^1$ is an alkyl group having 2 to 8 carbon atoms in which one —$CH_2CH_2$— is substituted with —CH=CH—.

Item 4. The compound according to Item 1 represented by Formula (1-4) or (1-5),

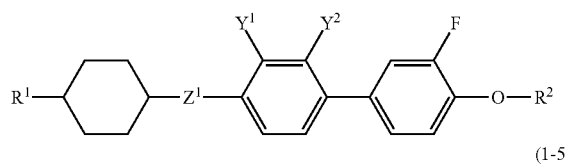
(1-4)

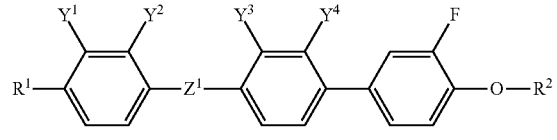
(1-5)

in Formulae (1-4) and (1-5), $R^1$ is an alkyl group having 2 to 8 carbon atoms in which one —$CH_2CH_2$— is substituted with —CH=CH—;

$R^2$ is an alkyl group having 1 to 6 carbon atoms or an alkenyl group having 2 to 6 carbon atoms;

$Y^1$, $Y^2$, $Y^3$, and $Y^4$ are all hydrogen, or alternatively, one of $Y^1$ and $Y^2$ is hydrogen and the other is fluorine, or one of $Y^3$ and $Y^4$ is hydrogen and the other is fluorine; and $Z^1$ is a single bond, —$CH_2CH_2$—, —$CH_2O$—, or —CH=CH—.

Item 5. The compound according to Item 4 in which, in Formulae (1-4) and (1-5), $Z^1$ is a single bond.

Item 6. The compound according to Item 1 represented by Formula (1-6),

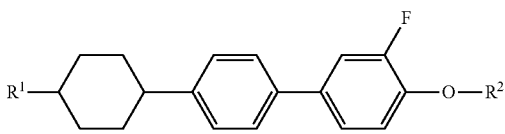
(1-6)

in Formula (1-6), $R^1$ is an alkyl group having 2 to 8 carbon atoms in which one —$CH_2CH_2$— is substituted with —CH=CH—; and $R^2$ is an alkyl group having 1 to 6 carbon atoms.

Item 7. A liquid crystal composition including at least one compound according to any one of Items 1 to 6.

Item 8. The liquid crystal composition according to Item 7 further including at least one compound selected from the group consisting of the compounds represented by Formulae (2) to (4),

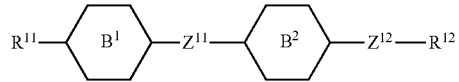
(2)

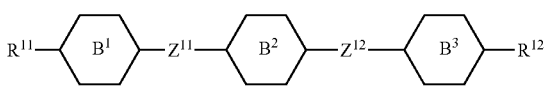
(3)

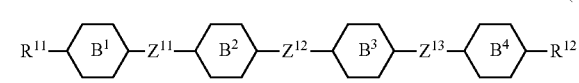
(4)

in Formulae (2) to (4), $R^{11}$ and $R^{12}$ are independently an alkyl group having 1 to 10 carbon atoms or an alkenyl group having 2 to 10 carbon atoms, and at least one —$CH_2$— is optionally substituted with —O— in the alkyl group and the alkenyl group and in these groups, at least one hydrogen atom is optionally substituted with fluorine;

ring $B^1$, ring $B^2$, ring $B^3$, and ring $B^4$ are independently 1,4-cyclohexylene, 1,4-phenylene, 2-fluoro-1,4-phenylene, 2,5-difluoro-1,4-phenylene, or pyrimidine-2,5-diyl; and $Z^{11}$, $Z^{12}$, and $Z^{13}$ are independently a single bond, —COO—, —$CH_2CH_2$—, —CH=CH—, or —C≡C—, here, in Formula (3), when $R^{11}$ has a double bond and the ring $B^3$ is 2-fluoro-1,4-phenylene, the ring $B^2$ is 1,4-cyclohexylene, 2,5-difluoro-1,4-phenylene, or pyrimidine-2,5-diyl;

in Formula (4), when $R^{11}$ has a double bond, and the ring $B^4$ is 2-fluoro-1,4-phenylene, the ring $B^3$ is 1,4-cyclohexylene, 2,5-difluoro-1,4-phenylene, or pyrimidine-2,5-diyl; and in Formulae (3) and (4), when $R^{12}$ has a double bond, and when the ring $B^1$ is 2-fluoro-1,4-phenylene, the ring $B^2$ is 1,4-cyclohexylene, 2,5-difluoro-1,4-phenylene, or pyrimidine-2,5-diyl.

Item 9. The liquid crystal composition according to item 7 or 8 further including at least one compound selected from the group consisting of the compounds represented by Formulae (12) to (14),

(12)

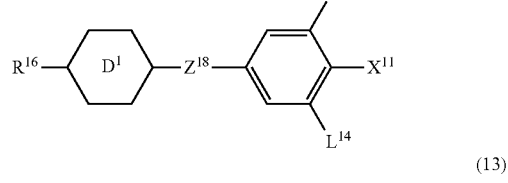
(13)

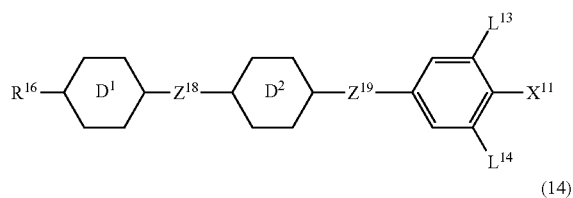
(14)

in Formulae (12) to (14), $R^{16}$ is an alkyl group having 1 to 10 carbon atoms or an alkenyl group having 2 to 10 carbon atoms, and at least one —$CH_2$— is optionally substituted with —O— in the alkyl group and the alkenyl group and in these groups, at least one hydrogen atom is optionally substituted with fluorine;

$X^{11}$ is fluorine, chlorine, —$CF_3$, —$CHF_2$, —$CH_2F$, —$OCF_3$, —$OCHF_2$, —$OCF_2CHF_2$, or —$OCF_2CHFCF_3$;

ring $D^1$, ring $D^2$, and ring $D^3$ are independently 1,4-cyclohexylene, or 1,4-phenylene, tetrahydropyran-2,5-diyl, 1,3-dioxane-2,5-diyl, or pyrimidine-2,5-diyl in which at least one hydrogen atom is optionally substituted with fluorine;

$Z^{18}$, $Z^{19}$, and $Z^{20}$ are independently a single bond, —COO—, —$CH_2O$—, —$CF_2O$—, —$OCF_2$—, —$CH_2CH_2$—, —CH—CH—, or —$(CH_2)_4$—; and $L^{13}$ and $L^{14}$ are independently hydrogen or fluorine.

Item 10. The liquid crystal composition according to any one of Items 7 to 9 further including at least one compound selected from the group consisting of the compounds represented by Formula (15),

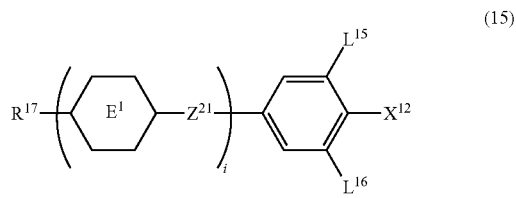
(15)

wherein, in Formula (15), $R^{17}$ is an alkyl group having 1 to 10 carbon atoms or an alkenyl group having 2 to 10 carbon atoms, and at least one —$CH_2$— is optionally substituted with —O— in the alkyl group and the alkenyl group, and in these groups, at least one hydrogen atom is optionally substituted with fluorine;

$X^{12}$ is or —C≡N or —C≡C—C≡N;

ring $E^1$ is 1,4-cyclohexylene or 1,4-phenylene, tetrahydropyran-2,5-diyl, 1,3-dioxane-2,5-diyl, or pyrimidine-2,5-diyl in which at least one hydrogen atom is optionally substituted with fluorine;

$Z^{21}$ is a single bond, —COO—, —$CH_2O$—, —$CF_2O$—, —$OCF_2$—, —$CH_2CH_2$—, or —C≡C—;

$L^{15}$ and $L^{16}$ are independently hydrogen or fluorine; and i is 1, 2, 3, or 4.

Item 11. A liquid crystal display element including the liquid crystal composition according to any one of Items 7 to 10.

The disclosure also includes the following items. (a) The above composition that further includes at least one optically active compound and/or a polymerizable compound. (b) The above composition that further includes at least one antioxidant and/or a UV absorber.

The disclosure also includes the following item. (c) The above composition that further contains one, two, or at least three additives selected from the group consisting of a polymerizable compound, a polymerization initiator, a polymerization inhibitor, an optically active compound, an antioxidant, a UV absorber, a light stabilizer, a heat stabilizer, a dye, and an antifoaming agent. (d) The above composition in which the upper limit temperature of a nematic phase is 70° C. or higher, an optical anisotropy (measured at 25° C.) at a wavelength of 589 nm is 0.08 or more, and thus a dielectric anisotropy (measured at 25° C.) at a frequency of 1 kHz is −2 or less.

The disclosure also includes the following item. (e) An element that includes the above composition and has a mode of PC, TN, STN, ECB, OCB, IPS, VA, FFS, FPA, or PSA. (f) An AM element that includes the above composition. (g) A transmission type element that includes the above composition. (h) Use of the above composition as a composition having a nematic phase. (i) Use as an optically active composition by adding an optically active compound to the above composition.

An embodiment of Compound (1), synthesis of Compound (1), a liquid crystal composition, and a liquid crystal display element will be described in order.

1. Embodiment of Compound (1)

Compound (1) of the disclosure has a biphenyl structure in which at least one site shown in Formula (1) is fluorinated and includes an alkoxy group or an alkenyloxy group bonded to the ortho position to the fluorine, and further has a double bond at an end.

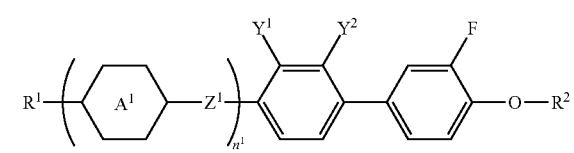
(1)

This compound is physically and chemically very stable under conditions in which an element is generally used, and compatibility with other liquid crystalline compounds is favorable. A composition including this compound is stable under conditions in which an element is generally used. When this composition is stored at a low temperature, there is little tendency for the compound to precipitate as a crystal (or a smectic phase). This compound has general physical properties, suitable optical anisotropy, and suitable dielectric anisotropy necessary for a component of the composition.

Preferable examples of terminal groups $R^1$ and $R^2$, ring $A^1$, bond group $Z^1$, and side groups $Y^1$ and $Y^2$ in Compound (1) are as follows. These examples also apply to sub-formulas of Compound (1). In Compound (1), when these groups are appropriately combined, it is possible to arbitrarily adjust physical properties. Compound (1) may contain a larger amount of isotopes such as $^2H$ (deuterium) and $^{13}C$ than a natural abundance of isotopes since there are no significant differences in physical properties of such compounds. Here, definitions of symbols in Compound (1) are the same as those described in Item 1.

In Formula (1), $R^1$ is an alkyl group having 2 to 10 carbon atoms in which one —$CH_2CH_2$— is substituted with —CH=CH—, and at least one —$CH_2$— is optionally substituted with —O—, and one hydrogen atom is optionally substituted with fluorine or chlorine.

Preferably, $R^1$ is an alkenyl group, an alkenyloxy group, an alkenyloxyalkyl group, or an alkoxyalkenyl group. In these groups, one hydrogen atom is optionally substituted with fluorine or chlorine. A group in which one hydrogen atom is substituted with fluorine is more preferable. In these groups, a linear chain is more preferable than a branched chain. It is more preferable for $R^1$ to have a branched chain, and be optically active. More preferably, $R^1$ is an alkenyl group or a monofluoroalkenyl group.

The preferable configuration of —CH=CH— in an alkenyl group depends on the position of the double bond. In alkenyl groups such as 1-propenyl, 1-butenyl, 1-pentenyl, 1-hexenyl, 3-pentenyl, and 3-hexenyl groups, the trans configuration is preferable. In alkenyl groups such as 2-butenyl, 2-pentenyl, and 2-hexenyl groups, the cis configuration is preferable.

A specific $R^1$ group is a vinyl, 1-propenyl, 2-propenyl, 1-butenyl, 2-butenyl, 3-butenyl, 1-pentenyl, 2-pentenyl, 3-pentenyl, 4-pentenyl, 2-propenyloxy, 2-butenyloxy, or 2-pentenyloxy group.

A specific $R^1$ group is also a 2-fluorovinyl, 2-fluoro-2-vinyl, 3-fluoro-1-propenyl, or 4-fluoro-1-propenyl group.

A more preferable $R^1$ group is a vinyl, 1-propenyl, 2-propenyl, 1-butenyl, 2-butenyl, 3-butenyl, 1-pentenyl, 2-pentenyl, 3-pentenyl, or a 4-pentenyl group. A most preferable $R^1$ group is a vinyl, 1-propenyl, 3-butenyl, or 3-pentenyl group.

In Formula (1), $R^2$ is an alkyl group having 1 to 8 carbon atoms or an alkenyl group having 2 to 8 carbon atoms. Preferably, $R^2$ is methyl, ethyl, propyl, butyl, or pentyl.

In Formula (1), ring $A^1$ is 1,4-cyclohexylene, tetrahydropyran-2,5-diyl, 1,3-dioxane-2,5-diyl, 1,4-phenylene, or 2-fluoro-1,4-phenylene.

A more preferable ring $A^1$ is 1,4-cyclohexylene, tetrahydropyran-2,5-diyl, 1,4-phenylene, or 2-fluoro-1,4-phenylene.

A particularly preferable ring $A^1$ is 1,4-cyclohexylene, tetrahydropyran-2,5-diyl, or 1,4-phenylene. Most preferably, the ring $A^1$ is 1,4-cyclohexylene or 1,4-phenylene.

In Formula (1), $Y^1$ and $Y^2$ are both hydrogen, or alternatively, one of $Y^1$ and $Y^2$ is hydrogen and the other is fluorine. Most preferably, $Y^1$ and $Y^2$ are hydrogen.

In Formula (1), $Z^1$ is a single bond, —$CH_2CH_2$—, —$CH_2O$—, —$OCH_2$—, or —CH=CH—. Preferably, $Z^1$ is a single bond, —$CH_2CH_2$—, or —$CH_2O$—. Most preferably, $Z^1$ is a single bond.

In Formula (1), n1 is 1 or 2.

Compound (1) has a tricyclic or tetracyclic structure. When Compound (1) has a tricyclic structure, it has favorable compatibility with other liquid crystalline compounds, and has a low rotational viscosity. When Compound (1) has a tetracyclic structure, the upper limit temperature is high, and a temperature range of a liquid crystal phase is wide.

When terminal groups, rings and bond groups of Compound (1) are appropriately selected, it is possible to arbitrarily adjust physical properties such as optical anisotropy and dielectric anisotropy. Effects of types of the terminal groups $R^1$ and $R^2$, the ring $A^1$, and the bond group $Z^1$ on physical properties of Compound (1) will be described below.

In Compound (1), when $R^1$ or $R^2$ has a linear chain, the temperature range of the liquid crystal phase is wide and the viscosity is low. When $R^1$ or $R^2$ has a branched chain, compatibility with other liquid crystalline compounds is favorable. A compound in which $R^1$ or $R^2$ is optically active group is beneficial as a chiral dopant. When this compound is added to the composition, it is possible to prevent a reverse twisted domain being generated in the element. A compound in which $R^1$ or $R^2$ is not an optically active group is beneficial as a component of the composition. When $R^1$ or $R^2$ is an alkenyl group, a preferable configuration depends on the position of the double bond. An alkenyl compound having a preferable configuration has a high upper limit temperature or a wide temperature range of a liquid crystal phase. Details are described in Mol. Cryst. Liq. Cryst., 1985, 131, 109, and Mol. Cryst. Liq. Cryst., 1985, 131, 327.

When the ring $A^1$ is 1,4-phenylene or 2-fluoro-1,4-phenylene, the optical anisotropy is large. When the ring $A^1$ is 1,4-cyclohexylene, tetrahydropyran-2,5-diyl, or 1,3-dioxane-2,5-diyl, the optical anisotropy is small.

When the ring $A^1$ is 1,4-cyclohexylene, the upper limit temperature is high, the optical anisotropy is relatively small, and the viscosity is low. When the ring $A^1$ is 1,4-phenylene, the optical anisotropy is large, the upper limit temperature is high, and an orientation order parameter is high.

When the bond group $Z^1$ is a single bond, —$CH_2O$—, —$CH_2CH_2$—, or —CH=CH—, the viscosity is low. When the bond group is a single bond, —$CH_2CH_2$—, or —CH=CH—, the viscosity is lower. When the bond group is —CH=CH—, the temperature range of the liquid crystal phase is wide and an elastic constant ratio $K_{33}/K_{11}$ ($K_{33}$: bend elastic constant, $K_{11}$: spray elastic constant) is large.

When Compound (1) has a tricyclic structure, the viscosity is low. When Compound (1) has a tetracyclic structure, the upper limit temperature is high. As described above, types of terminal groups, rings, and bond groups, and the number of rings are appropriately selected, and thus a compound having required physical properties can be obtained. Thus, Compound (1) is beneficial as a component of a composition used for an element having modes such as PC, TN, STN, ECB, OCB, IPS, FFS, and VA.

Preferable examples of Compound (1) are Compounds (1-1) to (1-3) described in Item 2. More preferable examples are compounds represented by sub-formulas in Item 4 and the like. Compound (1) is suitable for an element having modes such as VA, IPS, FFS, and PSA.

2. Synthesis of Compound (1)

A synthesis method of Compound (1) will be described. Compound (1) can be synthesized by appropriately combining methods in organic synthetic chemistry. Methods of introducing required terminal groups, rings and bond groups into starting materials are described in books such as "Organic Syntheses" (John Wiley & Sons, Inc.), "Organic Reactions" (John Wiley & Sons, Inc.), "Comprehensive Organic Synthesis" (Pergamon Press), and "New Course of Experimental Chemistry" (Maruzen).

2-1. Generation of Bond Group Z

Regarding a method of generating bond group $Z^1$, the scheme is shown first. Next, reactions described in the scheme in Methods (1) to (4) will be described. In this scheme, $MSG^1$ (or $MSG^2$) is a monovalent organic group having at least one ring. Monovalent organic groups represented by a plurality of $MSG^1$'s (or $MSG^2$'s) in the scheme may be the same as or different from each other. Compounds (1A) to (1D) correspond to Compound (1).

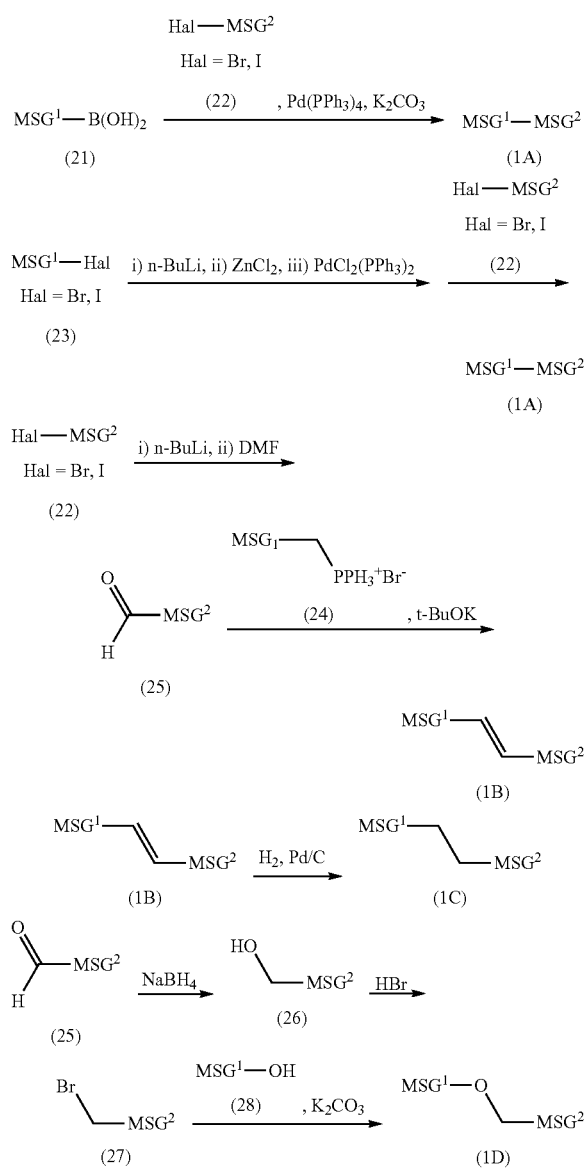

(1) Generation of Single Bond

Compound (1A) is synthesized by reacting an arylboronic acid (21) and a halide (22) synthesized by a known method in the presence of a catalyst such as a carbonate and tetrakis(triphenylphosphine)palladium. Compound (1A) is synthesized by reacting a halide (23) synthesized in a known method with n-butyllithium and then with zinc chloride, and reacting a halide (22) in the presence of a catalyst such as dichlorobis(triphenylphosphine)palladium.

(2) Generation of —CH=CH—

After a halide (22) is treated with n-butyllithium, DMF (N,N-dimethylformamide) is reacted therewith to obtain an aldehyde (25). A phosphonium salt (24) synthesized by a known method is treated with a base such as potassium t-butoxide to a generate phosphorus ylide. This phosphorus ylide is reacted with the aldehyde (25) and thereby Compound (1B) is synthesized. Since a cis form is generated according to reaction conditions, the cis form is isomerized to the trans form by a known method as necessary.

(3) Generation of —$CH_2CH_2$—

Compound (1B) is hydrogenated in the presence of a catalyst such as palladium carbon and thereby Compound (1C) is synthesized.

(4) Generation of —$OCH_2$—

An aldehyde (25) is reduced using a reducing agent such as sodium borohydride and thereby Compound (26) is obtained. Compound (26) is brominated with hydrobromic acid or the like and thereby a bromide (27) is obtained. The bromide (27) is reacted with Compound (28) in the presence of a base such as potassium carbonate, and thereby Compound (1D) is synthesized.

2-2. Generation of Ring $A^1$

Next, a method of generating ring $A^1$ will be described. Starting materials for rings such as 1,4-cyclohexylene, tetrahydropyran-2,5-diyl, 1,3-dioxane-2,5-diyl, 1,4-phenylene, and 2-fluoro-1,4-phenylene are commercially available or generation methods thereof are well known.

3. Liquid Crystal Composition

3-1. Component Compound

A liquid crystal composition of the present disclosure will be described. This composition includes at least one Compound (1) as Component (a). This composition may contain two, three or more Compounds (1). A component of the composition may be only Compound (1). The composition preferably includes at least one Compound (1) in a range of 1 weight % to 99 weight % in order to for favorable physical properties to be exhibited. In a composition having negative dielectric anisotropy, a preferable content of Compound (1) is in a range of 5 weight % to 60 weight %. In a composition having positive dielectric anisotropy, a preferable content of Compound (1) is 30 weight % or less.

TABLE 1

| Component compounds of composition | | |
|---|---|---|
| Components | Component compounds | Dielectric anisotropy |
| Component (a) | Compound (1) | negatively large |
| Component (b) | Compound (2) to Compound (4) | Small |
| Component (c) | Compound (5) to Compound (11) | negatively large |
| Component (d) | Compound (12) to Compound (14) | positively large |
| Component (e) | Compound (15) | positively large |

Here, Compound (5) to Compound (11) are compounds represented by the following formulae.

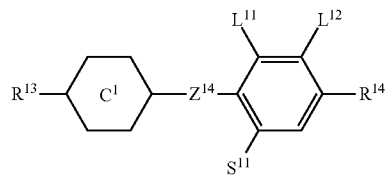
(5)

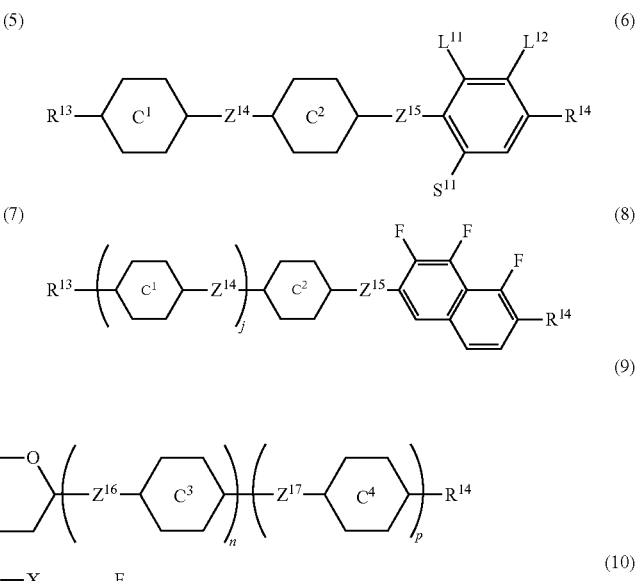
(6)
(7)
(8)
(9)

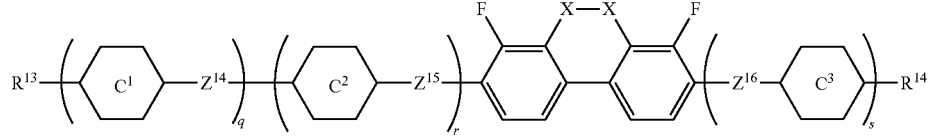
(10)

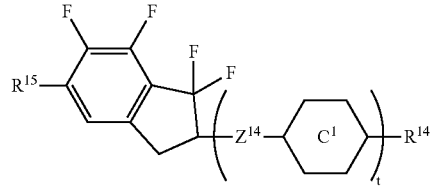
(11)

In Formulae (5) to (11), $R^{13}$, $R^{14}$ and $R^{15}$ are independently an alkyl group having 1 to 10 carbon atoms or an alkenyl group having 2 to 10 carbon atoms, and at least one —CH$_2$— is optionally substituted with —O— in the alkyl group and the alkenyl group and in these groups, at least one hydrogen atom is optionally substituted with fluorine, and $R^{15}$ may be hydrogen or fluorine;

ring $C^1$, ring $C^2$, ring $C^3$, and ring $C^4$ are independently 1,4-cyclohexylene, 1,4-cyclohexenylene, or 1,4-phenylene, tetrahydropyran-2,5-diyl, or decahydronaphthalene-2,6-diyl in which at least one hydrogen atom is optionally substituted with fluorine;

ring $C^5$ and ring $C^6$ are independently 1,4-cyclohexylene, 1,4-cyclohexenylene, 1,4-phenylene, tetrahydropyran-2,5-diyl, or decahydronaphthalene-2,6-diyl;

$Z^{14}$, $Z^{15}$, $Z^{16}$, and $Z^{17}$ are independently a single bond, —COO—, —CH$_2$O—, —OCF$_2$—, —CH$_2$CH$_2$—, or —OCF$_2$CH$_2$CH$_2$—;

$L^{11}$ and $L^{12}$ are independently fluorine or chlorine;

$S^{11}$ is hydrogen or a methyl group;

X is —CHF— or —CF$_2$—;

j, k, m, n, p, q, r, and s are independently 0 or 1, a sum of k, m, n, and p is 1 or 2, a sum of q, r, and s is 0, 1, 2, or 3, and t is 1, 2, or 3, wherein, when $R^{13}$ has a double bond and $L^{11}$ is hydrogen, $R^{14}$ is an alkyl group having 1 to 10 carbon atoms or an alkenyl group having 2 to 10 carbon atoms, and in the alkyl and alkenyl groups, at least one hydrogen atom is optionally substituted with fluorine.

This composition includes Compound (1) as Component (a). Preferably, this composition further includes a liquid crystalline compound selected from Components (b) to (e) shown in Table 1. When this composition is prepared, Components (b) to (e) are preferably selected in consideration of a positive or negative sign or a magnitude of dielectric anisotropy. This composition may include a liquid crystalline compound different from Compounds (1) to (15). This composition may not include such a liquid crystalline compound.

Component (b) includes Compounds (2) to (4) in which two terminal groups are alkyl groups. Preferable examples of Component (b) include Compounds (2-1) to (2-11), Compounds (3-1) to (3-19), and Compounds (4-1) to (4-7). In these compounds, $R^{11}$ and $R^{12}$ are independently an alkyl group having 1 to 10 carbon atoms or an alkenyl group having 2 to 10 carbon atoms, and in these alkyl and alkenyl groups, at least one —CH$_2$— is optionally substituted with —O—, and in these groups, at least one hydrogen atom is optionally substituted with fluorine.

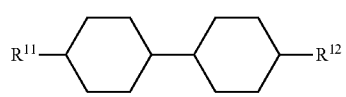
(2-1)

-continued
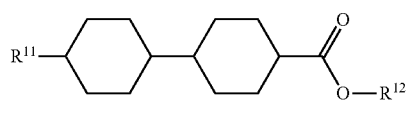 (2-2)
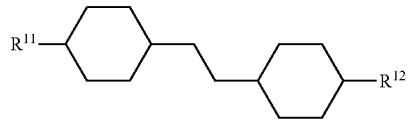 (2-3)
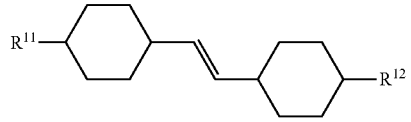 (2-4)
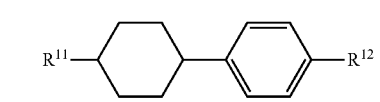 (2-5)
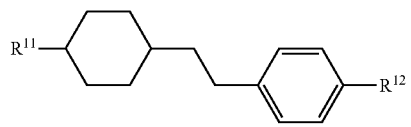 (2-6)
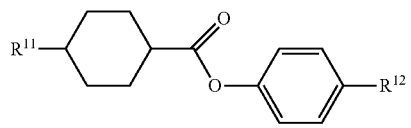 (2-7)
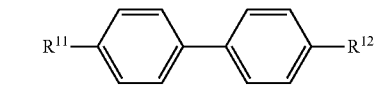 (2-8)
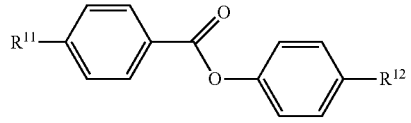 (2-9)
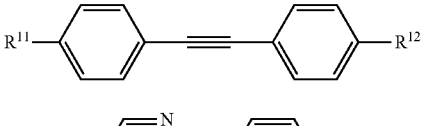 (2-10)
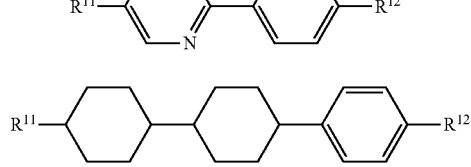 (2-11)
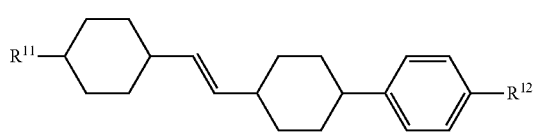 (3-1)
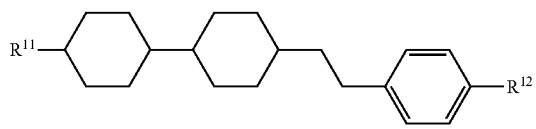 (3-2)
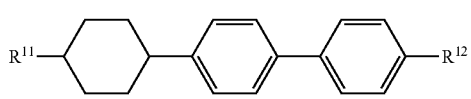 (3-3)
-continued
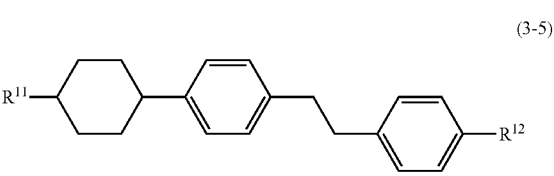 (3-4)
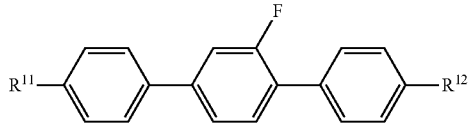 (3-5)
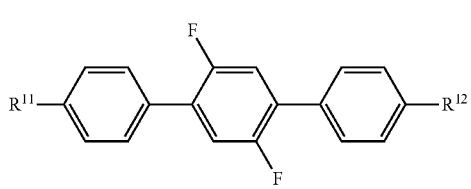 (3-6)
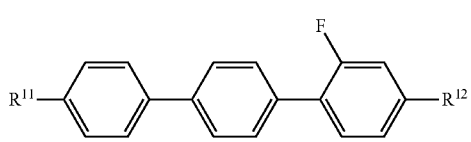 (3-7)
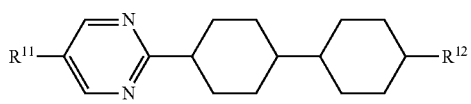 (3-8)
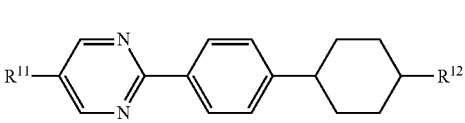 (3-9)
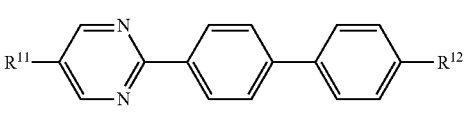 (3-10)
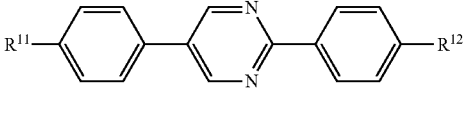 (3-11)
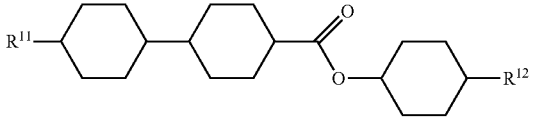 (3-12)
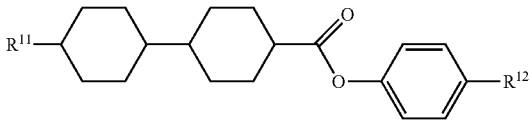 (3-13)
 (3-14)

-continued (3-15)
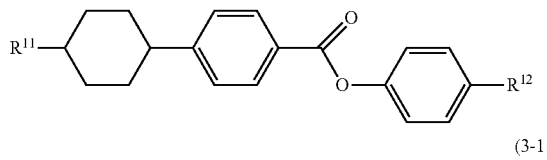

(3-16)
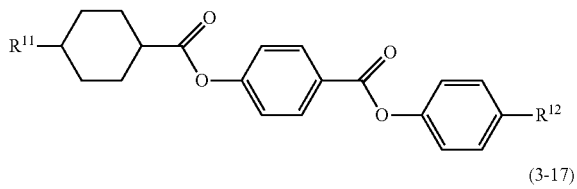

(3-17)
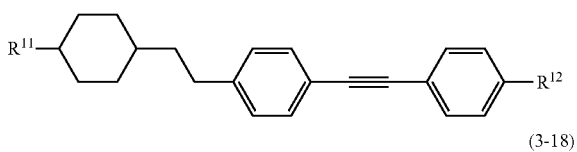

(3-18)
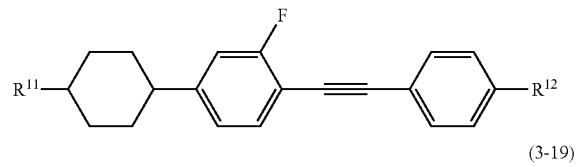

(3-19)
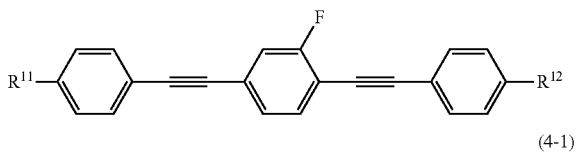

(4-1)
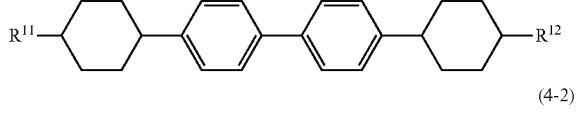

(4-2)
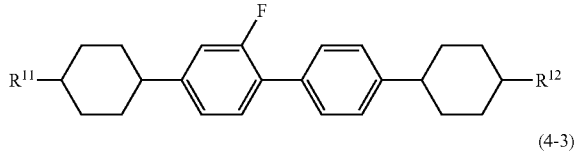

(4-3)
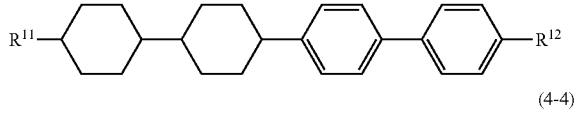

(4-4)
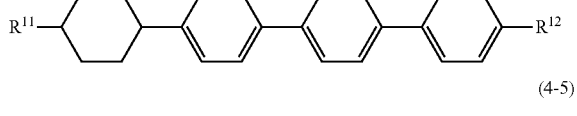

(4-5)
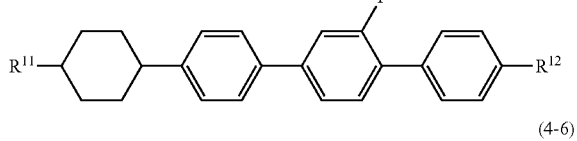

(4-6)
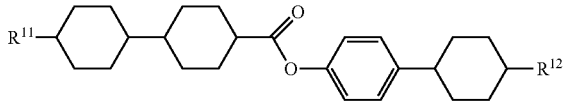

-continued (4-7)
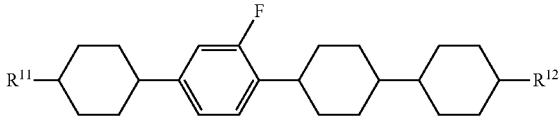

Component (b) has small dielectric anisotropy. Component (b) is close to being neutral. Compound (2) has an effect of lowering the viscosity or adjusting the optical anisotropy. Compounds (3) and (4) have an effect of increasing an upper limit temperature and thus widening a temperature range of the nematic phase or adjusting the optical anisotropy.

As the content of Component (b) increases, the viscosity of the composition decreases, but the dielectric anisotropy decreases. Therefore, a higher content is preferable as long as a required value of a threshold voltage of the element is satisfied. When a composition for a mode such as IPS and VA is prepared, the content of Component (b) is preferably 30 weight % or more, and more preferably 40 weight % or more on the basis of the weight of the liquid crystal composition.

Component (c) includes Compounds (5) to (11). These compounds include a phenylene in which the lateral positions are substituted with two halogen atoms as in 2,3-difluoro-1,4-phenylene. Preferable examples of Component (c) include Compounds (5-1) to (5-8), Compounds (6-1) to (6-18), Compound (7-1), Compounds (8-1) to (8-3), Compounds (9-1) to (9-11), Compounds (10-1) to (10-3), and Compounds (11-1) to (11-3). In these compounds, $R^{13}$, $R^{14}$, and $R^{15}$ are independently an alkyl group having 1 to 10 carbon atoms or an alkenyl group having 2 to 10 carbon atoms, and at least one —CH$_2$— is optionally substituted with —O— in the alkyl group and the alkenyl group and in these groups, at least one hydrogen atom is optionally substituted with fluorine, and $R^{15}$ may be hydrogen or fluorine.

(5-1)
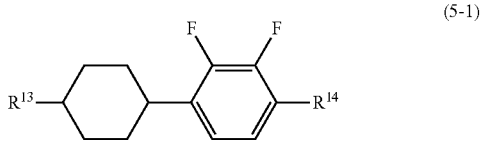

(5-2)
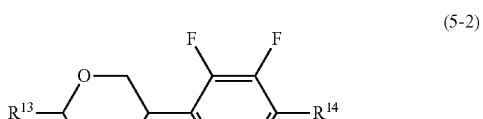

(5-3)
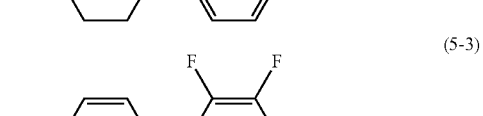

(5-4)
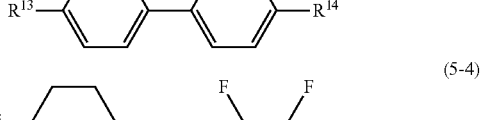

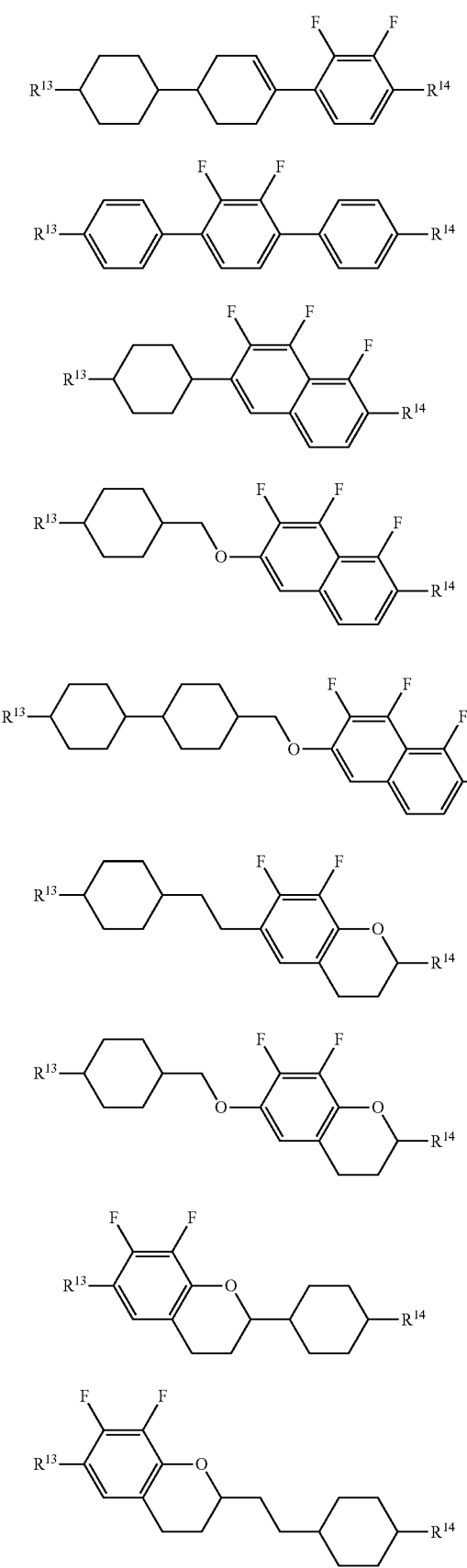
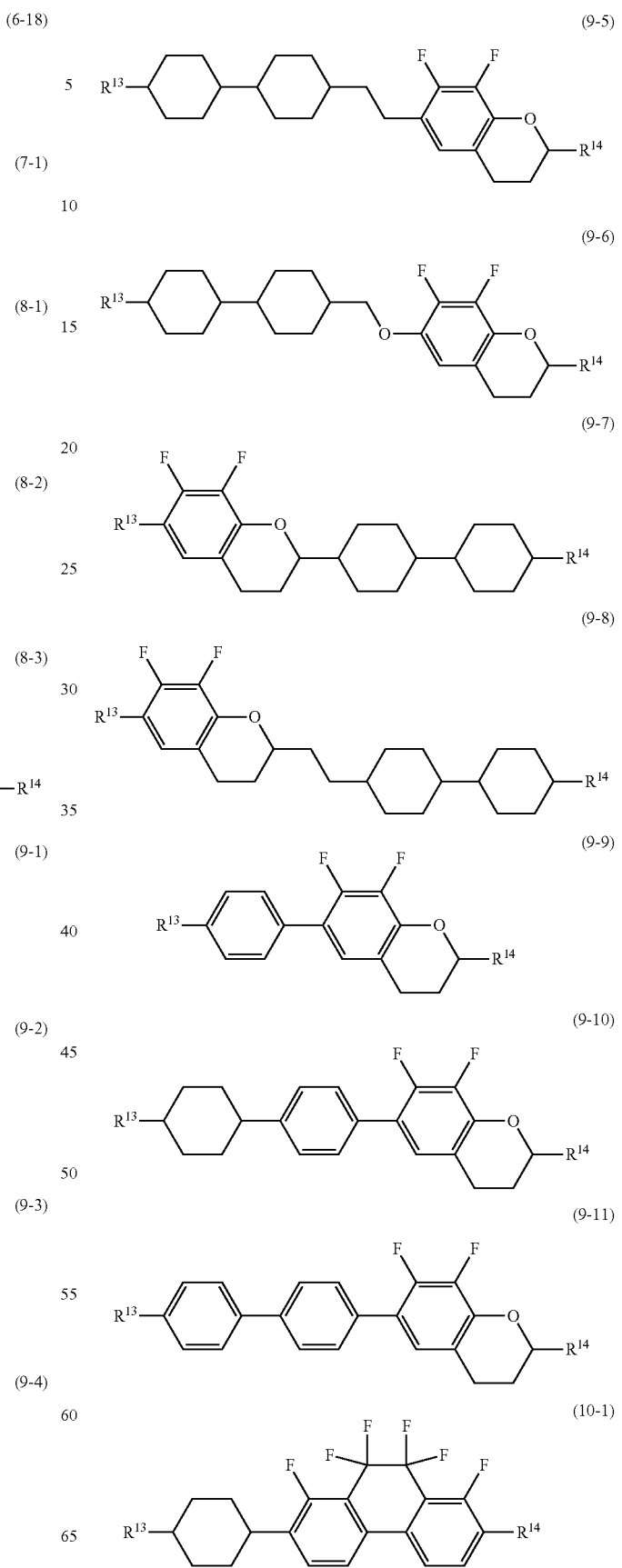

-continued

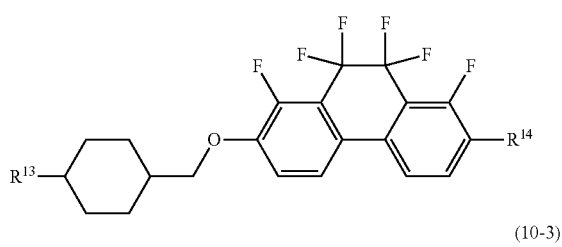
(10-2)

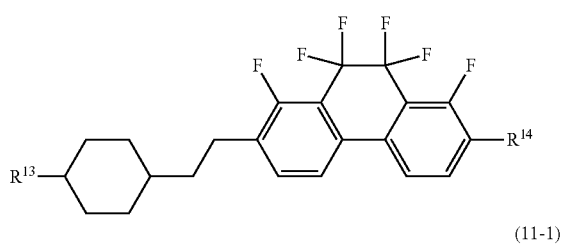
(10-3)

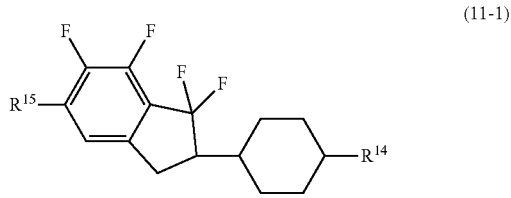
(11-1)

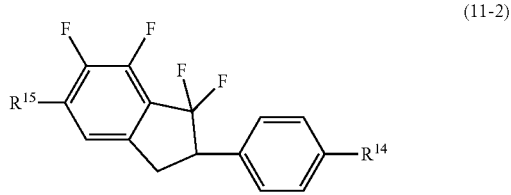
(11-2)

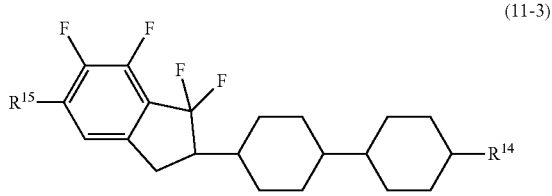
(11-3)

Component (c) has large negative dielectric anisotropy. Component (c) is used when a composition for a mode such as IPS, VA, and PSA is prepared. As the content of Component (c) increases, the dielectric anisotropy of the composition becomes negatively larger, but the viscosity increases. Therefore, the content is preferably as small as possible as long as a required value of a threshold voltage of the element is satisfied. In consideration of the fact that the dielectric anisotropy is about −5, in order for driving at a sufficient voltage, the content is preferably 40 weight % or more.

Among Components (c), since Compound (5) is a bicyclic compound, it has an effect of lowering the viscosity, adjusting the optical anisotropy, or increasing the dielectric anisotropy. Since Compounds (5) and (6) are tricyclic compounds, they have an effect of increasing the upper limit temperature, increasing the optical anisotropy, or increasing the dielectric anisotropy. Compounds (8) to (11) have an effect of increasing the dielectric anisotropy.

When a composition for a mode such as IPS, VA, and PSA is prepared, the content of Component (c) is preferably 40 weight % or more and more preferably in a range of 50 weight % to 95 weight % on the basis of the weight of the liquid crystal composition. When Component (c) is added to a composition having positive dielectric anisotropy, the content of Component (c) is preferably 30 weight % or less. When Component (c) is added, it is possible to adjust an elastic constant of the composition and adjust a voltage-transmittance curve of the element.

Component (d) includes Compounds (12) to (14) having halogen or a fluorine-containing group at the right end. Preferable examples of Component (d) include Compounds (12-1) to (12-16), Compounds (13-1) to (13-113), and Compounds (14-1) to (14-58). In these compounds, $R^{16}$ is an alkyl group having 1 to 10 carbon atoms or an alkenyl group having 2 to 10 carbon atoms, and in these alkyl and alkenyl groups, at least one —CH$_2$— is optionally substituted with —O—, and in these groups, at least one hydrogen atom is optionally substituted with fluorine. $X^{11}$ is fluorine, chlorine, —OCF$_3$, —OCHF$_2$, —CF$_3$, —CHF$_2$, —CH$_2$F, —OCF$_2$CHF$_2$, or —OCF$_2$CHFCF$_3$.

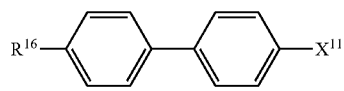
(12-1)

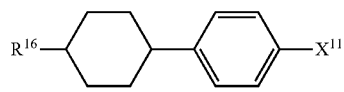
(12-2)

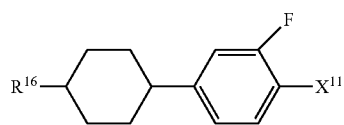
(12-3)

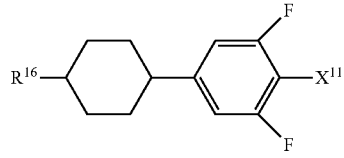
(12-4)

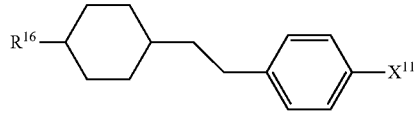
(12-5)

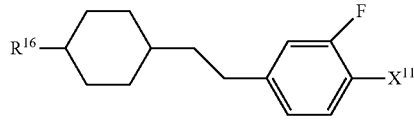
(12-6)

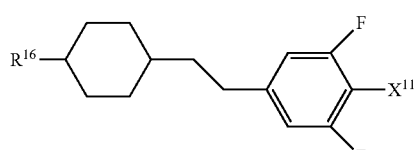
(12-7)

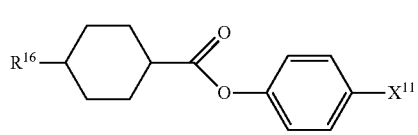
(12-8)

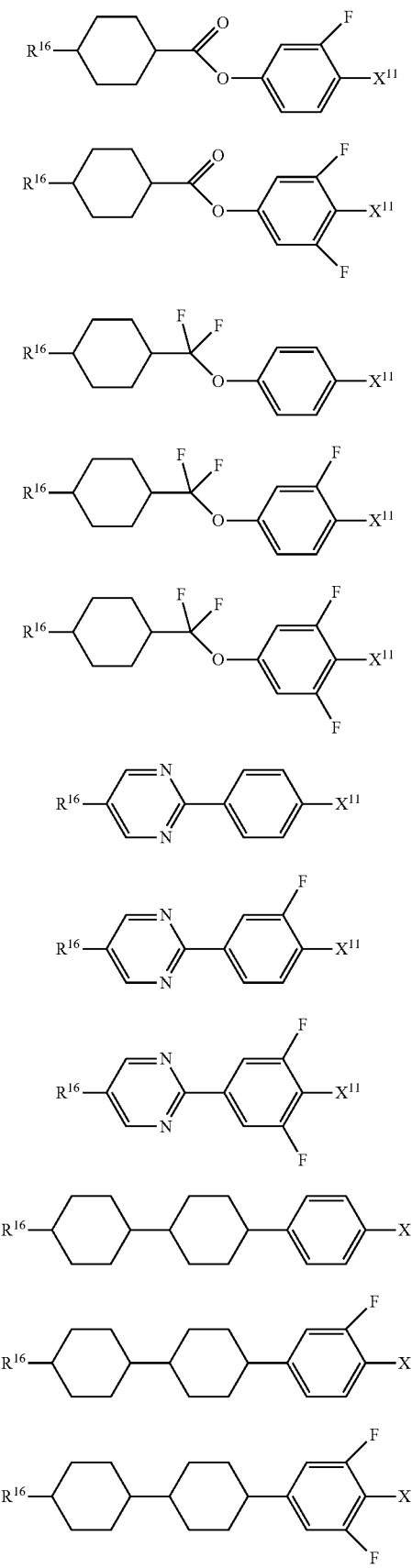
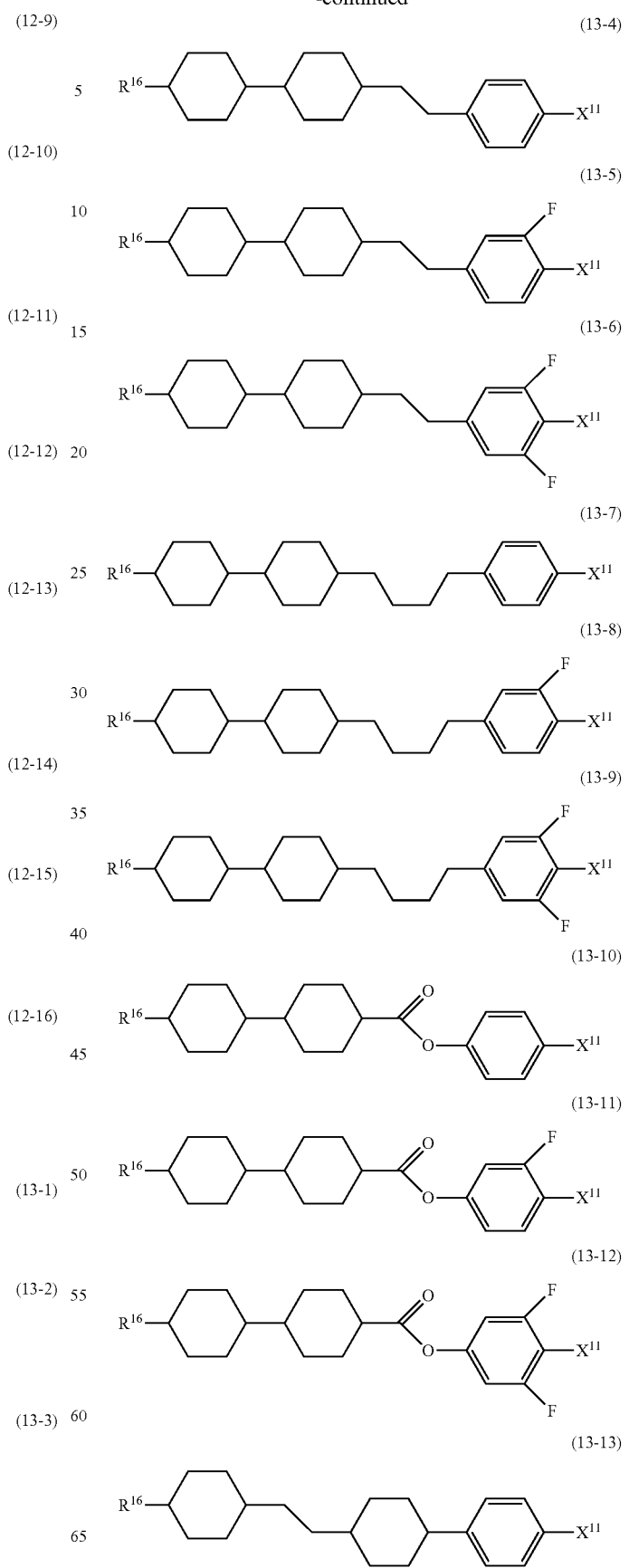

(13-14)
(13-15)
(13-16)
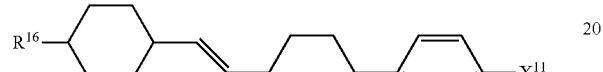
(13-17)
(13-18)
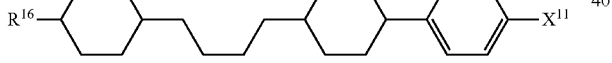
(13-19)
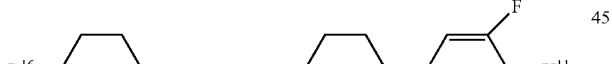
(13-20)
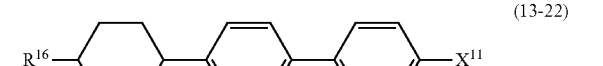
(13-21)
(13-22)
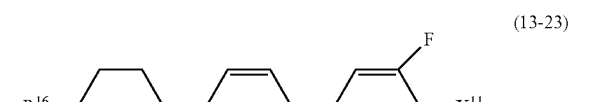
(13-23)
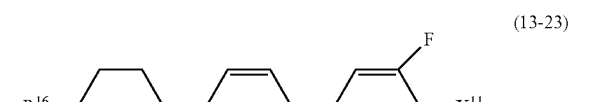
(13-24)
(13-25)
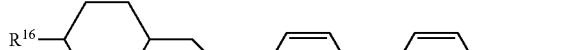
(13-26)
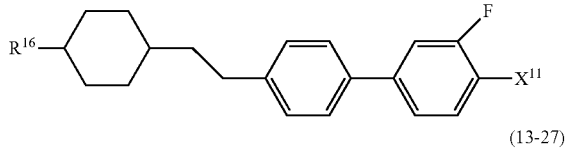
(13-27)
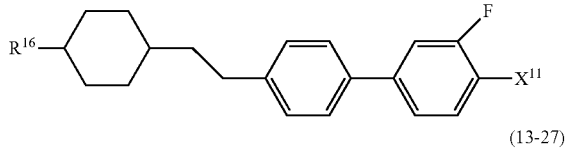
(13-28)
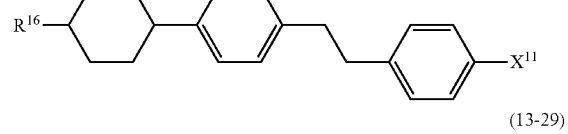
(13-29)
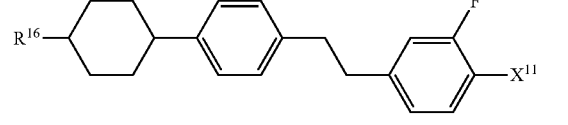
(13-30)
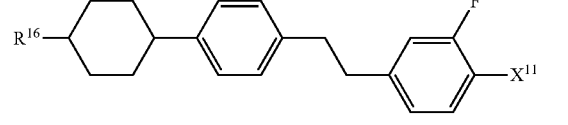
(13-31)
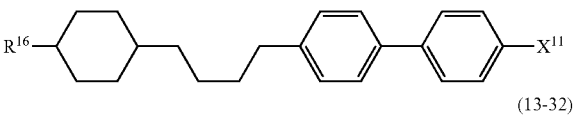
(13-32)
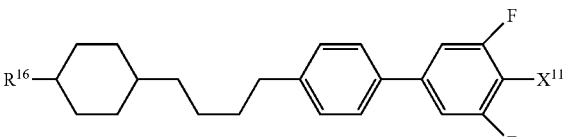
(13-33)
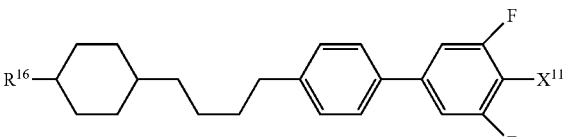

(13-34) 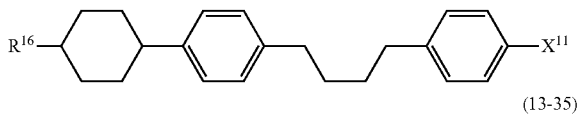
(13-35) 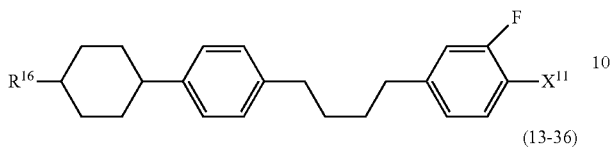
(13-36) 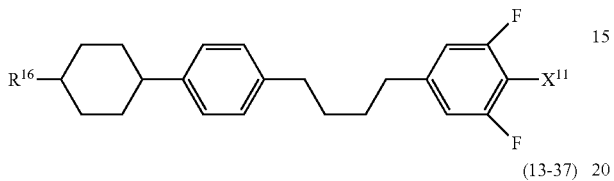
(13-37) 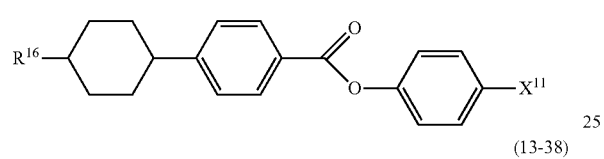
(13-38) 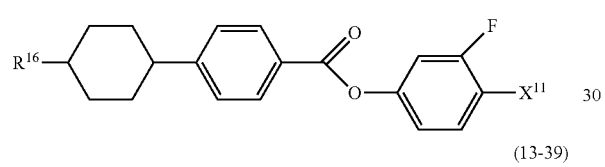
(13-39) 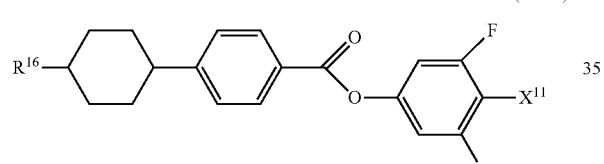
(13-40) 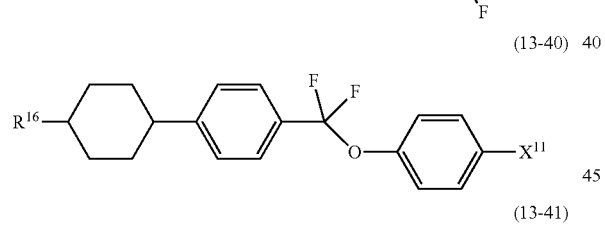
(13-41) 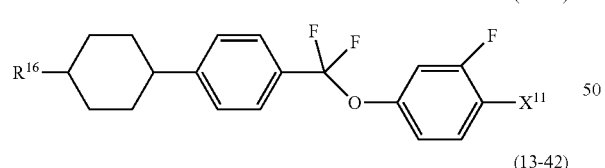
(13-42) 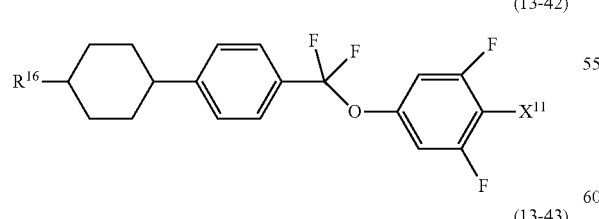
(13-43) 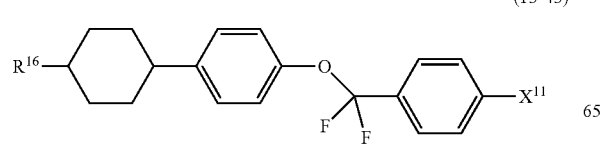
(13-44) 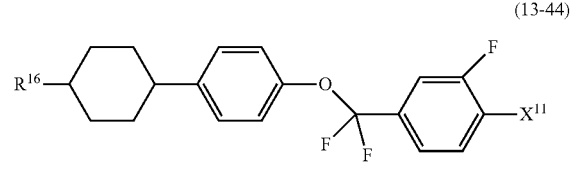
(13-45) 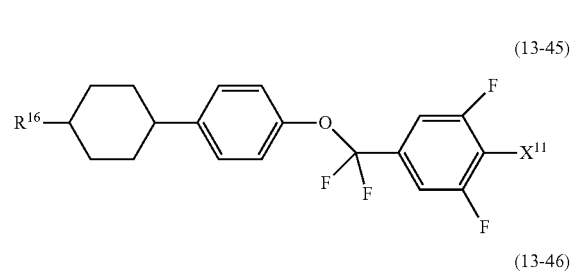
(13-46) 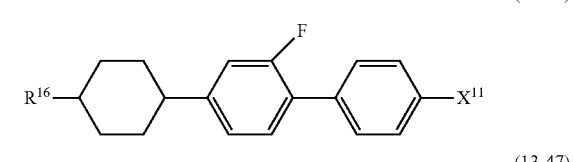
(13-47) 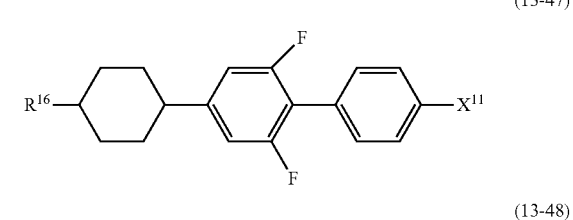
(13-48) 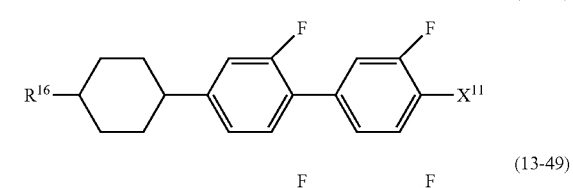
(13-49) 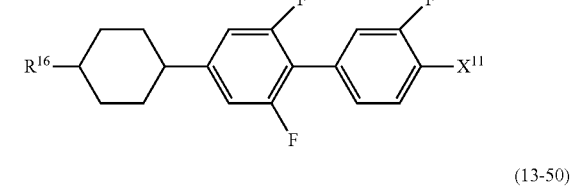
(13-50) 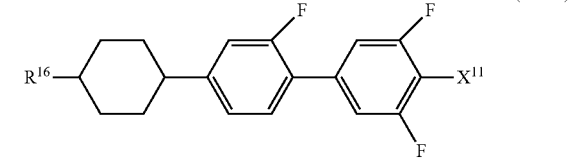
(13-51) 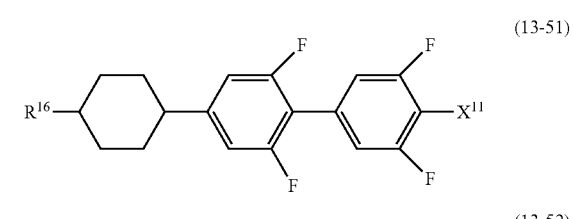
(13-52) 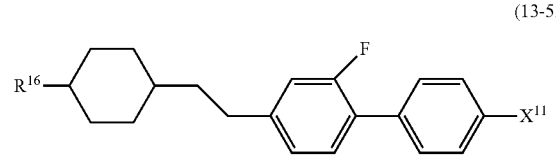

(13-53) 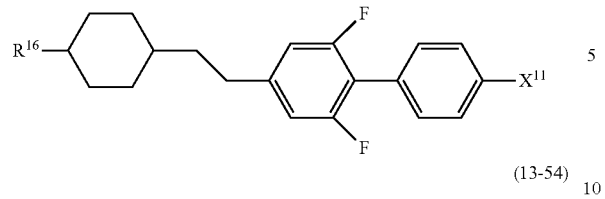
(13-54) (13-55) (13-56) (13-57) 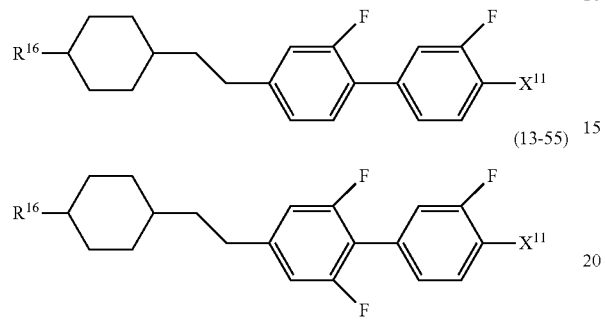
(13-58) 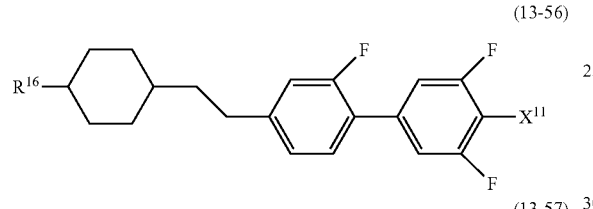
(13-59) 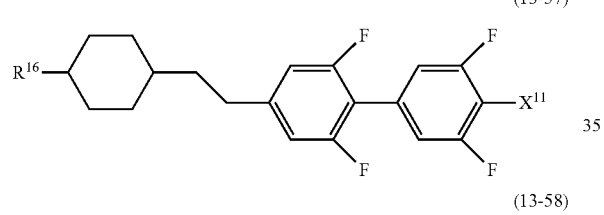
(13-60) 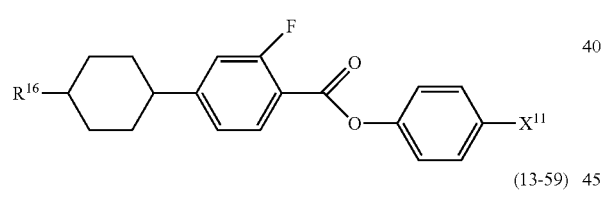
(13-61) 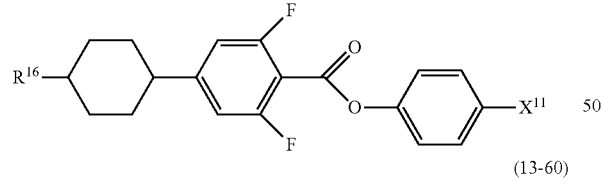
(13-62) 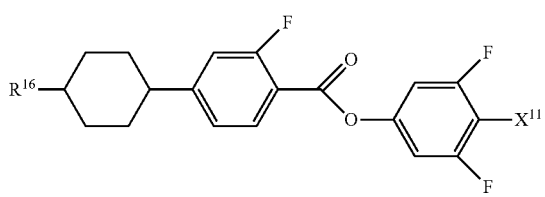
(13-63) 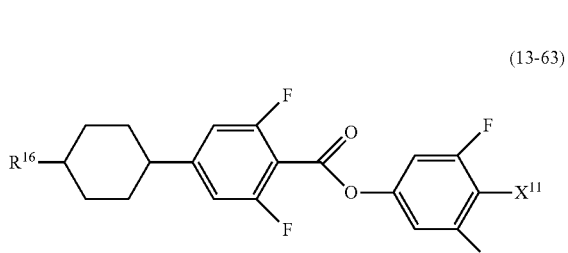
(13-64) (13-65) 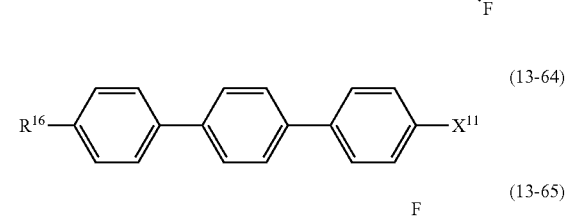
(13-66) (13-67) (13-68) 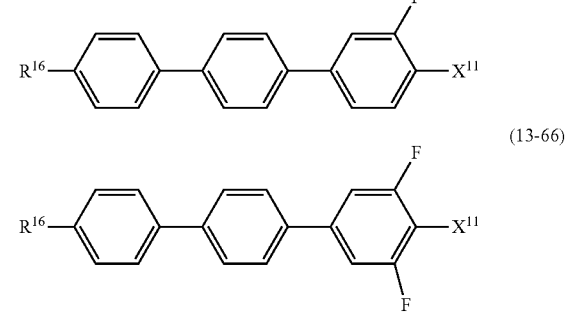
(13-69) 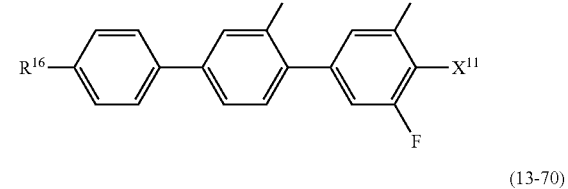
(13-70) 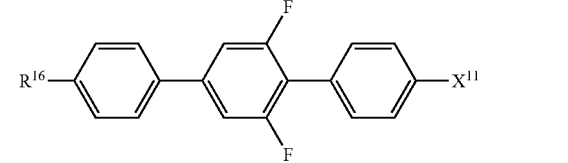

(13-71) 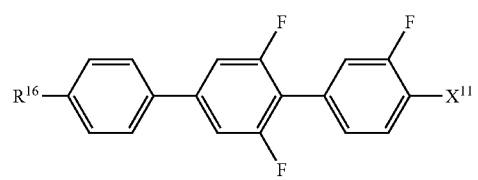
(13-72) 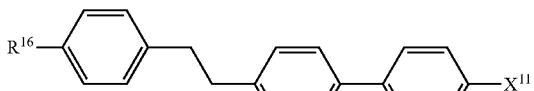
(13-73) 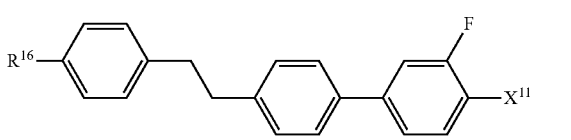
(13-74) 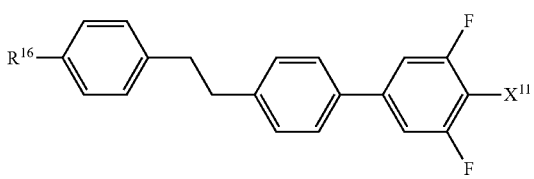
(13-75) 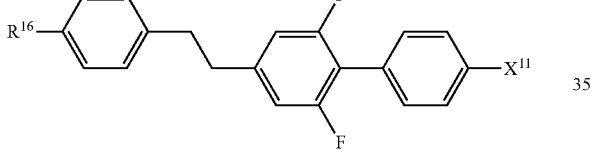
(13-76) 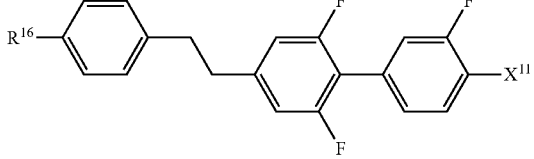
(13-77) 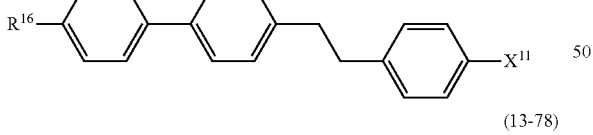
(13-78) 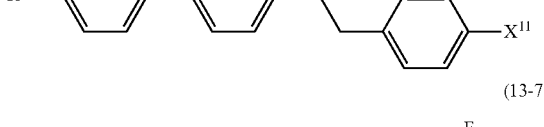
(13-79) 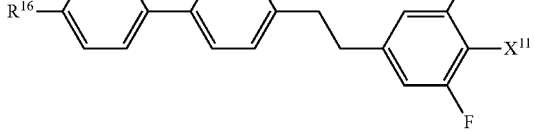
(13-80) 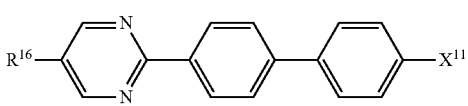
(13-81) 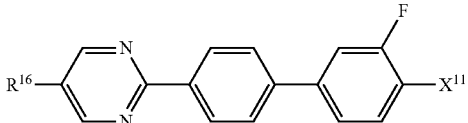
(13-82) 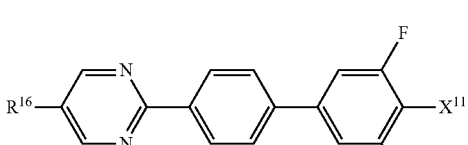
(13-83) 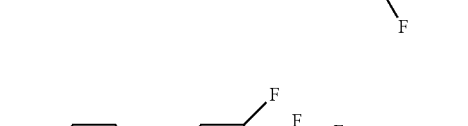
(13-84) 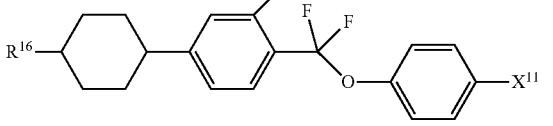
(13-85) 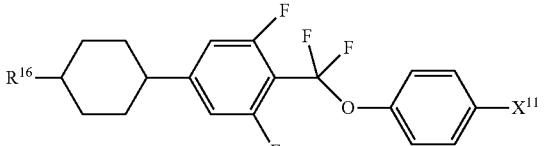
(13-86) 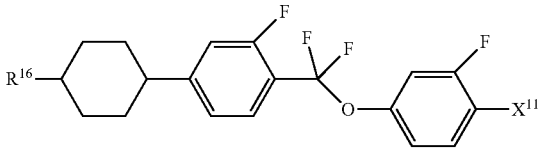
(13-87) 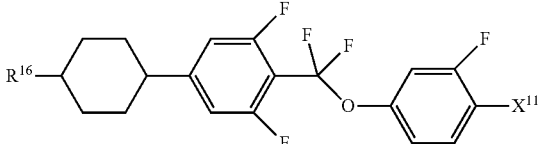
(13-88) 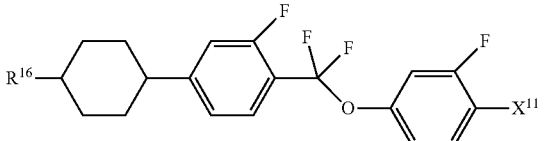
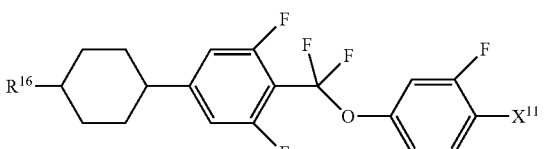

(13-89)
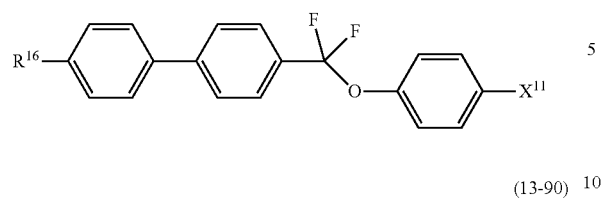
(13-90)
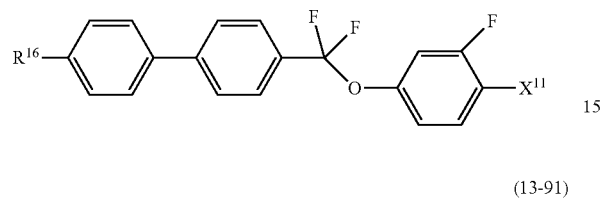
(13-91)
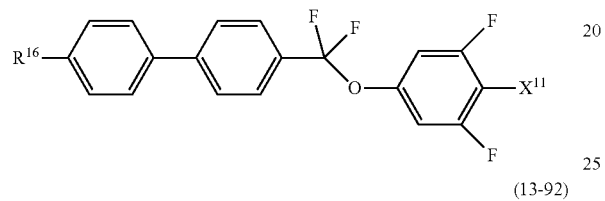
(13-92)
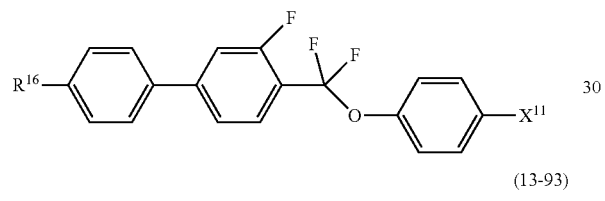
(13-93)
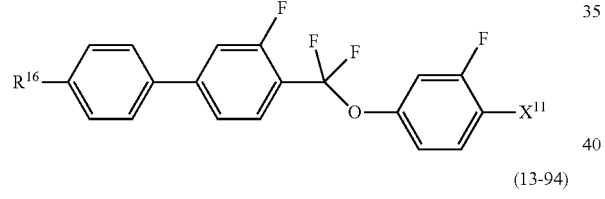
(13-94)
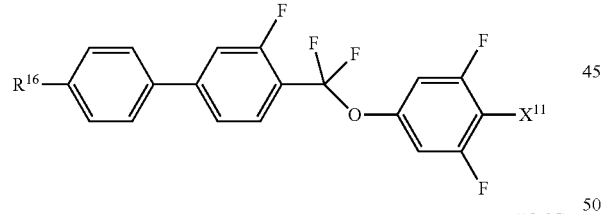
(13-95)
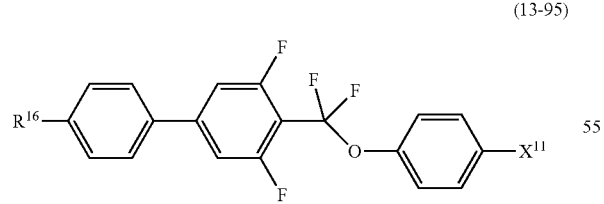
(13-96)
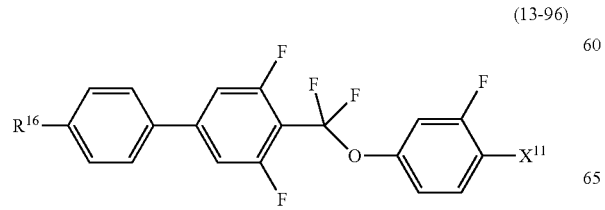
(13-97)
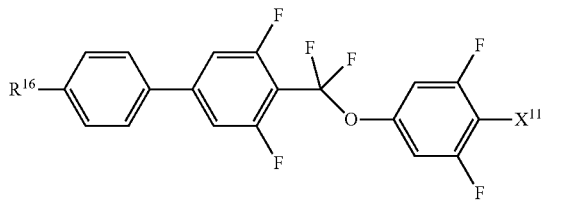
(13-98)
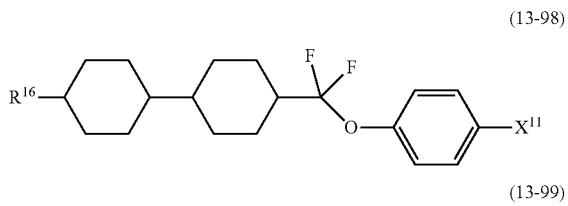
(13-99)
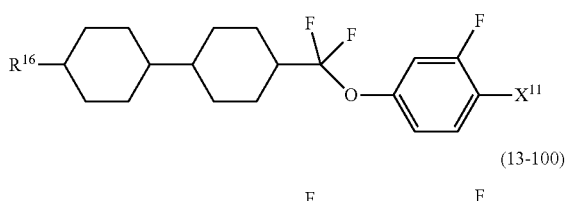
(13-100)
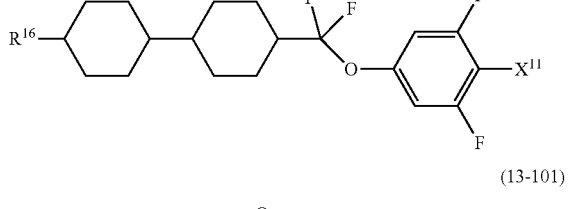
(13-101)
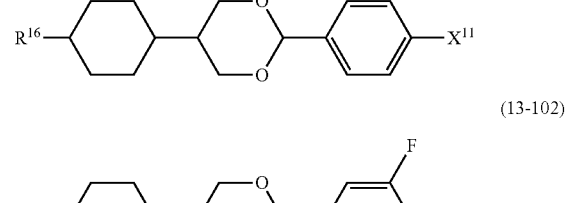
(13-102)
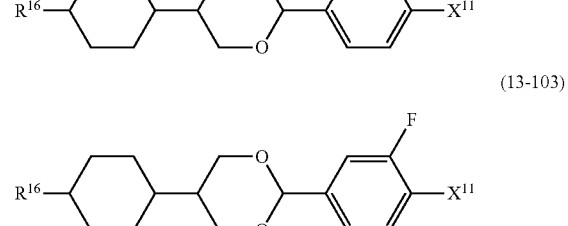
(13-103)
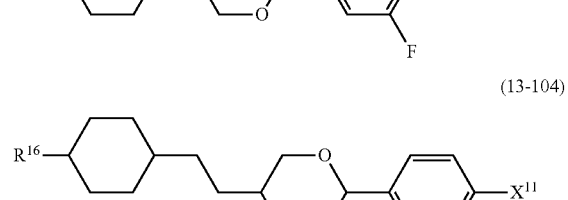
(13-104)
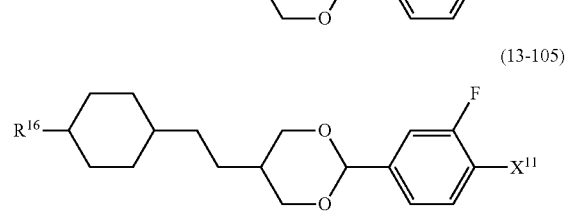
(13-105)

(13-106) 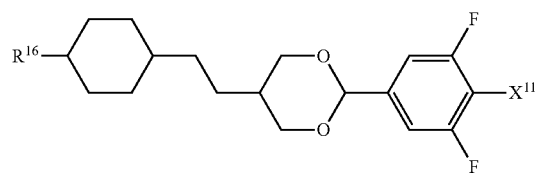
(13-107) 
(13-108) 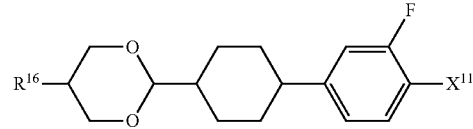
(13-109) 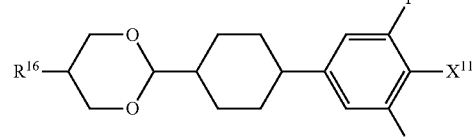
(13-110) 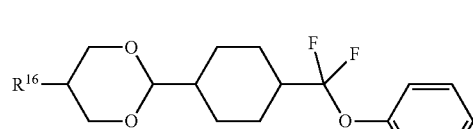
(13-111) 
(13-112) 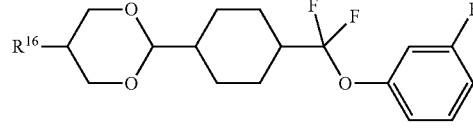
(13-113) 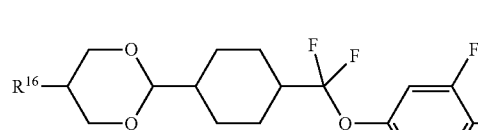
(14-1) 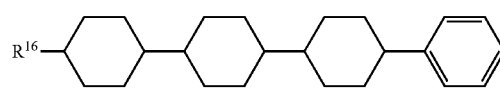
(14-2) 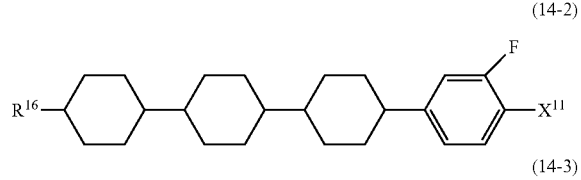
(14-3) 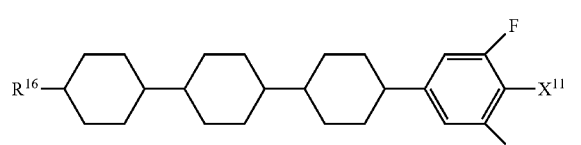
(14-4) 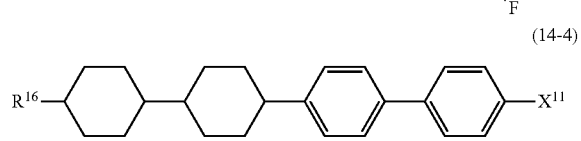
(14-5) 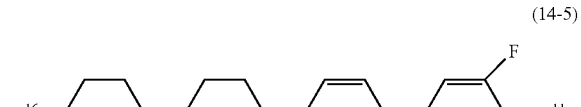
(14-6) 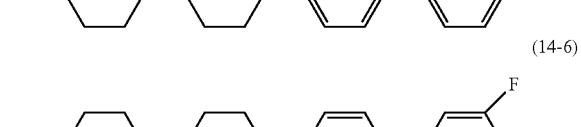
(14-7) 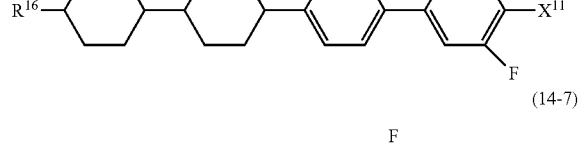
(14-8) 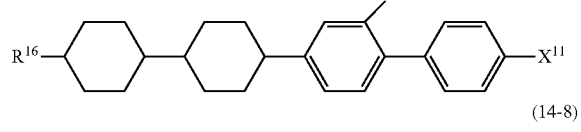
(14-9) 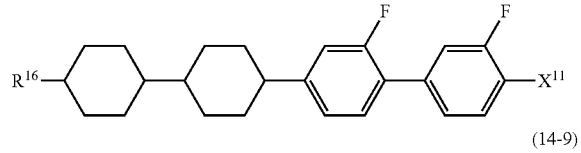
(14-10) 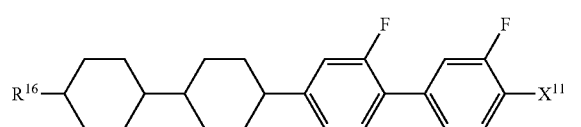
(14-11) 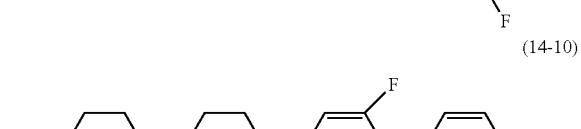

(14-12) 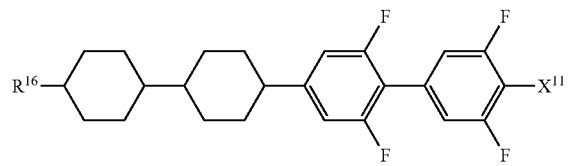
(14-13) 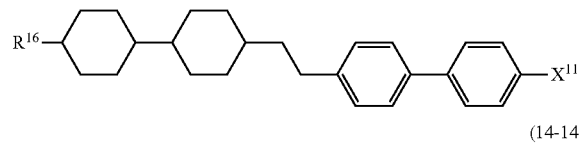
(14-14) 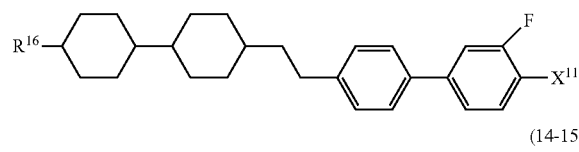
(14-15) 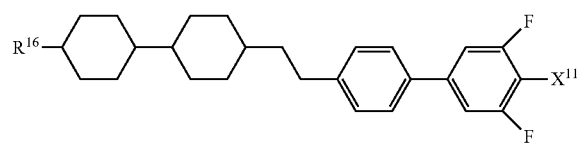
(14-16) 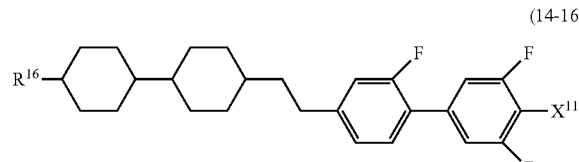
(14-17) 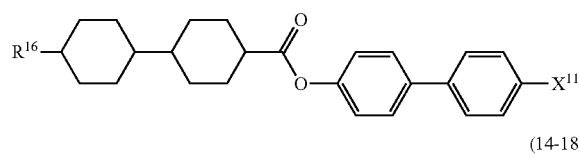
(14-18) 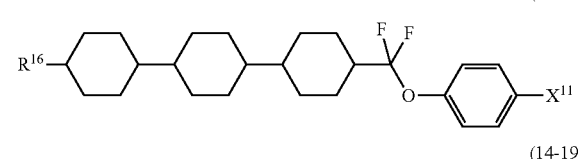
(14-19) 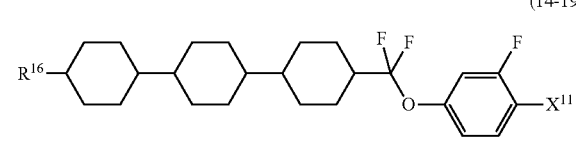
(14-20) 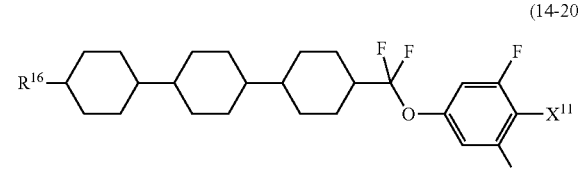
(14-21) 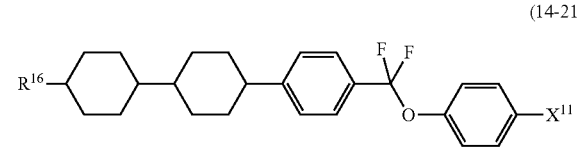
(14-22) 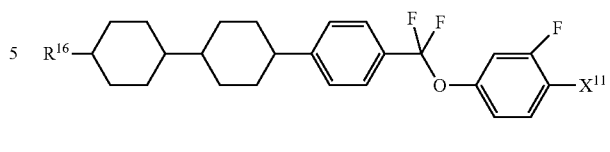
(14-23) 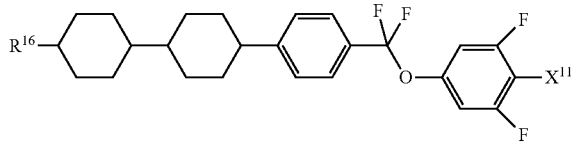
(14-24) 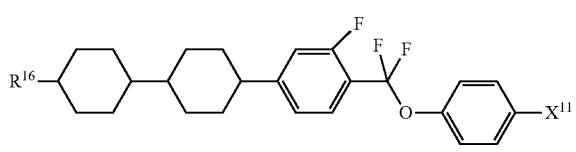
(14-25) 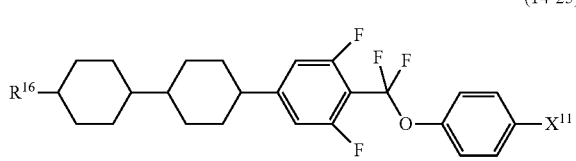
(14-26) 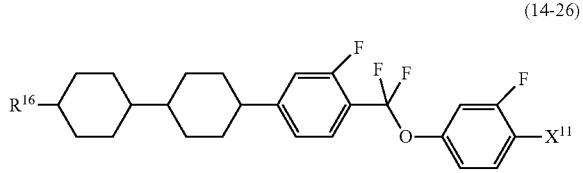
(14-27) 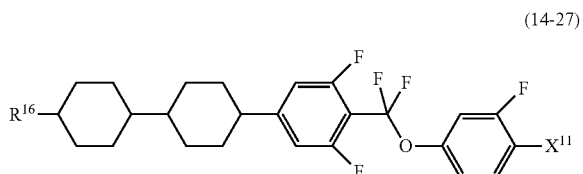
(14-28) 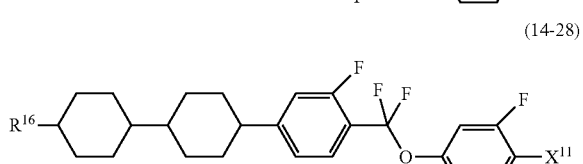
(14-29) 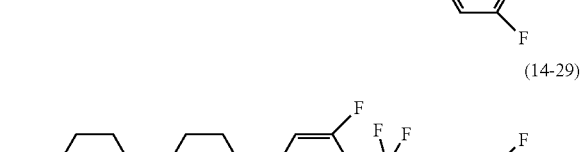
(14-30) 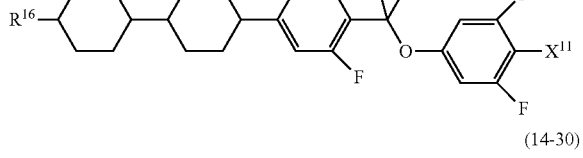

(14-31)
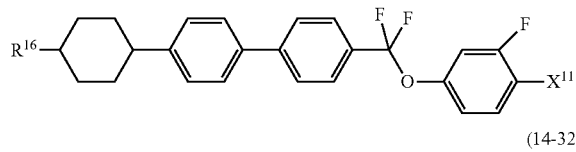
(14-32)
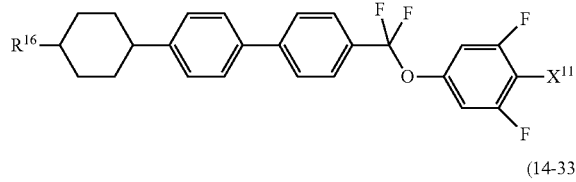
(14-33)
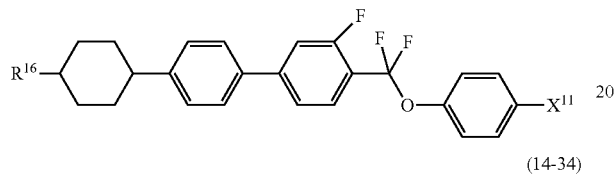
(14-34)
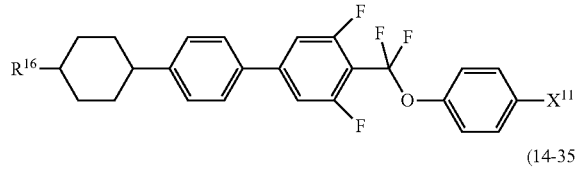
(14-35)
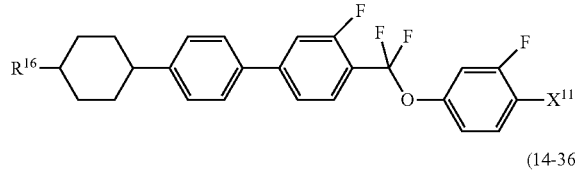
(14-36)
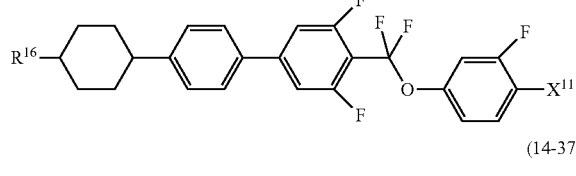
(14-37)
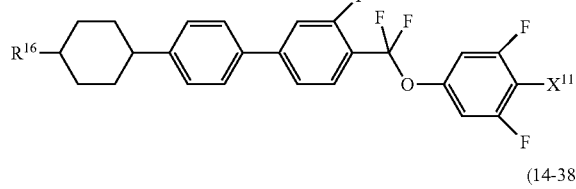
(14-38)
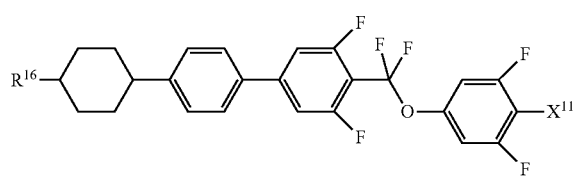
(14-39)
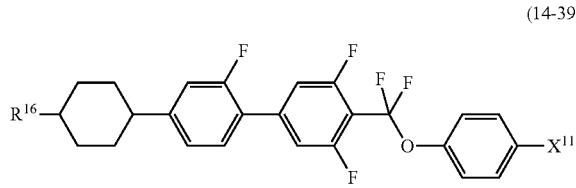
(14-40)
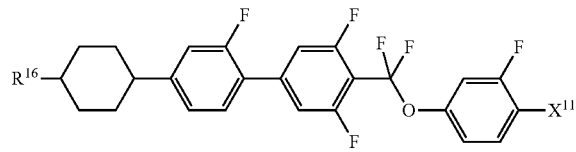
(14-41)
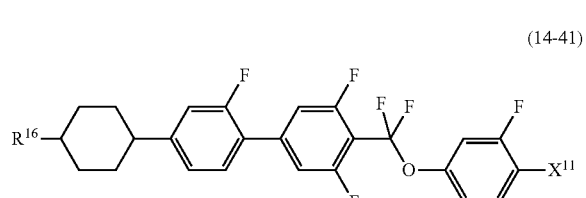
(14-42)
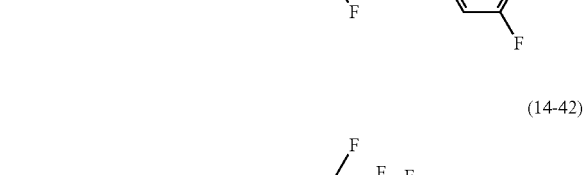
(14-43)
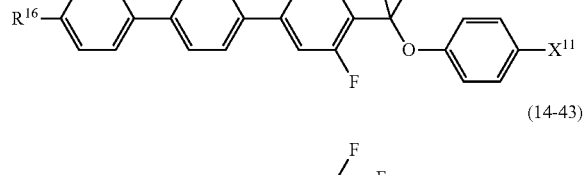
(14-44)
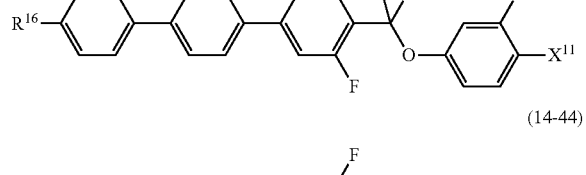
(14-45)
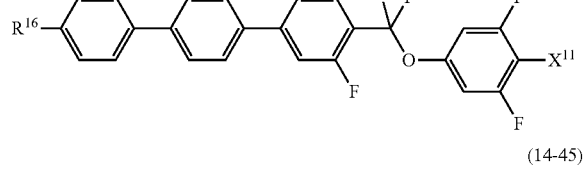
(14-46)
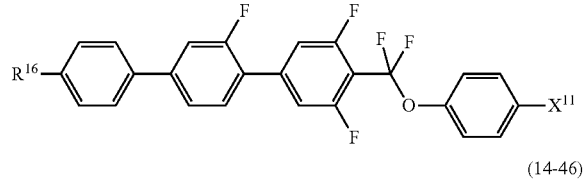
(14-47)
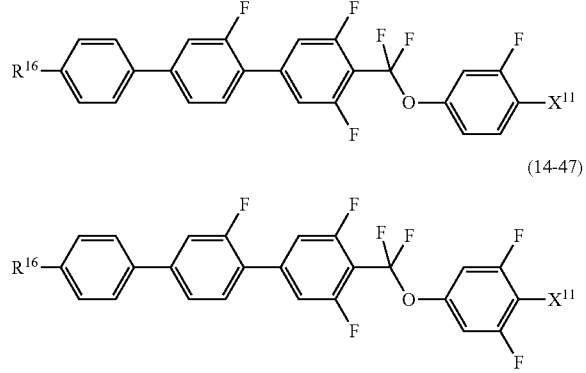

(14-48) 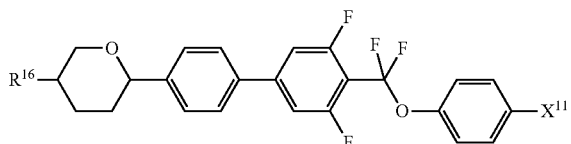

(14-49) 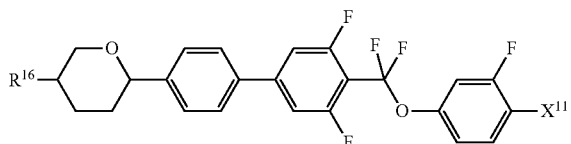

(14-50) 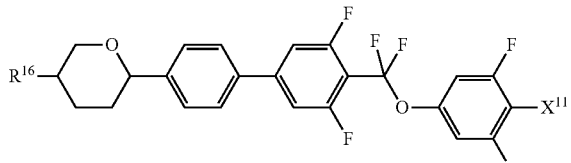

(14-51) 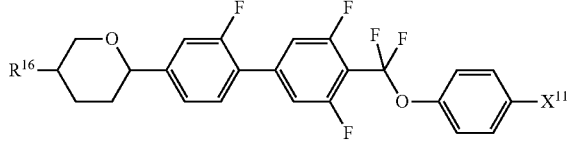

(14-52) 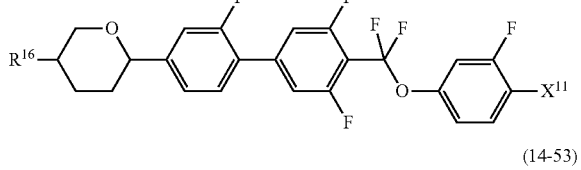

(14-53) 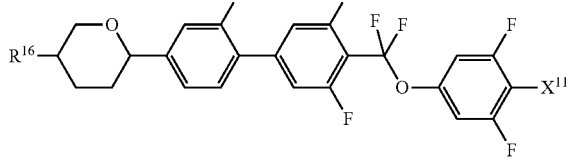

(14-54) 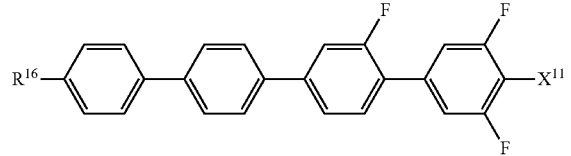

(14-55) 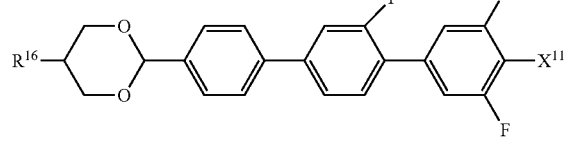

(14-56) 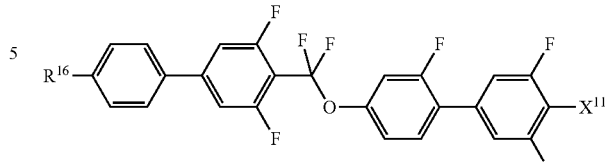

(14-57) 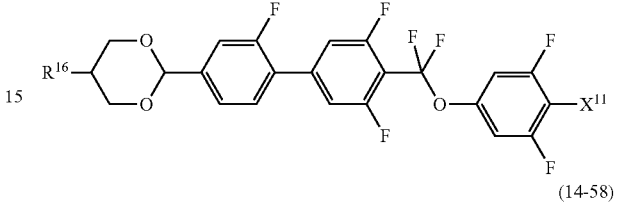

(14-58) 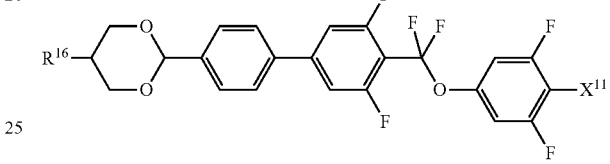

Since Component (d) has positive dielectric anisotropy and very favorable stability with respect to heat and light, it is used to prepare a composition for a mode such as IPS, FFS, and OCB. The content of Component (d) is suitably in a range of 1 weight % to 99 weight %, preferably in a range of 10 weight % to 97 weight %, and more preferably in a range of 40 weight % to 95 weight % on the basis of the weight of the liquid crystal composition. When Component (d) is added to a composition having negative dielectric anisotropy, the content of Component (d) is preferably 30 weight % or less. When Component (d) is added, it is possible to adjust an elastic constant of the composition and adjust a voltage-transmittance curve of the element Component (e) is Compound (15) in which the right terminal group is —C≡N or —C≡C—C≡N. Preferable examples of Component (e) include Compounds (15-1) to (15-64). In these compounds, $R^{17}$ is an alkyl group having 1 to 10 carbon atoms or an alkenyl group having 2 to 10 carbon atoms, and in these alkyl and alkenyl groups, at least one —CH$_2$— is optionally substituted with —O—, and in these groups, at least one hydrogen atom is optionally substituted with fluorine. $X^{12}$ is —C≡N or —C≡C—C≡N.

(15-1) 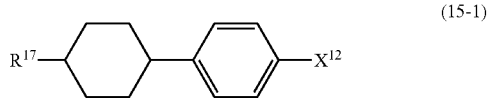

(15-2) 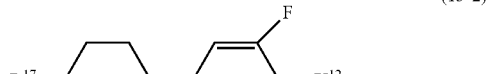

(15-3) 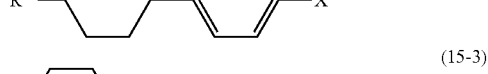

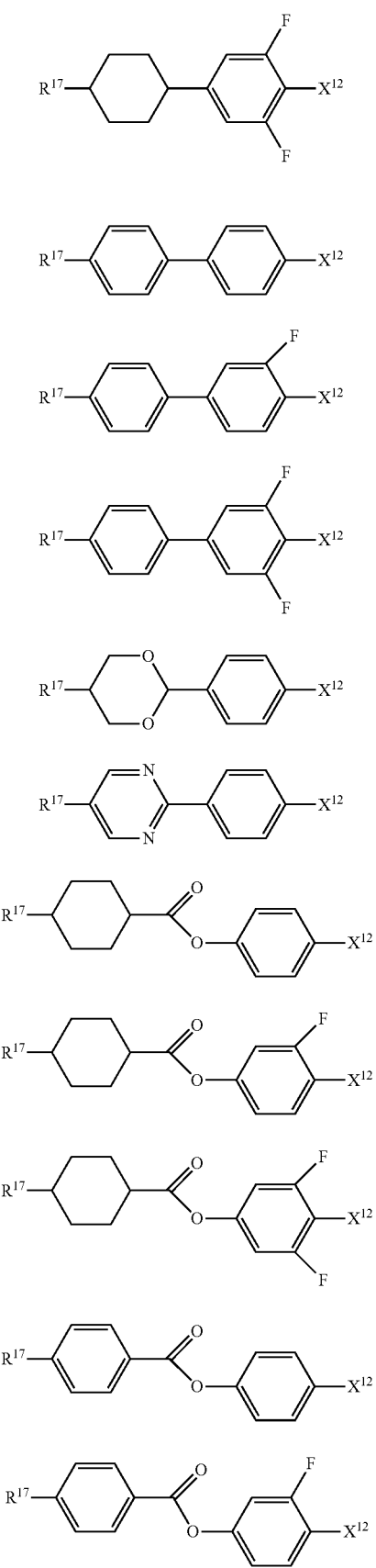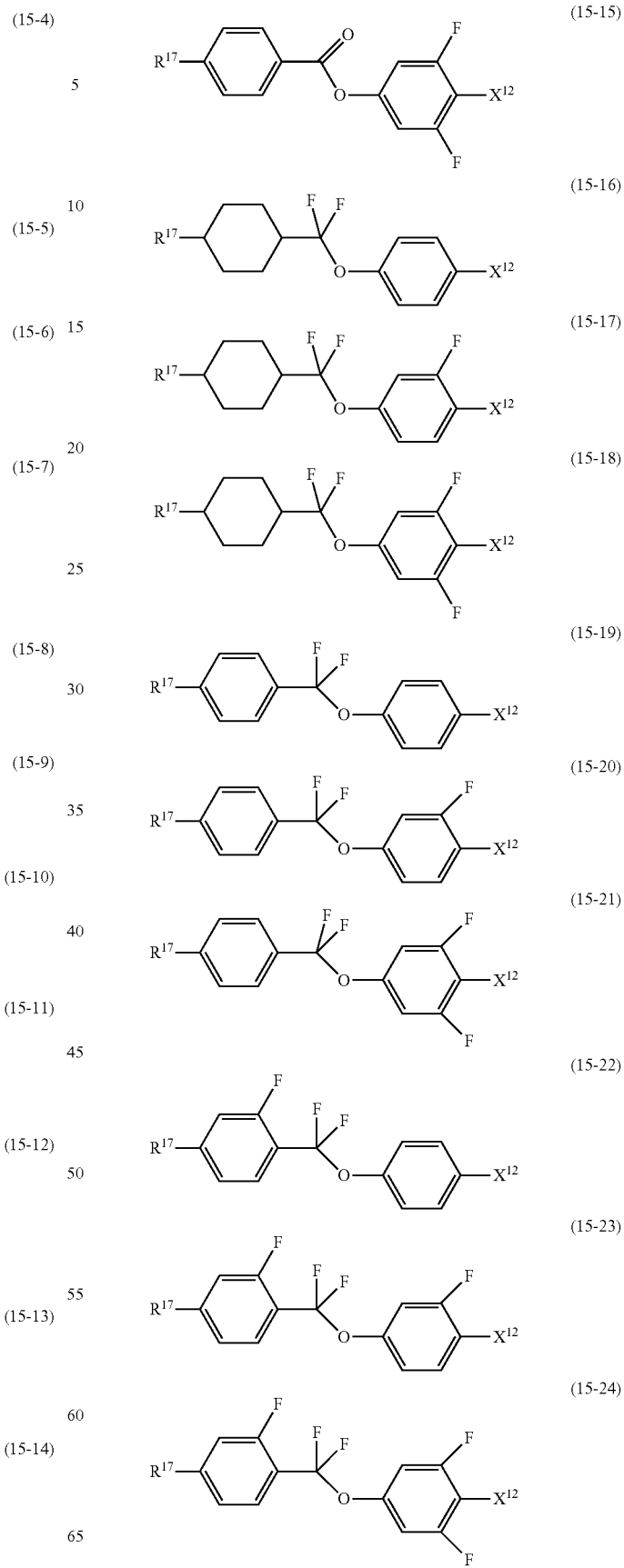

-continued (15-25) through (15-45): chemical structures with labels $R^{17}$ and $X^{12}$.

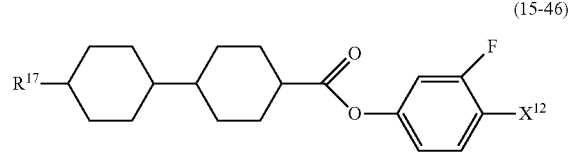
(15-46)
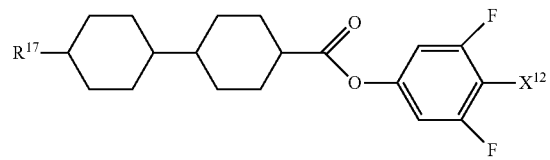
(15-47)
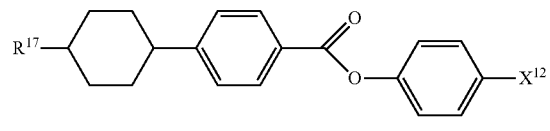
(15-48)
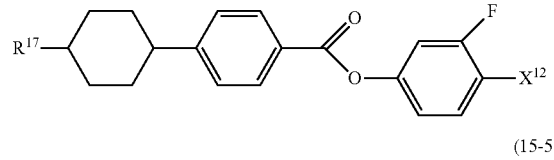
(15-49)
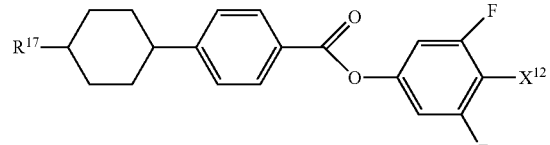
(15-50)
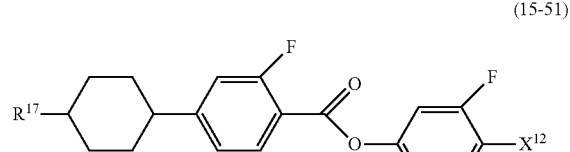
(15-51)
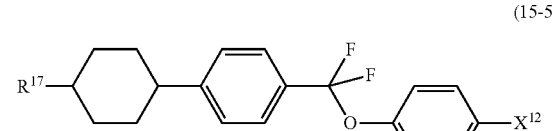
(15-52)
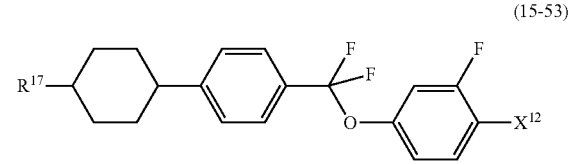
(15-53)
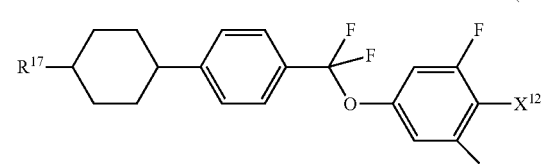
(15-54)
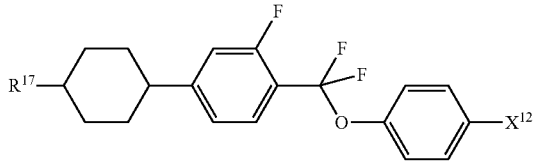
(15-55)
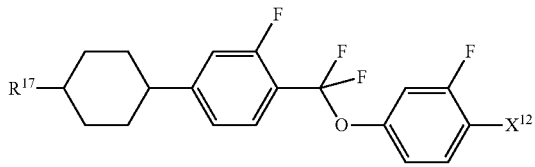
(15-56)
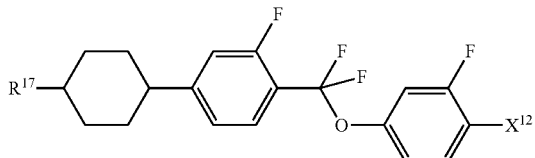
(15-57)
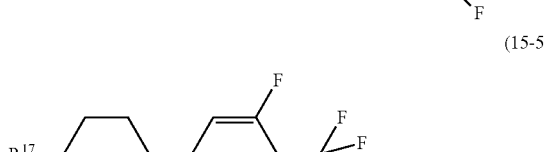
(15-58)
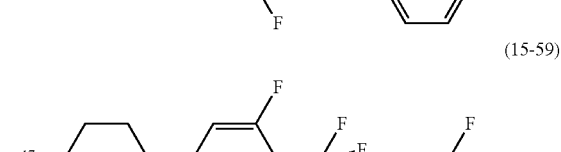
(15-59)
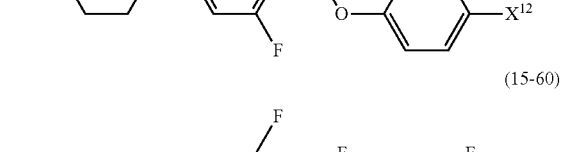
(15-60)
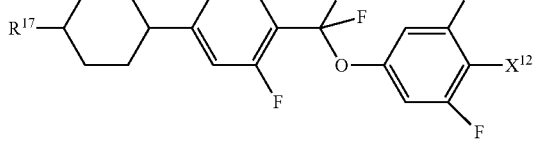
(15-61)
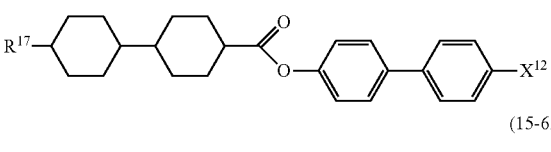
(15-62)
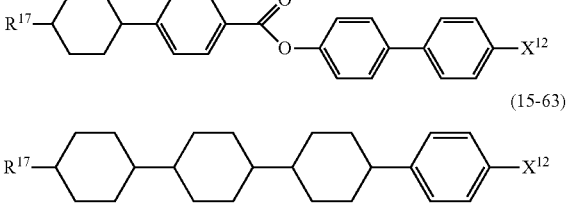
(15-63)

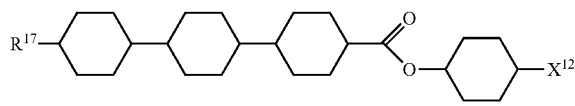

(15-64)

Since Component (e) has positive dielectric anisotropy and its value is large, it is used to prepare a composition for a mode such as TN. When Component (e) is added, it is possible to increase the dielectric anisotropy of the composition. Component (e) has an effect of widening a temperature range of the liquid crystal phase, adjusting the viscosity, or adjusting the optical anisotropy. Component (e) is also beneficial for adjusting a voltage-transmittance curve of the element.

When a composition for a mode such as TN is prepared, the content of Component (e) is suitably in a range of 1 weight % to 99 weight %, preferably in a range of 10 weight % to 97 weight %, and more preferably in a range of 40 weight % to 95 weight % on the basis of the weight of the liquid crystal composition. When Component (e) is added to a composition having negative dielectric anisotropy, the content of Component (e) is preferably 30 weight % or less. When Component (e) is added, it is possible to adjust an elastic constant of the composition and adjust a voltage-transmittance curve of the element.

When compounds that are appropriately selected from among the above Components (b) to (e) and Compound (1) are combined, it is possible to prepare a liquid crystal composition that has at least one of physical properties such as high stability with respect to heat and light, a high upper limit temperature, a low lower limit temperature, a low viscosity, suitable optical anisotropy (that is, large optical anisotropy or small optical anisotropy), large positive or negative dielectric anisotropy, large specific resistance, and a suitable elastic constant (that is, a large elastic constant or a small elastic constant). An element including such a composition has a wide temperature range in which the element can be used, a short response time, a large voltage holding ratio, a low threshold voltage, a large contrast ratio, a low flicker rate, and a prolonged lifespan.

When the element is used for a long time, flicker may occur on a display screen. The flicker rate (%) can be represented as (luminance when positive voltage is applied—luminance when negative voltage is applied)/average luminance)×100. An element having a flicker rate in a range of 0% to 1% is less likely to cause flicker on the display screen even if the element is used for a long time. This flicker is related to image burning, and is assumed to be caused by a potential difference between a positive frame and a negative frame when the element is driven by an alternating current. A composition including Compound (1) is also beneficial for reducing the occurrence of flicker.

3-2. Additives

A liquid crystal composition is prepared by a known method. For example, component compounds are mixed, heated and dissolved together. According to applications, an additive may be added to this composition. Examples of the additive include a polymerizable compound, a polymerization initiator, a polymerization inhibitor, an optically active compound, an antioxidant, a UV absorber, a light stabilizer, a heat stabilizer, a dye, and an antifoaming agent. Such additives are well-known to those skilled in the art and described in documents.

In a liquid crystal display element having a polymer sustained alignment (PSA) mode, the composition includes a polymer. The polymerizable compound is added in order to form a polymer in the composition. While a voltage is applied between electrodes, when ultraviolet rays are emitted and the polymerizable compound is polymerized, the polymer is formed in the composition. According to this method, since a suitable pre-tilt is achieved, an element in which a response time is shortened and image burning is ameliorated is produced.

Preferable examples of the polymerizable compound include an acrylate, a methacrylate, a vinyl compound, a vinyloxy compound, propenyl ether, an epoxy compound (oxirane, oxetane), and vinyl ketone. More preferable examples include a compound having at least one acryloyloxy group and a compound having at least one methacryloyloxy group. Still more preferable examples include a compound having both an acryloyloxy group and a methacryloyloxy group.

More preferable examples include Compounds (M-1) to (M-18). In these compounds, $R^{25}$ to $R^{31}$ are independently hydrogen or a methyl group; $R^{32}$, $R^{33}$, and $R^{34}$ are independently hydrogen or an alkyl group having 1 to 5 carbon atoms, at least one of $R^{32}$, $R^{33}$, and $R^{34}$ is an alkyl group having 1 to 5 carbon atoms; v, w, and x are independently 0 or 1; u and y are independently an integer of 1 to 10. $L^{21}$ to $L^{26}$ are independently hydrogen or fluorine; $L^{27}$ and $L^{28}$ are independently hydrogen, fluorine, or a methyl group.

(M-1)

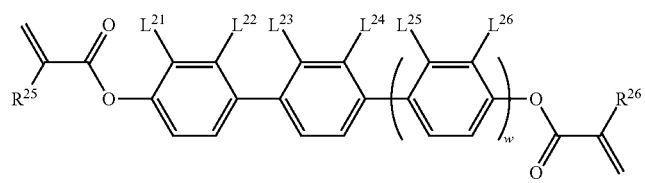

(M-2)

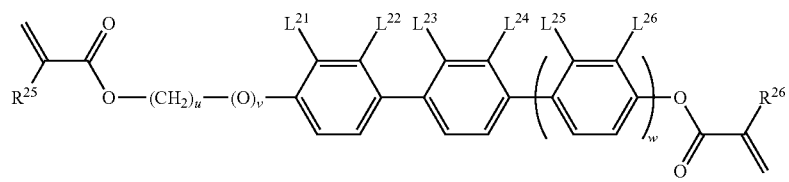

-continued
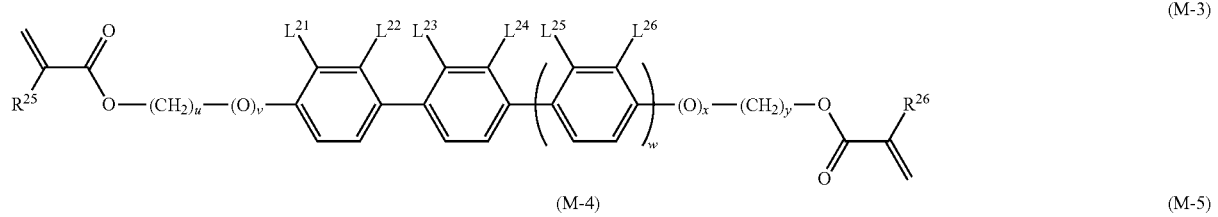
(M-3)
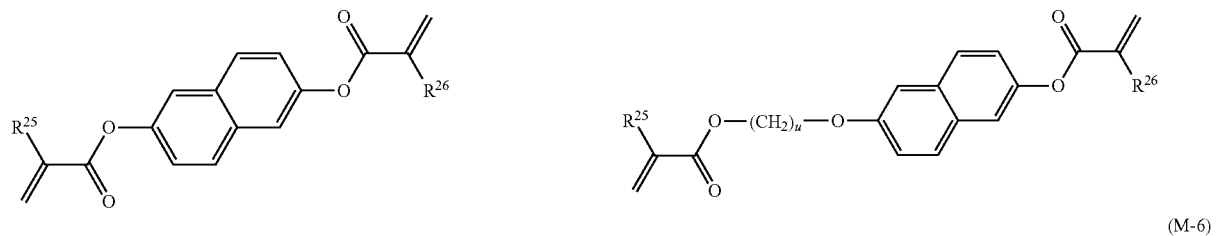
(M-4) (M-5)
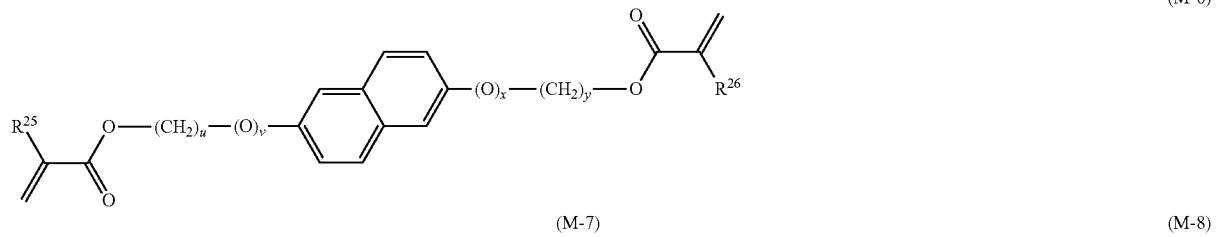
(M-6)
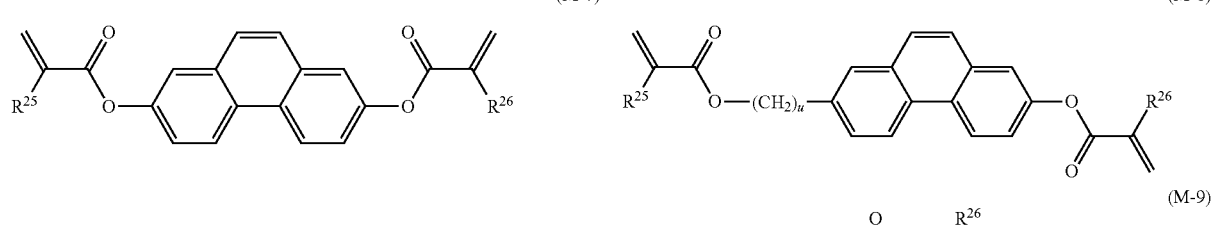
(M-7) (M-8)
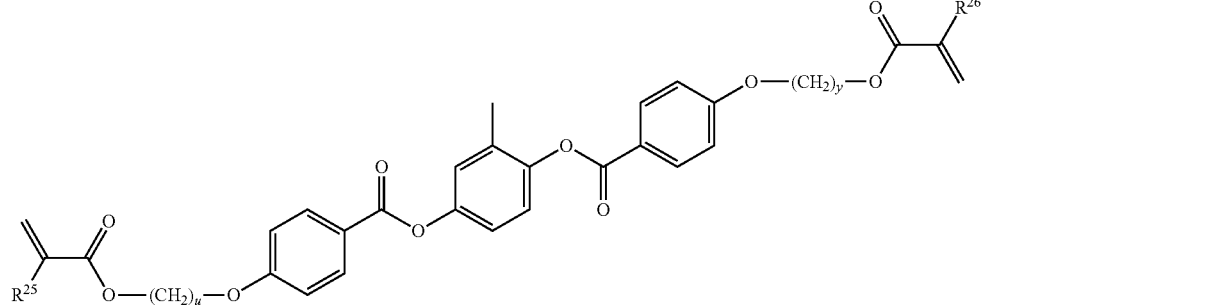
(M-9)
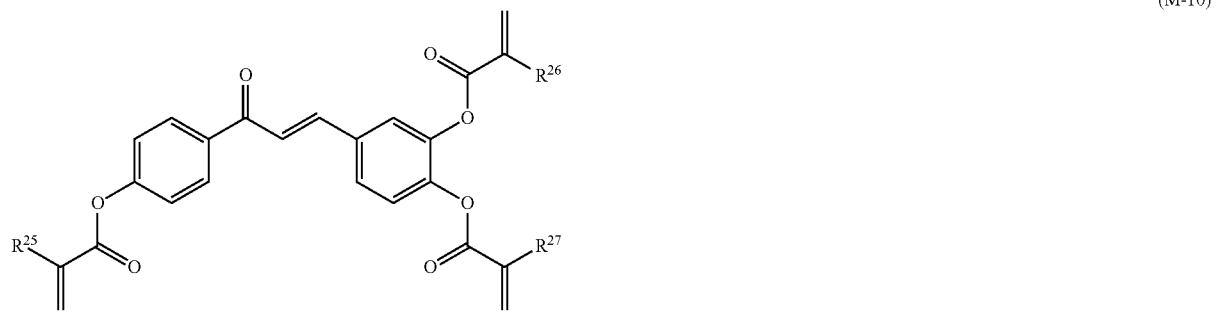
(M-10)
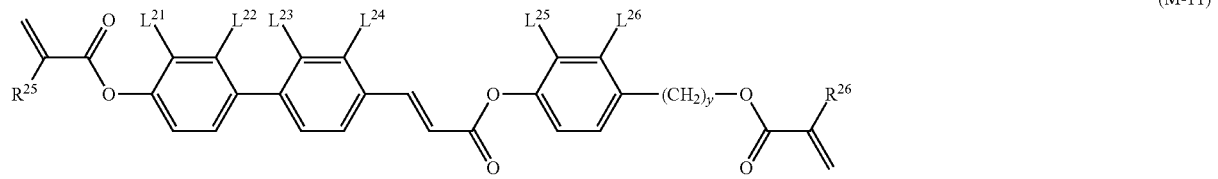
(M-11)

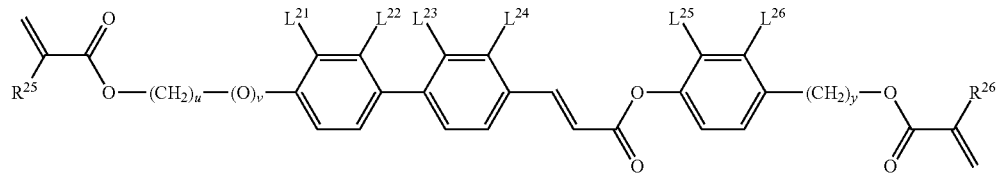
(M-12)

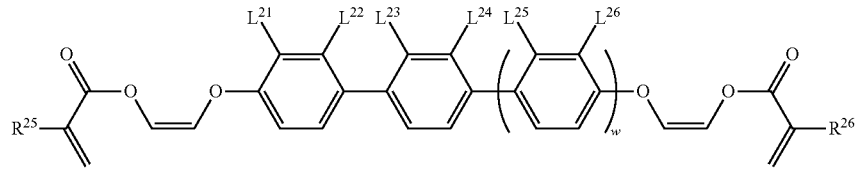
(M-13)

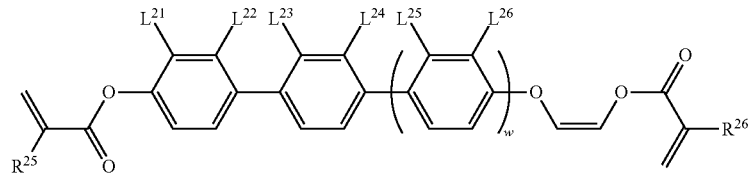
(M-14)

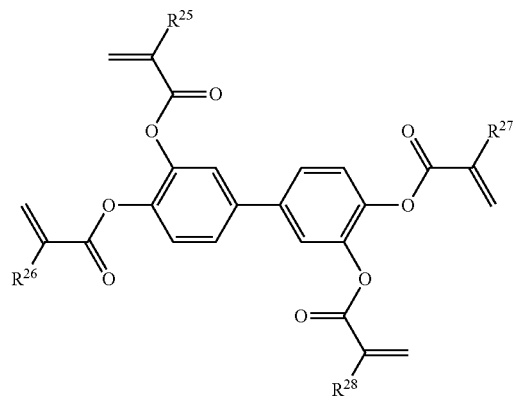
(M-15)

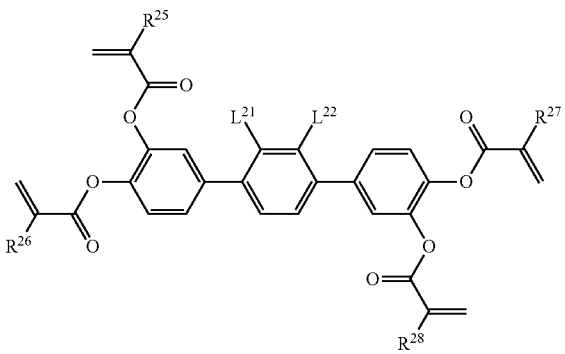
(M-16)

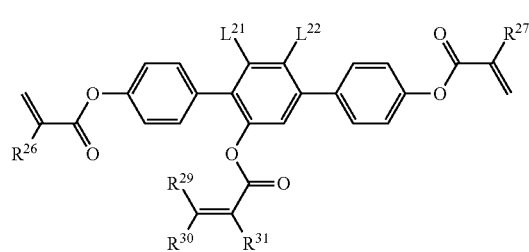
(M-17)

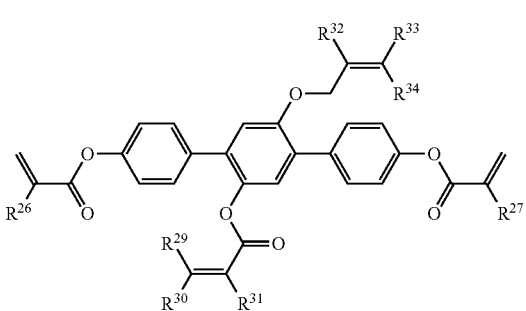
(M-18)

The polymerizable compound can be polymerized rapidly by adding a polymerization initiator. When reaction conditions are optimized, it is possible to reduce an amount of the polymerizable compound remaining. Examples of a photoradical polymerization initiator include Darocur series TPO, 1173, and 4265, and Irgacure series 184, 369, 500, 651, 784, 819, 907, 1300, 1700, 1800, 1850, and 2959 which are commercially available from BASF.

Additional examples of the photoradical polymerization initiator include 4-methoxyphenyl-2,4-bis(trichloromethyl) triazine, 2-(4-butoxystyryl)-5-trichloromethyl-1,3,4-oxadiazole, 9-phenylacridine, 9,10-benzphenazine, a benzophenone/Michler's ketone mixture, a hexaarylbiimidazole/mercaptobenzimidazole mixture, 1-(4-isopropylphenyl)-2-hydroxy-2-methylpropan-1-one, benzyldimethylketal, 2-methyl-1-[4-(methylthio)phenyl]-2-morpholinopropan-1-one, 2,4-diethyl xanthone/methyl p-dimethylaminobenzoate mixture, and a benzophenone/methyltriethanolamine mixture.

After a photoradical polymerization initiator is added to the liquid crystal composition, ultraviolet rays are emitted while an electric field is applied, and thus polymerization can be performed. However, unreacted polymerization initiator or decomposition products of a polymerization initiator may cause display defects such as image burning in the element. In order to prevent this, photopolymerization may be performed without adding a polymerization initiator. A preferable wavelength of light to be emitted is in a range of 150 nm to 500 nm. A more preferable wavelength is in a range of 250 nm to 450 nm, and a most preferable wavelength is in a range of 300 nm to 400 nm.

When the polymerizable compound is stored, a polymerization inhibitor may be added in order to prevent polymerization. Generally, the polymerizable compound is added to the composition when the polymerization inhibitor has not been removed. Examples of the polymerization inhibitor include hydroquinone, hydroquinone derivatives such as methyl hydroquinone, 4-t-butyl catechol, 4-methoxyphenol, and phenothiazine.

The optically active compound has an effect of inducing a helical structure in liquid crystal molecules, imparting a required helix angle, and thus preventing reverse twist. When the optically active compound is added, it is possible to adjust a helical pitch. Two or more optically active compounds may be added in order to adjust temperature dependence of the helical pitch. Preferable examples of the optically active compound include the following Compounds (Op-1) to (Op-18). In Compound (Op-18), ring J is 1,4-cyclohexylene or 1,4-phenylene, and $R^{28}$ is an alkyl group having 1 to 10 carbon atoms. The symbol * indicates an asymmetric carbon atom.

(Op-1)

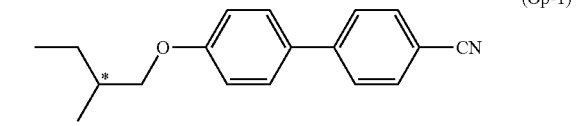

(Op-2)

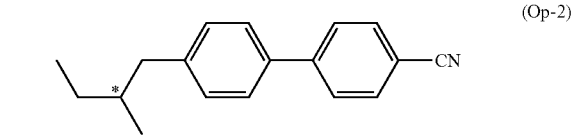

(Op-3)

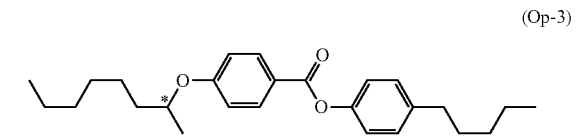

(Op-4)

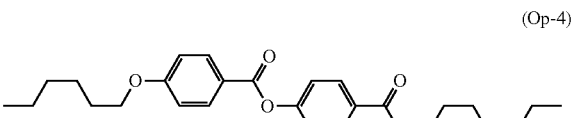

(Op-5)

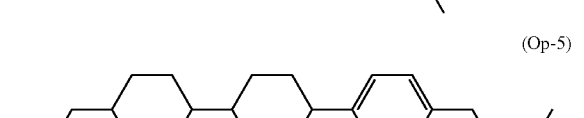

(Op-6)

-continued (Op-7)

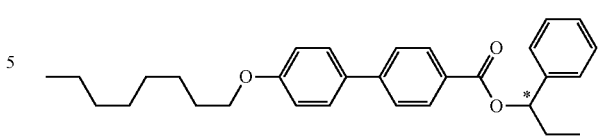

(Op-8)

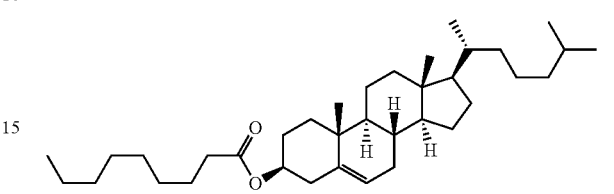

(Op-9)

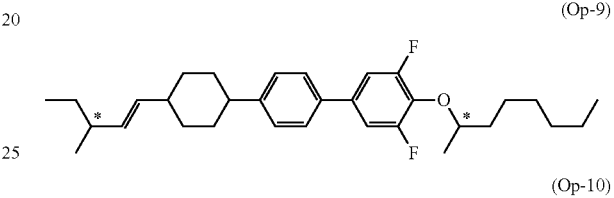

(Op-10)

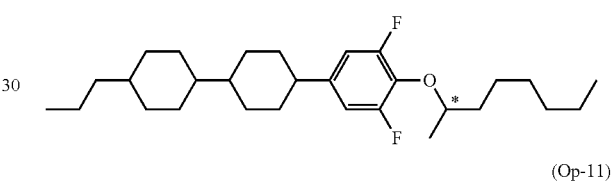

(Op-11)

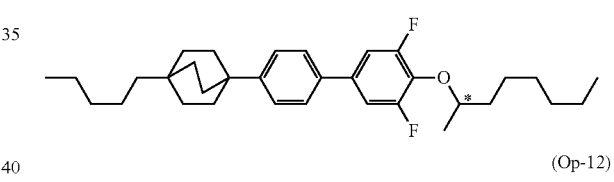

(Op-12)

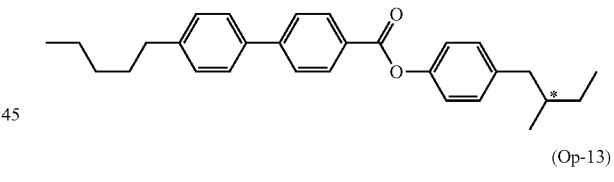

(Op-13)

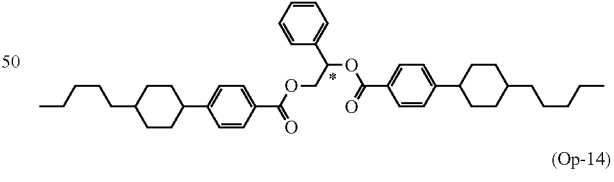

(Op-14)

(Op-15)

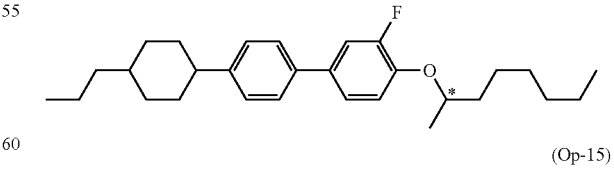

-continued

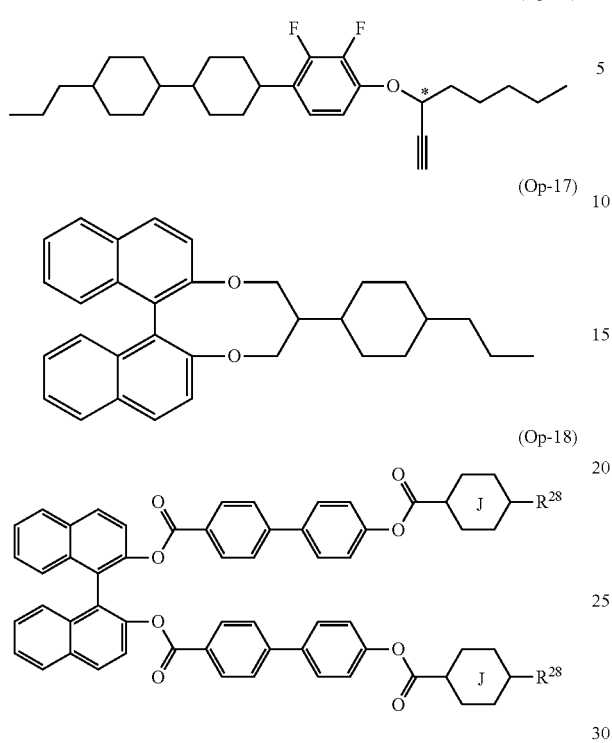

The antioxidant is effective for maintaining a large voltage holding ratio. Preferable examples of the antioxidant include the following Compounds (AO-1) and (AO-2); Irganox 415, Irganox 565, Irganox 1010, Irganox 1035, Irganox 3114, and Irganox 1098 (product name; commercially available from BASF). The UV absorber is effective for preventing the upper limit temperature from decreasing. Preferable examples of the UV absorber include benzophenone derivatives, benzoate derivatives, and triazole derivatives, and specific examples include the following Compounds (AO-3) and (AO-4); Tinuvin 329, Tinuvin P, Tinuvin 326, Tinuvin 234, Tinuvin 213, Tinuvin 400, Tinuvin 328, and Tinuvin 99-2 (product name; commercially available from BASF); and 1,4-diazabicyclo[2.2.2]octane (DABCO).

The light stabilizer such as a sterically hindered amine is preferably used to maintain a large voltage holding ratio. Preferable examples of the light stabilizer include the following Compounds (AO-5), (AO-6), and (AO-7); Tinuvin 144, Tinuvin 765, and Tinuvin 770DF (product name; commercially available from BASF); LA-77Y and LA-77G (product name; commercially available from ADEKA). The heat stabilizer is also effective for maintaining a large voltage holding ratio, and preferable examples thereof include Irgafos 168 (product name; commercially available from BASF). In order to adapt the composition to an element in a guest host (GH) mode, a dichroic dye such as an azo type dye or an anthraquinone type dye is added to the composition. The antifoaming agent is effective for preventing foaming. Preferable examples of the antifoaming agent include dimethyl silicone oil and methylphenyl silicone oil.

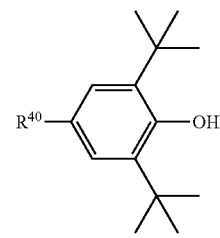
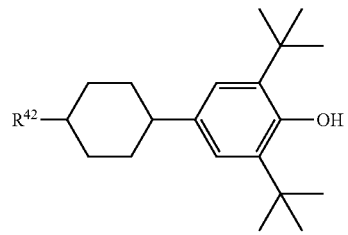
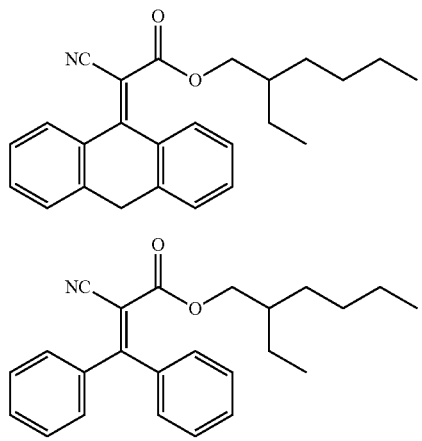
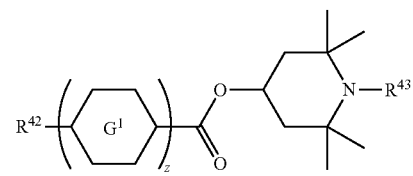
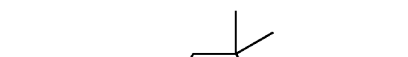
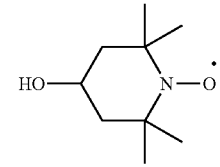
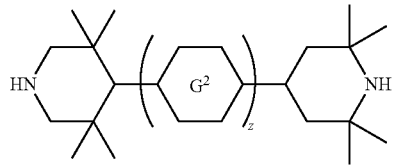

In Compound (AO-1), $R^{40}$ is an alkyl group having 1 to 20 carbon atoms, an alkoxy group having 1 to 20 carbon atoms, —COOR$^{41}$, or —CH$_2$CH$_2$COOR$^{41}$, here $R^{41}$ is an alkyl group having 1 to 20 carbon atoms. In Compounds (AO-2) and (AO-5), $R^{42}$ is an alkyl group having 1 to 20 carbon atoms. In Compound (AO-5), $R^{43}$ is hydrogen, a methyl group or O. (oxygen radical); ring $G^1$ is 1,4-cyclohexylene or 1,4-phenylene; in Compound (AO-7), ring $G^2$ is 1,4-cyclohexylene, 1,4-phenylene, or 1,4-phenylene in which at least one hydrogen atom is substituted with fluorine; in Compounds (AO-5) and (AO-7), z is 1, 2, or 3.

4. Liquid Crystal Display Element

The liquid crystal composition has an operation mode such as PC, TN, STN, OCB, and PSA, and can be used for a liquid crystal display element that is driven by an active matrix method. This composition has an operation mode such as PC, TN, STN, OCB, VA, and IPS, and can also be used for a liquid crystal display element that is driven by a passive matrix method. These elements can be applied to any type of a reflective type, a transmission type, and a semi-transmission type.

This composition is also suitable for a nematic curvilinear aligned phase (NCAP) element, and here, the composition is microencapsulated. This composition can also be used for a polymer dispersion type liquid crystal display element (PDLCD) and a polymer network liquid crystal display element (PNLCD). In these compositions, a large amount of the polymerizable compound is added. On the other hand, when a proportion of the polymerizable compound is 10 weight % or less on the basis of the weight of the liquid crystal composition, a liquid crystal display element in a PSA mode is produced. A preferable proportion is in a range of 0.1 weight % to 2 weight %. A more preferable proportion is in a range of 0.2 weight % to 1.0 weight %. An element in a PSA mode can be driven by a driving method such as an active matrix method and a passive matrix method. Such an element can be applied to any type of a reflective type, a transmission type, and a semi-transmission type.

EXAMPLES

1. Examples of Compound (1)

The disclosure will be described in further detail with reference to examples. Since the examples are typical examples, the disclosure is not limited by the examples. Compound (1) was synthesized by the following procedures. The synthesized compounds were identified by a method such as NMR analysis. Physical properties of compounds and compositions and characteristics of elements were measured by the following methods.

NMR analysis: a DRX-500 (commercially available from Bruker BioSpin) was used for measurement. In $^1$H-NMR measurement, a sample was dissolved in a deuterated solvent such as $CDCl_3$ and measurement was performed under conditions of room temperature and 500 MHz with a cumulative number of 16 measurements. Tetramethylsilane was used as an internal reference. In $^{19}$F-NMR measurement, $CFCl_3$ was used as an internal reference and a cumulative number of measurements was 24. In the explanation of nuclear magnetic resonance spectrums, s is singlet, d is doublet, t is triplet, q is quartet, quin is quintet, sex is sextet, m is multiplet, and br is broad.

Gas chromatographic analysis: A GC-2010 type gas chromatography instrument (commercially available from Shimadzu Corporation) was used for measurement. As a column, a capillary column DB-1 (commercially available from Agilent Technologies Inc, with a length of 60 m, an inner diameter of 0.25 mm, and a film thickness of 0.25 μm) was used. Helium (1 mL/min) was used as a carrier gas. A temperature of a sample vaporization chamber was set to 300° C., and a temperature of a detector (FID) was set to 300° C. A sample was dissolved in acetone to prepare a 1 weight % solution, and 1 μl of the obtained solution was injected into the sample vaporization chamber. As a recorder, a GCSolution system (commercially available from Shimadzu Corporation) was used.

Gas chromatograph mass spectrometry: A QP-2010Ultra type gas chromatography mass spectrometer (commercially available from Shimadzu Corporation) was used for measurement. As a column, a capillary column DB-1 (commercially available from Agilent Technologies Inc, with a length of 60 m, an inner diameter of 0.25 mm, and a film thickness of 0.25 μm) was used. Helium (1 ml/min) was used as a carrier gas. A temperature of a sample vaporization chamber was set to 300° C., a temperature of an ion source was set to 200° C., an ionization voltage was set to 70 eV, and an emission current was set to 150 uA. A sample was dissolved in acetone to prepare a 1 weight % solution, and 1 μl of the obtained solution was injected into the sample vaporization chamber. As a recorder, a GCMSsolution system (commercially available from Shimadzu Corporation) was used.

HPLC analysis: a Prominence (LC-20AD; SPD-20A, commercially available from Shimadzu Corporation) was used for measurement. As a column, a YMC-Pack ODS-A (with a length of 150 mm, an inner diameter of 4.6 mm, and a particle size of 5 commercially available from YMC Co., Ltd.) was used. As an eluent, acetonitrile and water were appropriately mixed and used. As a detector, a UV detector, an RI detector, a CORONA detector, or the like was appropriately used. When a UV detector was used, a detection wavelength was set to 254 nm. A sample was dissolved in acetonitrile to prepare a 0.1 weight % solution and 1 μL of the solution was introduced into a sample chamber. As a recorder, a C-R7Aplus (commercially available from Shimadzu Corporation) was used.

UV-visible spectroscopic analysis: a PharmaSpec UV-1700 (commercially available from Shimadzu Corporation) was used for measurement. A detection wavelength of 190 nm to 700 nm was set. A sample was dissolved in acetonitrile to prepare a 0.01 mmol/L solution, and put into a quartz cell (optical path length of 1 cm) for measurement.

Measurement sample: When a phase structure and a transition temperature (a clearing point, a melting point, a polymerization initiation temperature, etc.) were measured, a compound itself was used as a sample. When physical properties such as an upper limit temperature of a nematic phase, a viscosity, optical anisotropy, and dielectric anisotropy were measured, a mixture of a compound and a mother liquid crystal was used as a sample.

When a sample in which a compound was mixed with a mother liquid crystal was used, measurement was performed as follows. 15 weight % of a compound and 85 weight % of a mother liquid crystal were mixed to prepare a sample. An extrapolation value was computed from measured values of this sample according to the following equation and this value was stated.

<Extrapolation value>=(100×<measured value of sample>−<weight % of mother liquid crystal>×<measured value of mother liquid crystal>)/<weight % of compound>

When a crystal (or a smectic phase) was precipitated at 25° C. at this proportion, a ratio between the compound and the mother liquid crystal was changed to 10 weight %:90 weight %, 5 weight %:95 weight %, and 1 weight %:99 weight % in that order, and physical properties of the sample at a proportion at which no crystals (or a smectic phase) precipitated at 25° C. were measured. Here, unless otherwise specified, a ratio between the compound and the mother liquid crystal was 15 weight %:85 weight %.

When the dielectric anisotropy of the compound was zero or positive, the following mother liquid crystal (A) was used. Proportions of components are expressed as weight %.

| | |
|---|---|
| C$_3$H$_7$—〈cyclohexyl〉—〈phenyl〉—CN | 24% |
| C$_5$H$_{11}$—〈cyclohexyl〉—〈phenyl〉—CN | 36% |
| C$_7$H$_{15}$—〈cyclohexyl〉—〈phenyl〉—CN | 25% |
| C$_5$H$_{11}$—〈cyclohexyl〉—〈phenyl〉—〈phenyl〉—CN | 15% |

When the dielectric anisotropy of the compound was zero or negative, the following mother liquid crystal (B) was used. Proportions of components are expressed as weight %.

| | |
|---|---|
| C$_3$H$_7$—〈cyclohexyl〉—COO—〈phenyl〉—OC$_2$H$_5$ | 17.2% |
| C$_3$H$_7$—〈cyclohexyl〉—COO—〈phenyl〉—OC$_4$H$_9$ | 27.6% |
| C$_4$H$_9$—〈cyclohexyl〉—COO—〈phenyl〉—OC$_2$H$_5$ | 20.7% |
| C$_5$H$_{11}$—〈cyclohexyl〉—COO—〈phenyl〉—OCH$_3$ | 20.7% |
| C$_5$H$_{11}$—〈cyclohexyl〉—COO—〈phenyl〉—OC$_2$H$_5$ | 13.8% |

Measurement method: Physical properties were measured by the following methods. Most of these are described in JEITA standards (JEITA.ED-2521B) discussed and established by the Japan Electronics and Information Technology Industries Association (JEITA). Modified methods were also used. No thin film transistor (TFT) was attached to a TN element used for measurement.

(1) Phase structure: A sample was placed on a hot plate (FP-52 type hot stage commercially available from Mettler) of a melting point measuring device including a polarization microscope. While this sample was heated at a speed of 3° C./min, a phase state and a change thereof were observed under a polarization microscope, and a type of the phase was identified.

(2) Transition temperature (° C.): A scanning calorimeter (commercially available from PerkinElmer) and a Diamond DSC system or a high sensitivity differential scanning calorimeter X-DSC7000 (commercially available from SII NanoTechnology Inc.) were used for measurement. The temperature of the sample was raised or lowered at a speed of 3° C./min, a starting point of an endothermic peak or an exothermic peak according to a phase change in the sample was obtained by extrapolation, and a transition temperature was determined. A melting point and a polymerization initiation temperature of the compound were measured using this device. A temperature at which the compound transitions from a solid phase to a liquid crystal phase such as a smectic phase or a nematic phase may be abbreviated as a "lower limit temperature of a liquid crystal phase." A temperature at which the compound transitions from a liquid crystal phase to a liquid phase may be abbreviated as a "clearing point."

A crystal is represented as C. When two types of crystal are distinguished, they are denoted as $C_1$ and $C_2$. The smectic phase is represented by S and the nematic phase is represented as N. When phases are distinguished as a smectic A phase, a smectic B phase, a smectic C phase, and a smectic F phase, they are represented as $S_A$, $S_B$, $S_C$, and $S_F$, respectively. A liquid (isotropic) is represented as I. The transition temperature is expressed as, for example, "C 50.0 N 100.0 I." This indicates that a transition temperature from a crystal to a nematic phase is 50.0° C., and a transition temperature from a nematic phase to a liquid is 100.0° C.

(3) Compatibility of compound: A mother liquid crystal and a compound were mixed such that a proportion of the compound was 20 weight %, 15 weight %, 10 weight %, 5 weight %, 3 weight %, or 1 weight % and thereby a sample was prepared. The sample was put into a glass bottle, and stored in a freezing chamber at −10° C. or −20° C. for a certain time. It was observed whether a nematic phase of the sample was maintained or a crystal (or a smectic phase) precipitated. Conditions in which a nematic phase was maintained were used as a measure of compatibility. A proportion of the compound and the temperature of the freezing chamber were changed as necessary.

(4) Upper limit temperature ($T_{NI}$ or NI; ° C.) of nematic phase: A sample was placed on a hot plate of a melting point measuring device including a polarization microscope and heated at a speed of 1° C./min. A temperature at which a part of the sample changed from a nematic phase to an isotropic liquid was measured. When a sample was a mixture of Compound (1) and a mother liquid crystal, the sample is indicated by a symbol $T_{NI}$. When a sample is a mixture of Compound (1) and a compound selected from among Compounds (2) to (15), the sample is indicated by a symbol NI. An upper limit temperature of the nematic phase may be abbreviated as an "upper limit temperature."

(5) Lower limit temperature ($T_C$; ° C.) of nematic phase: A sample having a nematic phase was put into a glass bottle and stored in a freezer at 0° C., −10° C., −20° C., −30° C., and −40° C. for 10 days, and then a liquid crystal phase was observed. For example, when the sample remained in a nematic phase at −20° C., and changed to a crystal or a smectic phase at −30° C., $T_C$ is described as <−20° C. A lower limit temperature of the nematic phase may be abbreviated as a "lower limit temperature."

(6) Viscosity (bulk viscosity; η; measured at 20° C.; mPa·s): An E type rotational viscometer (commercially available from Tokyo Keiki) was used for measurement.

(7) Optical anisotropy (refractive index anisotropy; measured at 25° C.; Δn):

Measurement was performed by an Abbe refractometer in which a polarizing plate was attached to an eyepiece using light with a wavelength of 589 nm. A surface of a main prism was rubbed in one direction and the sample was then added dropwise onto a main prism. A refractive index (n∥) was measured when a direction of polarized light was parallel to a rubbing direction. A refractive index (n⊥) was measured when a direction of polarized light was perpendicular to a rubbing direction. A value of optical anisotropy (Δn) was calculated from the equation Δn=n∥−n⊥.

(8) Specific resistance (ρ; measured at 25° C.; Ωcm): 1.0 mL of a sample was injected into a container including an electrode. A DC voltage (10 V) was applied to this container and a direct current was measured after 10 seconds. A specific resistance was computed from the following equation. (Specific resistance)={(voltage)×(electric capacitance of container)}/{(direct current)×(dielectric constant of vacuum)}.

(9) Voltage holding ratio (VHR-1; measured at 25° C.; %): A TN element used for measurement included a polyimide alignment film, and an interval (cell gap) between two glass substrates was 5 μm. This element was sealed with an adhesive that was cured with ultraviolet rays after the sample was inserted. A pulse voltage (at 5 V for 60 microseconds) was applied to this element for charging. An attenuating voltage was measured for 16.7 milliseconds by a high-speed voltmeter, and an area A between a voltage curve in a unit cycle and the horizontal axis was obtained. An area B was an area when the voltage was not attenuated. A voltage holding ratio was expressed as a percentage of the area A with respect to the area B.

(10) Voltage holding ratio (VHR-2; measured at 80° C.; %): A voltage holding ratio was measured in the same manner as in the above method except that the voltage holding ratio was measured at 80° C. instead of 25° C. The obtained result was indicated by a symbol VHR-2.

(11) Flicker rate (measured at 25° C.; %): A multimedia display tester 3298F (commercially available from Yokogawa Electric Corporation) was used for measurement. A light source was an LED. An interval (cell gap) between two glass substrates was 3.5 μm, and a sample was inserted into an FFS element in a normally black mode in which a rubbing direction was antiparallel. This element was sealed using an adhesive that was cured with ultraviolet rays. A voltage was applied to this element, and a voltage at which a quantity of light that had passed through the element was a maximum was measured. A sensor part was brought close to the element while the voltage was applied to the element, and a displayed flicker rate was read.

A physical property measurement method was different between a sample having positive dielectric anisotropy and a sample having negative dielectric anisotropy. A measurement method for positive dielectric anisotropy will be described from measurement (12a) to measurement (16a). A measurement method in negative dielectric anisotropy will be described from measurement (12b) to measurement (16b).

(12a) Viscosity (rotational viscosity; γ1; measured at 25° C.; mPa·s; sample with positive dielectric anisotropy): Measurement was performed according to a method described in M. Imai et al., Molecular Crystals and Liquid Crystals, Vol. 259, 37 (1995). A sample was inserted into a TN element in which a twist angle was 0 degrees and an interval (cell gap) between two glass substrates was 5 μm. Voltages from 16 V to 19.5 V were gradually applied at 0.5 V intervals to this element. After no voltage was applied for 0.2 seconds, application was repeated under conditions of one square wave (square pulse; 0.2 seconds) and no voltage application (2 seconds). A peak current and a peak time of a transient current generated by this application were measured. A value of the rotational viscosity was obtained from these measured values and Equation (8) on page 40 in the paper (M. Imai). A value of the dielectric anisotropy necessary for this calculation was obtained by the method described below using an element for which the rotational viscosity was measured.

(12b) Viscosity (rotational viscosity; γ1; measured at 25° C.; mPa·s; sample with negative dielectric anisotropy): Measurement was performed according to a method described in M. Imai et al., Molecular Crystals and Liquid Crystals, Vol. 259, 37 (1995). A sample was inserted into a VA element in which an interval (cell gap) between two glass substrates was 20 μm. Voltages from 39 V to 50 V were gradually applied at 1 V intervals to this element. After no voltage was applied for 0.2 seconds, application was repeated under conditions of one square wave (square pulse; 0.2 seconds) and no voltage application (2 seconds). A peak current and a peak time of a transient current generated by this application were measured. A value of the rotational viscosity was obtained from these measured values and Equation (8) on page 40 in the paper (M. Imai). The dielectric anisotropy required for this calculation was measured in the following dielectric anisotropy section.

(13a) Dielectric anisotropy (Δε; measured at 25° C.; sample with positive dielectric anisotropy): A sample was inserted into a TN element in which an interval (cell gap) between two glass substrates was 9 μm and a twist angle was 80 degrees. A sine wave (10 V, 1 kHz) was applied to this element, and after 2 seconds, a dielectric constant (ε∥) in a long axis direction of liquid crystal molecules was measured. A sine wave (0.5 V, 1 kHz) was applied to this element, and after 2 seconds, a dielectric constant (ε⊥) in a short axis direction of liquid crystal molecules was measured. A value of the dielectric anisotropy was calculated from the equation Δε=ε∥−ε⊥.

(13b) Dielectric anisotropy (Δε; measured at 25° C.; sample with negative dielectric anisotropy): A value of the dielectric anisotropy was calculated from the equation Δε=ε∥−ε⊥. A dielectric constant (ε∥ and ε⊥) was measured as follows.

1) Measurement of dielectric constant (ε∥): An ethanol (20 mL) solution containing octadecyltriethoxysilane (0.16 mL) was applied to a well-washed glass substrate. The glass substrate was rotated by a spinner and then heated at 150° C. for 1 hour. A sample was inserted into a VA element in which an interval (cell gap) between two glass substrates was 4 μm, and this element was sealed using an adhesive that was cured with ultraviolet rays. A sine wave (0.5 V, 1 kHz) was applied to this element and after 2 seconds, a dielectric constant (ε∥) in a long axis direction of liquid crystal molecules was measured.

2) Measurement of dielectric constant (ε⊥): A polyimide solution was applied to a well-washed glass substrate. The glass substrate was fired and a rubbing treatment was then performed on the obtained alignment film. A sample was inserted into a TN element in which an interval (cell gap) between two glass substrates was 9 μm and a twist angle was 80 degrees. A sine wave (0.5 V, 1 kHz) was applied to this element, and after 2 seconds, a dielectric constant (ε⊥) in a short axis direction of liquid crystal molecules was measured.

(14a) Elastic constant (K; measured at 25° C.; pN; sample with positive dielectric anisotropy): A HP4284A type LCR meter (commercially available from Yokogawa-Hewlett-Packard Company) was used for measurement. A sample was inserted into a horizontally aligned element in which an interval (cell gap) between two glass substrates was 20 μM. A charge of 0 V to 20 V was applied to this element, and an electrostatic capacitance (C) and an applied voltage (V) were measured. These measured values were fitted using Equation (2.98) and Equation (2.101) on page 75 in "Liquid Crystal Device Handbook" (commercially available from Nikkan Kogyo Shimbun, Ltd.), and values of $K_{11}$ and $K_{33}$ were obtained from Equation (2.99). Next, in Equation (3.18) on page 171, $K_{22}$ was computed using the values of $K_{11}$ and $K_{33}$ obtained above. An elastic constant K was expressed as an average value of $K_{11}$, $K_{22}$, and $K_{33}$ obtained in this manner.

(14b) Elastic constant ($K_{11}$ and $K_{33}$; measured at 25° C.; pN; sample with negative dielectric anisotropy): An EC-1 type elastic constant measuring instrument (commercially available from TOYO Corporation) was used for measurement. A sample was inserted into a vertically aligned element in which an interval (cell gap) between two glass substrates was 20 μm. A charge of 20 V to 0 V was applied to this element, and an electrostatic capacitance (C) and an applied voltage (V) were measured. These values were fitted using Equation (2.98), and Equation (2.101) on page 75 in "Liquid Crystal Device Handbook" (commercially available from Nikkan Kogyo Shimbun, Ltd.) and a value of the elastic constant was obtained from Equation (2.100).

(15a) Threshold voltage (Vth; measured at 25° C.; V; sample with positive dielectric anisotropy): An LCD5100 type luminance meter (commercially available from Otsuka Electronics) was used for measurement. A light source was a halogen lamp. A sample was inserted into a TN element in a normally white mode in which an interval (cell gap) between two glass substrates was 0.45/Δn (μm) and a twist angle was 80 degrees. A voltage (32 Hz, square wave) applied to this element was gradually increased by 0.02 V from 0 V to 10 V. In this case, light was emitted to the element in a vertical direction and a quantity of light that had passed through the element was measured. A voltage-transmittance curve in which the transmittance was 100% when the quantity of light was a maximum and the transmittance was 0% when the quantity of light was a minimum was created. A threshold voltage was a voltage when the transmittance was 90%.

(15b) Threshold voltage (Vth; measured at 25° C.; V; sample with negative dielectric anisotropy): An LCD5100 type luminance meter (commercially available from Otsuka Electronics) was used for measurement. A light source was a halogen lamp. A sample was inserted into a VA element in a normally black mode in which an interval (cell gap) between two glass substrates was 4 μm and a rubbing direction was antiparallel, and this element was sealed using an adhesive that was cured with ultraviolet rays. A voltage (60 Hz, square wave) applied to this element was gradually increased by 0.02 V from 0 V to 20 V. In this case, light was emitted to the element in a vertical direction and a quantity of light that had passed through the element was measured. A voltage-transmittance curve in which the transmittance was 100% when the quantity of light was a maximum and the transmittance was 0% when the quantity of light was a minimum was created. A threshold voltage was a voltage when the transmittance was 10%.

(16a) Response time (τ; measured at 25° C.; ms; sample with positive dielectric anisotropy): An LCD5100 type luminance meter (commercially available from Otsuka Electronics) was used for measurement. A light source was a halogen lamp. A low-pass filter was set at 5 kHz. A sample was inserted into a TN element in a normally white mode in which an interval (cell gap) between two glass substrates was 5.0 μm and a twist angle was 80 degrees. A square wave (60 Hz, 5 V, 0.5 seconds) was applied to this element. In this case, light was emitted to the element in a vertical direction and a quantity of light that had passed through the element was measured. The transmittance was 100% when the quantity of light was a maximum, and the transmittance was 0% when the quantity of light was a minimum. A rise time (τr; millisecond) was a time required for the transmittance to change from 90% to 10%. A fall time (τf; millisecond) was a time for the transmittance to change from 10% to 90%. A response time was a sum of the rise time and the fall time obtained in this manner.

(16b) Response time (τ; measured at 25° C.; ms; sample with negative dielectric anisotropy): An LCD5100 type luminance meter (commercially available from Otsuka Electronics) was used for measurement. A light source was a halogen lamp. A low-pass filter was set at 5 kHz. A sample was inserted into a PVA element in a normally black mode in which an interval (cell gap) between two glass substrates was 3.2 μm and a rubbing direction was antiparallel. This element was sealed using an adhesive that was cured with ultraviolet rays. A voltage that was slightly higher than a threshold voltage was applied to this element for 1 minute, and next ultraviolet rays of 23.5 mW/cm² were emitted for 8 minutes while a voltage of 5.6 V was applied. A square wave (60 Hz, 10 V, 0.5 seconds) was applied to this element. In this case, light was emitted to the element in a vertical direction and a quantity of light that had passed through the element was measured. The transmittance was 100% when the quantity of light was a maximum, and the transmittance was 0% when the quantity of light was a minimum. A response time was a time (fall time; milliseconds) required for the transmittance to change from 90% to 10%.

Synthesis Example 1

Synthesis of Compound (No. 2)

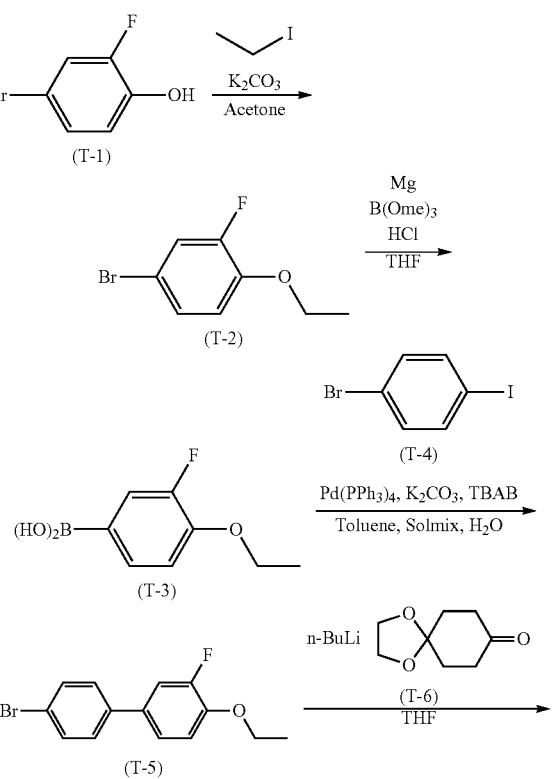

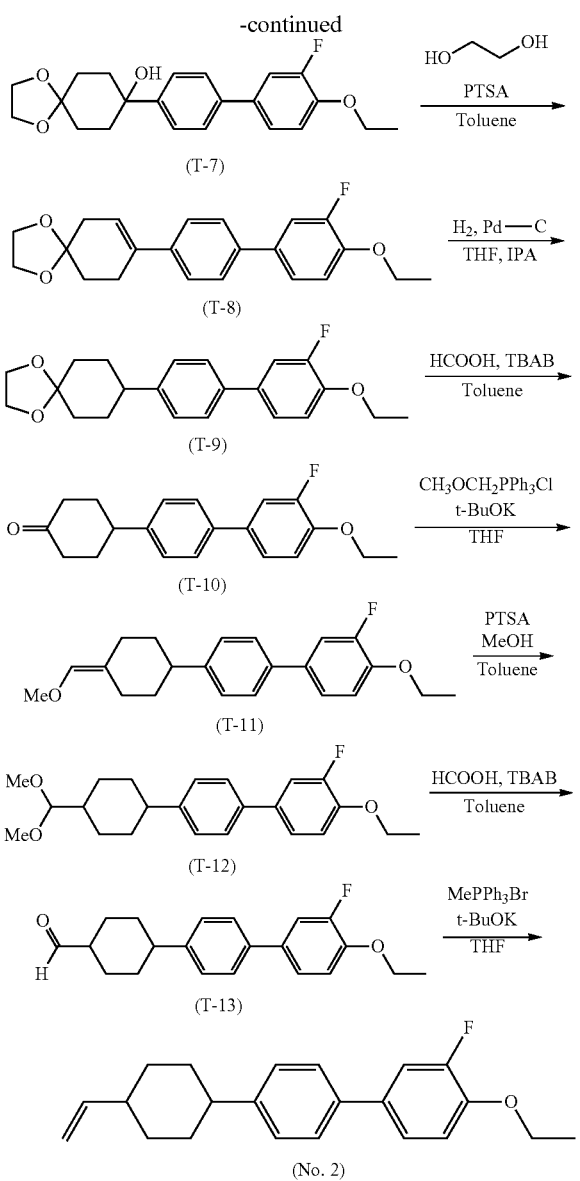

First Process: Synthesis of Compound (T-2)

Under a nitrogen atmosphere, Compound (T-1) (215.0 g), acetone (1075 mL), potassium carbonate (171.1 g), and ethyl iodide (193.1 g) were put into a reactor, and heated under reflux for 6 hours. The reaction mixture was poured into water and an aqueous layer was extracted in toluene. The combined organic layer was washed with a saline and was then dried with anhydrous magnesium sulfate, and concentrated under a reduced pressure. The residue was purified by distillation under a reduced pressure (0.7 kPa, 67° C.), and thereby Compound (T-2) (240.5 g; 98%) was obtained.

Second Process: Synthesis of Compound (T-3)

Magnesium (5.76 g) was put into a reactor under a nitrogen atmosphere, a tetrahydrofuran (THF) (250 mL) solution containing Compound (T-2) (40.0 g) was slowly added to the reactor, and stirring was performed at room temperature for 2 hours. Next, a THF (150 ml) solution containing trimethyl borate (28.6 ml, 255.7 mmol) was added thereto and stirring was performed for 12 hours. Next, the mixture was cooled to 0° C., and 1 N hydrochloric acid (548 ml) was added thereto and stirring was performed for 2 hours. The reaction mixture was poured into water and an aqueous layer was extracted in ethyl acetate. The combined organic layer was washed with a saline, and then dried with anhydrous magnesium sulfate, and concentrated under a reduced pressure. The residue was purified by re-crystallization from heptane and thereby Compound (T-3) (29.3 g; 87%) was obtained.

Third Process: Synthesis of Compound (T-5)

Under a nitrogen atmosphere, Compound (T-3) (28.0 g), Compound (T-4) (41.0 g), tetrakis(triphenylphosphine)palladium (1.40 g), potassium carbonate (60.1 g), tetrabutylammonium bromide (TBAB) (14.0 g), toluene (140 ml), Sol Mix (registered trademark) A-11 (140 ml), and water (140 ml) were put into a reactor and heated under reflux for 3 hours. The reaction mixture was poured into water and an aqueous layer was extracted in toluene. The combined organic layer was washed with water and dried with anhydrous magnesium sulfate. This solution was concentrated under a reduced pressure, the residue was purified through silica gel chromatography (volume ratio, toluene:heptane=1:8), and thereby Compound (T-5) (34.7 g; 81%) was obtained.

Fourth Process: Synthesis of Compound (T-7)

Under a nitrogen atmosphere, Compound (T-5) (34.7 g), and THF (250 ml) were put into a reactor, and cooled to −70° C. n-Butyllithium (1.64 M; n-hexane solution; 75.3 ml) was slowly added thereto and the mixture was stirred for 1 hour. Next, a THF (100 ml) solution containing Compound (T-6) (20.2 g) was slowly added thereto and the mixture was stirred for 12 hours while the temperature returned to room temperature. The reaction mixture was poured into water and an aqueous layer was extracted in ethyl acetate. The combined organic layer was washed with a saline and dried with anhydrous magnesium sulfate. This solution was concentrated under a reduced pressure, and the residue was purified through silica gel chromatography (volume ratio, ethyl acetate:toluene=1:4), and thereby Compound (T-7) (43.8 g; 100%) was obtained.

Fifth Process: Synthesis of Compound (T-8)

Under a nitrogen atmosphere, Compound (T-7) (43.8 g), ethylene glycol (8.76 g), paratoluenesulfonic acid monohydrate (PTSA) (2.24 g), and toluene (438 ml) were put into a reactor, and heated under reflux for 8 hours. The reaction mixture was poured into water and an aqueous layer was extracted in toluene. The combined organic layer was washed with aqueous sodium bicarbonate and a saline and dried with anhydrous magnesium sulfate. This solution was concentrated under a reduced pressure, and the residue was purified through silica gel chromatography (volume ratio, ethyl acetate:toluene=1:8), and moreover, additionally purified by re-crystallization from a mixed solvent of toluene and heptane (volume ratio, 1:4), and thereby Compound (T-8) (27.5 g; 66%) was obtained.

Sixth Process: Synthesis of Compound (T-9)

Compound (T-8) (27.5 g), 5% palladium carbon (1.38 g), THF (275 ml), and isopropyl alcohol (IPA) (138 ml) were put into a reactor, and stirring was performed under a hydrogen atmosphere for 12 hours. A catalyst was removed by filtration, and the mixture was then concentrated under a reduced pressure, and the residue was purified through silica gel column chromatography (volume ratio, ethyl acetate:toluene=1:8), and thereby Compound (T-9) (26.6 g; 96%) was obtained.

Seventh Process: Synthesis of Compound (T-10)

Under a nitrogen atmosphere, Compound (T-9) (26.6 g), formic acid (53.3 ml), TBAB (7.23 g), and toluene (130 ml)

were put into a reactor, and stirring was performed at room temperature for 2 hours. The reaction mixture was poured into water and neutralized with sodium bicarbonate. An aqueous layer was extracted in toluene, and the combined organic layer was washed with a saline and dried with anhydrous magnesium sulfate. This solution was concentrated under a reduced pressure, and the residue was purified through silica gel column chromatography (volume ratio, ethyl acetate:toluene=1:4), and moreover, additionally purified by re-crystallization from a mixed solvent of toluene and heptane (volume ratio, 1:1), and thereby Compound (T-10) (17.9 g; 77%) was obtained.

Eighth Process: Synthesis of Compound (T-11)

Under a nitrogen atmosphere, (methoxymethyl)triphenylphosphonium chloride (23.6 g) and THF (140 ml) were put into a reactor and cooled to −30° C. Next, potassium t-butoxide (6.75 g) was added thereto, and the mixture was stirred for 1 hour while the temperature was maintained at −30° C. Next, a THF (220 ml) solution containing Compound (T-10) (17.9 g) was slowly added dropwise, and the mixture was stirred for 3 hours while the temperature returned to room temperature after dropwise addition. The reaction mixture was poured into a saline, and an aqueous layer was extracted in toluene. The combined organic layer was washed with a saline and dried with anhydrous magnesium sulfate. This solution was concentrated under a reduced pressure, and the residue was purified through silica gel column chromatography (volume ratio, toluene:heptane=1:2), and thereby Compound (T-11) (19.5 g; 100%) was obtained.

Ninth Process: Synthesis of Compound (T-12) Under a nitrogen atmosphere, Compound (T-11) (19.5 g), PTSA (3.27 g), methanol (700 ml), and toluene (100 ml) were put into a reactor, and heated under reflux for 10 hours. The reaction mixture was poured into aqueous sodium bicarbonate, and an aqueous layer was extracted in toluene. The combined organic layer was washed with a saline and dried with anhydrous magnesium sulfate. This solution was concentrated under a reduced pressure, and the residue was purified through silica gel column chromatography (volume ratio, toluene:heptane=1:2), and moreover, additionally purified by re-crystallization from a mixed solvent of toluene and heptane (volume ratio, 1:4), and thereby Compound (T-12) (17.2 g; 81%) was obtained.

Tenth Process: Synthesis of Compound (T-13)

Under a nitrogen atmosphere, Compound (T-12) (17.2 g), formic acid (34.4 ml), TBAB (4.47 g), and toluene (172 ml) were put into a reactor, and stirring was performed at room temperature for 2 hours. The reaction mixture was poured into water and neutralized with sodium bicarbonate. An aqueous layer was extracted in toluene, and the combined organic layer was washed with a saline and dried with anhydrous magnesium sulfate. This solution was concentrated under a reduced pressure, and thereby Compound (T-13) (19.1 g; 100%) was obtained.

Eleventh Process: Synthesis of Compound (No. 2)

Under a nitrogen atmosphere, methyltriphenylphosphonium bromide (21.4 g) and THF (180 ml) were put into a reactor and cooled to −30° C. Next, potassium t-butoxide (6.22 g) was added thereto, and the mixture was stirred for 1 hour while the temperature was maintained at −30° C. Next, a THF (200 ml) solution containing Compound (T-13) (19.1 g) was slowly added dropwise, and the mixture was stirred for 3 hours while the temperature returned to room temperature after dropwise addition. The reaction mixture was poured into a saline, and an aqueous layer was extracted in toluene. The combined organic layer was washed with a saline and dried with anhydrous magnesium sulfate. This solution was concentrated under a reduced pressure, and the residue was purified through silica gel column chromatography (volume ratio, toluene:heptane=1:2), and moreover, additionally purified by re-crystallization from a mixed solvent of ethyl acetate and IPA (volume ratio, 1:4), and thereby Compound (No. 2) (10.2 g; 68%) was obtained.

$^1$H-NMR (CDCl$_3$; δ ppm):7.47-7.45 (m, 2H), 7.33-7.26 (m, 4H), 7.02-6.98 (m, 1H), 5.87-5.80 (m, 1H), 5.04-5.00 (m, 1H), 4.95-4.93 (m, 1H), 4.14 (q, J=7.0 Hz, 2H), 2.51 (tt, J=12.2 Hz, J=3.3 Hz, 1H), 2.06-2.02 (m, 1H), 1.97-1.90 (m, 4H), 1.58-1.46 (m, 6H), 1.33-1.27 (m, 2H).

Phase transition temperature: C 67.0 S$_B$ 71.4 S$_A$ 99.9 N 171.5 I; upper limit temperature (NI)=153.0° C.; dielectric anisotropy (Δε)=−2.3; optical anisotropy (Δn)=0.214; viscosity (η)=51.6 mPa·s.

Comparative Example 1

Comparison of Physical Properties

The following Compound (S-1) was selected as a comparative compound. This is because this compound is described in Japanese Unexamined Patent Application Publication No. 2005-298733, and is similar to the compound of the disclosure.

(S-1)

$^1$H-NMR (CDCl$_3$; δ ppm):7.46-7.44 (m, 2H), 7.33-7.25 (m, 4H), 7.00 (t, J=8.6 Hz, 1H), 4.14 (q, J=7.0 Hz, 2H), 2.51 (tt, J=12.2 Hz, J=3.3 Hz, 1H), 2.06-2.02 (m, 1H), 1.93-1.87 (m, 4H), 1.59-1.44 (m, 6H), 1.39-1.20 (m, 5H), 1.10-1.02 (m, 2H), 0.91 (t, J=7.3 Hz, 3H).

Phase transition temperature: C 68.6 S$_B$ 108.7 S$_A$ 134.2 N 185.0 I; upper limit temperature (NI)=167.0° C.; dielectric anisotropy (Δε)=−2.2; optical anisotropy (Δn)=0.200.

TABLE 2

Physical properties of Compound (No. 2) and Comparative Compound (S-1)

| | Compound (No. 2) | Compound (S-1) |
|---|---|---|
| Transition temperature | C 67.0 $S_B$ 71.4 $S_A$ 99.9 N 171.5I | C 68.6 $S_B$ 108.7 $S_A$ 134.2 N 185.0I |
| Dielectric anisotropy ($\Delta\varepsilon$) | −2.3 | −2.2 |
| Optical anisotropy ($\Delta n$) | 0.214 | 0.200 |

Physical properties of Compound (No. 2) obtained in Synthesis Example 1 and Comparative Compound (S-1) are summarized in Table 2. It can be understood from Table 2 that Compound (No. 2) was superior because it had larger optical anisotropy than Comparative Compound (S-1) and exhibited a nematic phase in a wider temperature range of 99.9° C. to 171.5° C. between transition temperatures, and was more likely to have a nematic phase than Compound (S-1).

TABLE 3

Rotational viscosities of Compound (No. 2) and Comparative Compound (S-1)

| | Compound (No. 2) | Compound (S-1) |
|---|---|---|
| Rotational viscosity ($\gamma 1$) | 315.3 mPa · s | 374.5 mPa · s |

In addition, rotational viscosities of Compound (No. 2) according to the method described in the measurement method (12b) and Comparative Compound (S-1) were measured and summarized in Table 3. It can be understood from Table 3 that Compound (No. 2) was an excellent compound because it had a smaller rotational viscosity than Comparative Compound (S-1).

According to the above comparisons, it can be understood that Compound (No. 2) was an excellent compound having both large optical anisotropy and a low viscosity, and capable of shortening a response time of the liquid crystal display element.

Comparative Example 2

Comparison of Physical Properties

The following Compound (S-2) was selected as a comparative compound. This is because this compound is described in PCT International Publication No. WO 2016/152405 and is similar to the compound of the disclosure.

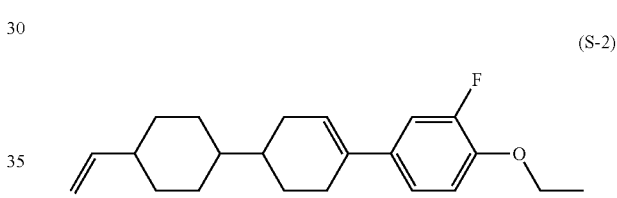

(S-2)

$^1$H-NMR (CDCl$_3$; δ ppm):7.14-7.11 (m, 1H), 7.07-7.06 (m, 1H), 6.88 (t, J=8.6 Hz, 1H), 6.05-6.04 (m, 1H), 5.82-5.76 (m, 1H) 4.99-4.95 (m, 1H), 4.90-4.88 (m, 1H), 4.10 (q, J=7.0 Hz, 2H), 2.44-2.23 (m, 3H), 1.96-1.80 (m, 7H), 1.45-1.30 (m, 5H), 1.14-1.00 (m, 5H)).

Phase transition temperature: C 100.5 $S_A$ 127.8 N 173.4 I; upper limit temperature (NI)=160.3° C.; dielectric anisotropy ($\Delta\varepsilon$)=−2.8; optical anisotropy ($\Delta n$)=0.160.

TABLE 4

Physical properties of Compound (No. 2) and Comparative Compound (S-2)

| | Compound (No. 2) | Compound (S-2) |
|---|---|---|
| Transition temperature | C 67.0 $S_B$ 71.4 $S_A$ 99.9 N 171.5I | C 100.5 $S_A$ 127.8 N 173.4I |
| Dielectric anisotropy ($\Delta\varepsilon$) | −2.3 | −2.8 |
| Optical anisotropy ($\Delta n$) | 0.214 | 0.160 |

Physical properties of Compound (No. 2) obtained in Synthesis Example 1 and Comparative Compound (S-2) are summarized in Table 4. It can be understood from Table 4 that Compound (No. 2) was excellent because it had larger optical anisotropy than Comparative Compound (S-2) and exhibited a nematic phase in a wider temperature range of 99.9° C. to 171.5° C. between transition temperatures, and was more likely to have a nematic phase than Compound (S-2).

TABLE 5

Compatibility at low temperature of Compound (No. 2) and Comparative Compound (S-2)

| Sample for measurement | Components of sample | | Conditions (−10° C., 30 days) |
|---|---|---|---|
| Composition (X-1) | 15 weight % of Compound (No. 2) | 85 weight % of mother liquid crystal (B) | Maintain nematic phase |
| Composition (X-2) | 15 weight % of Compound (S-2) | 85 weight % of mother liquid crystal (B) | Precipitate crystal |
| Composition (X-3) | 10 weight % of Compound (S-2) | 90 weight % of mother liquid crystal (B) | Precipitate crystal |

TABLE 5-continued

Compatibility at low temperature of Compound (No. 2) and Comparative Compound (S-2)

| Sample for measurement | Components of sample | | Conditions (−10° C., 30 days) |
|---|---|---|---|
| Composition (X-4) | 5 weight % of Compound (S-2) | 95 weight % of mother liquid crystal (B) | Maintain nematic phase |

In addition, solubilities of Compound (No. 2) and Comparative Compound (S-2) in the mother liquid crystal (B) at a low temperature are summarized in Table 5. In Composition (X-1) in which Compound (No. 2) was added at 15 weight % in the mother liquid crystal (B), a nematic phase was maintained after 30 days in a freezer at −10° C. However, precipitation of crystals was observed in Compositions (X-2) and (X-3) in which Comparative Compound (S-2) was added at 15 weight % and 10 weight %, respectively. This indicates that Compound (No. 2) of the present application had superior solubility in other liquid crystalline compounds at a low temperature compared with Comparative Compound (S-2). Therefore, it can be understood that Compound (No. 2) is an excellent compound which is effective for preparing a liquid crystal composition having a wide liquid crystal temperature range.

It is possible to synthesize the following compounds with reference to the methods described in the synthesis examples and the section "2. Synthesis of Compound (1)."

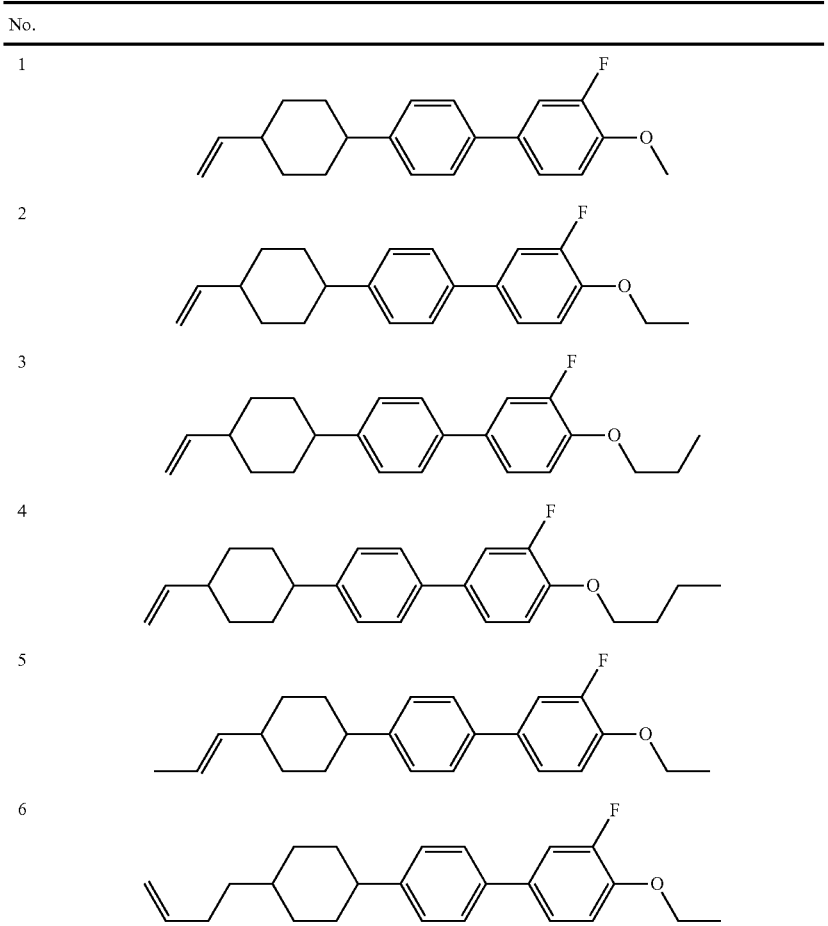

-continued
| No. | |
|---|---|
| 7 | 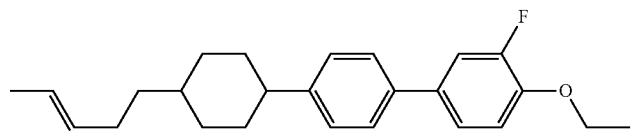 |
| 8 | 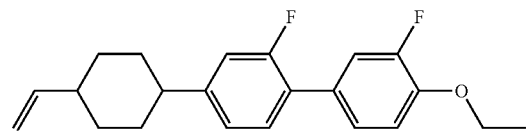 [SMILES: C=CC1CCC(c2ccc(-c3ccc(OCC)c(F)c3)cc2)CC1] |
| 9 | 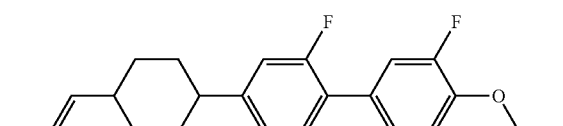 |
| 10 | 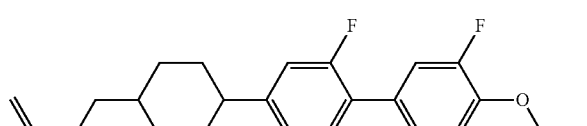 |
| 11 | 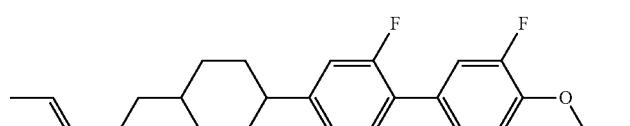 |
| 12 | 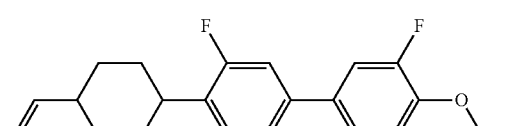 |
| 13 | 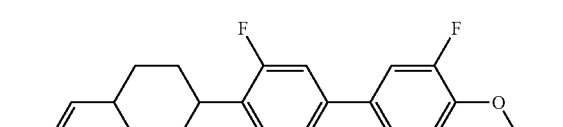 |
| 14 | 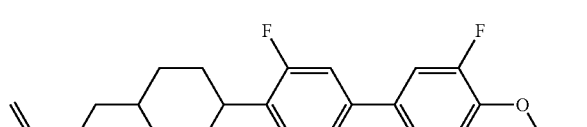 |
| 15 | 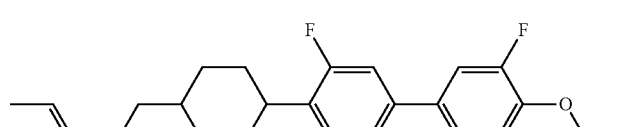 |
| 16 | 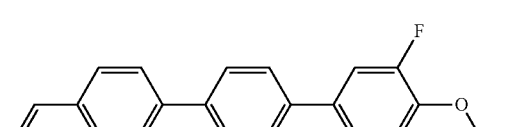 |
| 17 | 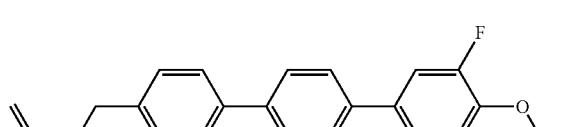 |

| No. | |
|---|---|
| 18 | 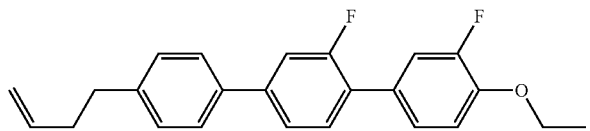 |
| 19 | 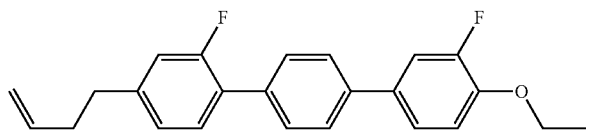 |
| 20 | 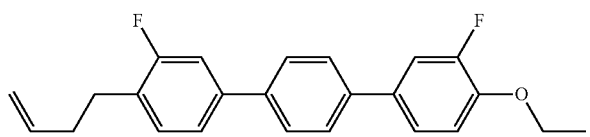 [SMILES: C=CCCc1ccc(-c2ccc(-c3ccc(OCC)c(F)c3)c(F)c2)cc1] |
| 21 | 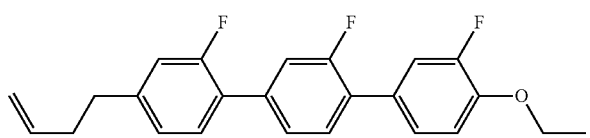 [SMILES: C=CCCc1ccc(-c2ccc(-c3ccc(OCC)c(F)c3)c(F)c2)c(F)c1] |
| 22 | 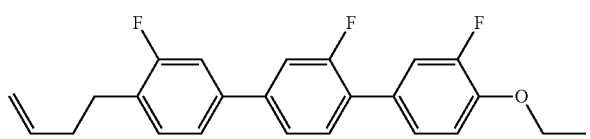 |
| 23 | 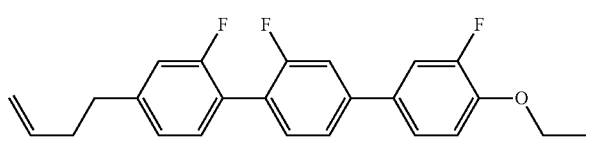 |
| 24 | 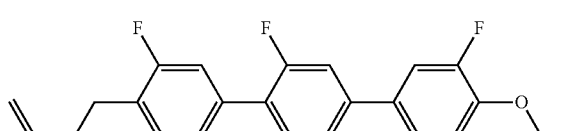 |
| 25 | 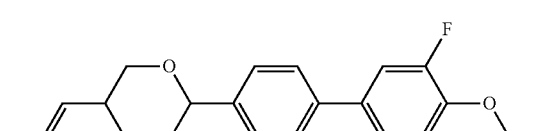 |
| 26 | 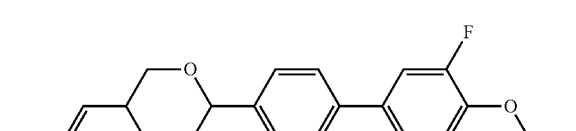 |
| 27 | 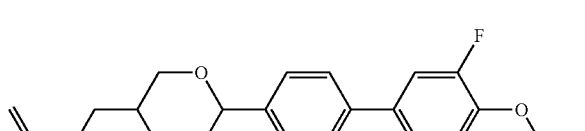 |
| 28 | 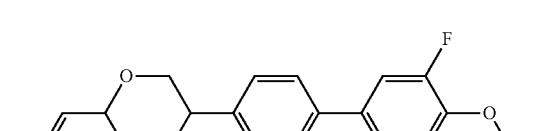 |

-continued
| No. | |
|---|---|
| 29 | 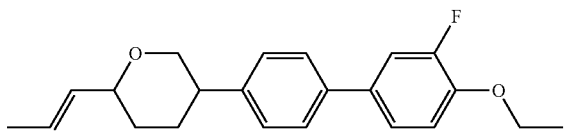 [SMILES: C/C=C/C1CCC(c2ccc(-c3ccc(OCC)c(F)c3)cc2)CO1] |
| 30 | 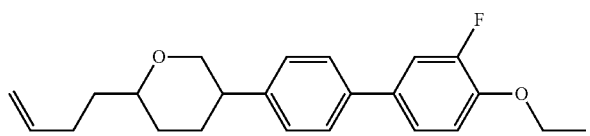 [SMILES: C=CCCC1CCC(c2ccc(-c3ccc(OCC)c(F)c3)cc2)CO1] |
| 31 | 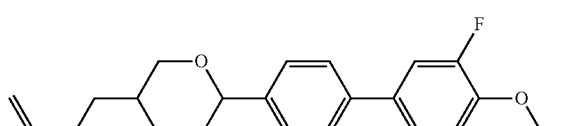 |
| 32 | 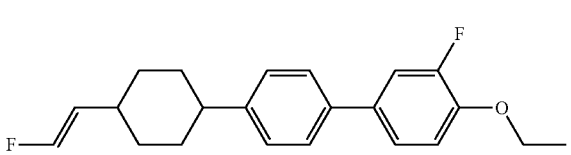 [SMILES: CCOc1ccc(-c2ccc(C3CCC(/C=C/F)CC3)cc2)cc1F] |
| 33 | 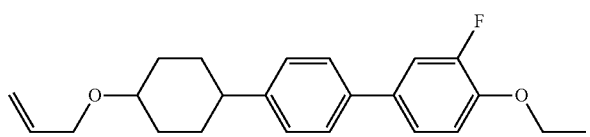 |
| 34 | 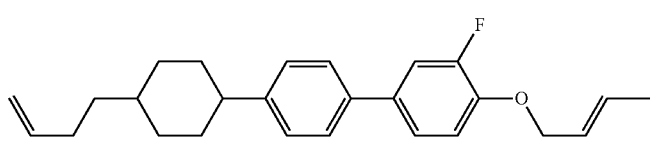 [SMILES: C=CCCC1CCC(c2ccc(-c3ccc(OC/C=C/C)c(F)c3)cc2)CC1] |
| 35 | 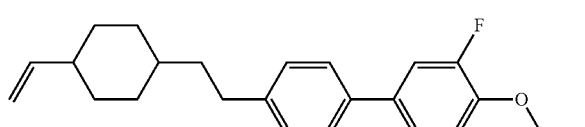 |
| 36 | 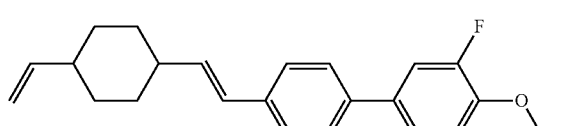 |
| 37 | 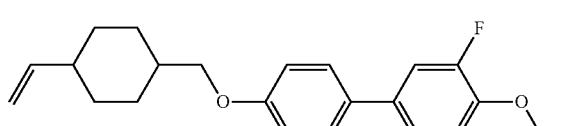 |
| 38 | 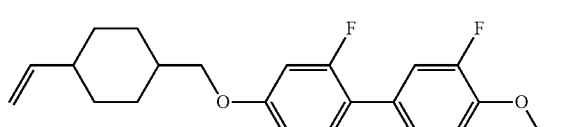 |
| 39 | 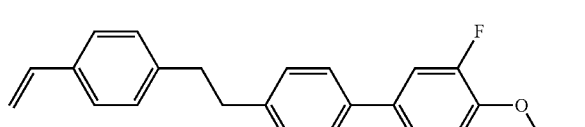 |

-continued
| No. | |
|---|---|
| 40 | 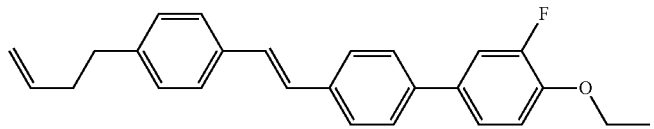 |
| 41 | 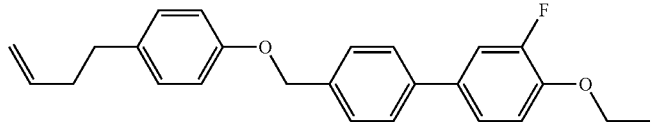 [SMILES: C=CCCc1ccc(/C=C/c2ccc(-c3ccc(OCC)c(F)c3)cc2)cc1] |
| 42 | 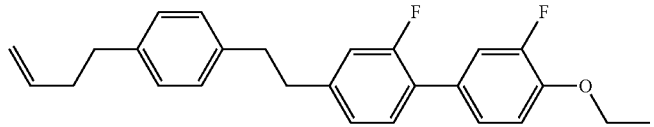 [SMILES: C=CCCc1ccc(CCc2ccc(-c3ccc(OCC)c(F)c3)c(F)c2)cc1] |
| 43 | 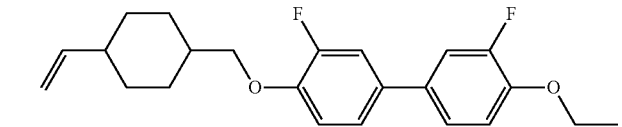 |
| 44 | 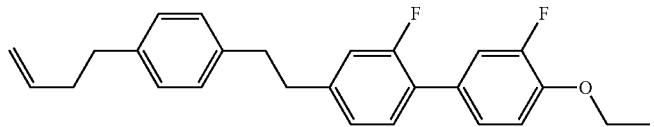 [SMILES: C=CCCc1ccc(CCc2ccc(-c3ccc(OCC)c(F)c3)c(F)c2)cc1] |
| 45 | 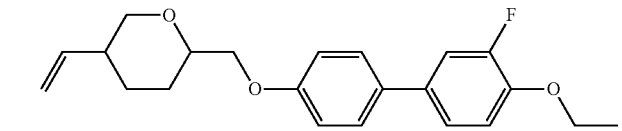 |
| 46 | 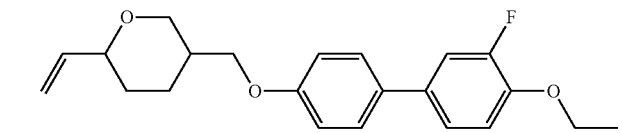 |
| 47 | 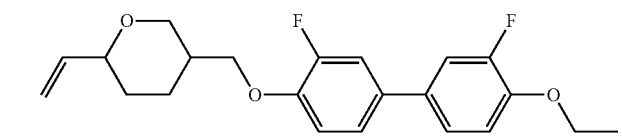 [SMILES: C=CC1CCC(COc2ccc(-c3ccc(OCC)c(F)c3)cc2F)CO1] |
| 48 | 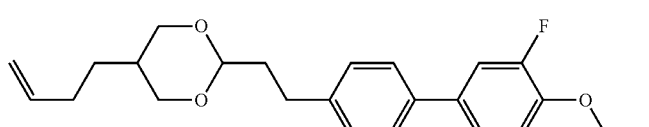 |
| 49 | 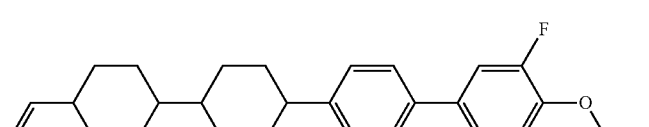 |
| 50 | 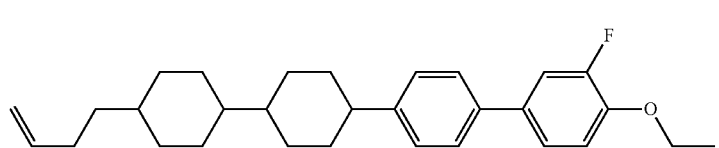 |

-continued
| No. | |
|---|---|
| 51 | 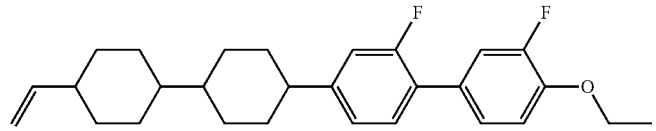 [SMILES: C=CC1CCC(C2CCC(c3ccc(-c4ccc(OCC)c(F)c4)c(F)c3)CC2)CC1] |
| 52 | 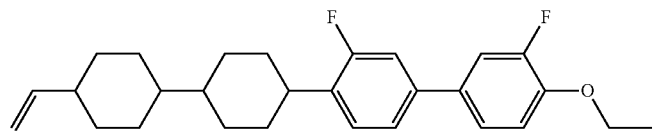 [SMILES: C=CC1CCC(C2CCC(c3ccc(-c4ccc(OCC)c(F)c4)cc3F)CC2)CC1] |
| 53 | 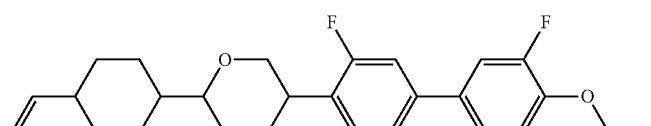 |
| 54 | 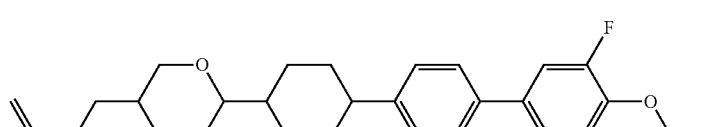 |
| 55 | 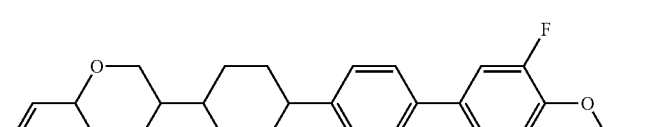 |
| 56 | 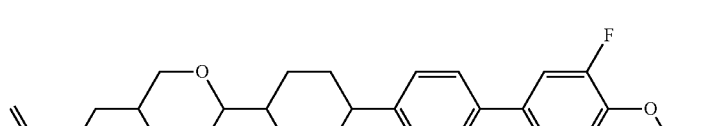 |
| 57 | 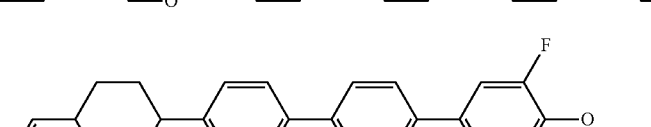 |
| 58 | 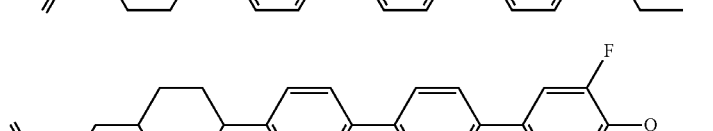 |
| 59 |  |
| 60 | 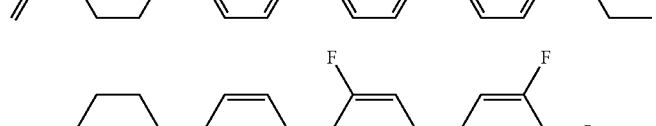 |
| 61 | 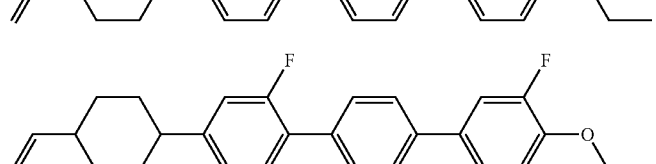 |

-continued
| No. |
|---|
| 62 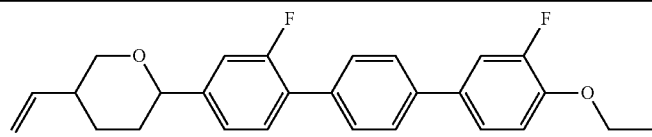 |
| 63 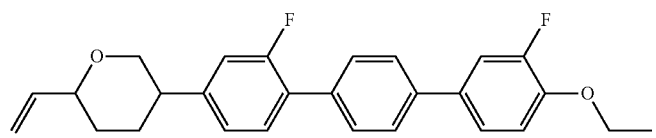 [SMILES: C=CC1CCC(c2ccc(-c3ccc(-c4ccc(OCC)c(F)c4)cc3)c(F)c2)CO1] |
| 64 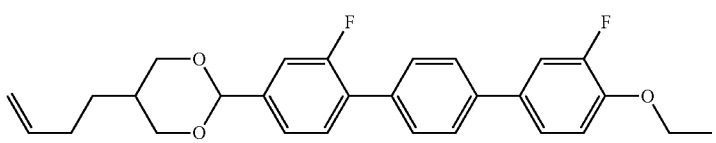 |
| 65 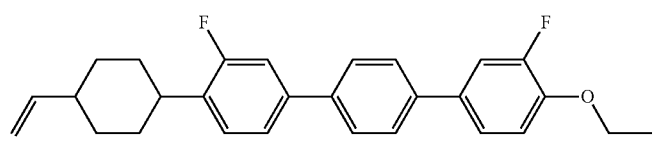 [SMILES: C=CC1CCC(c2ccc(-c3ccc(-c4ccc(OCC)c(F)c4)cc3)cc2F)CC1] |
| 66 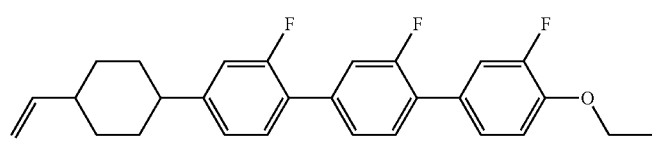 |
| 67 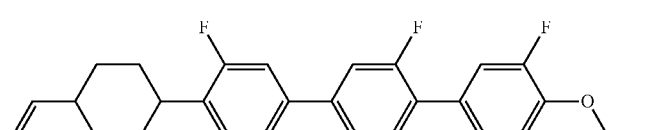 |
| 68 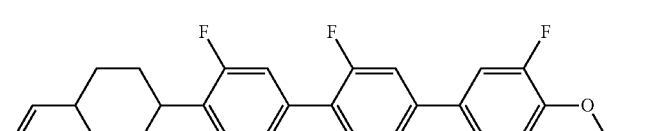 |
| 69 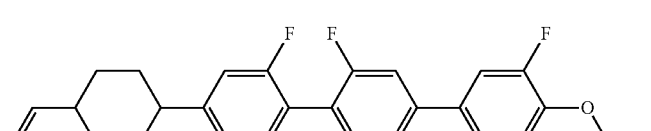 |
| 70 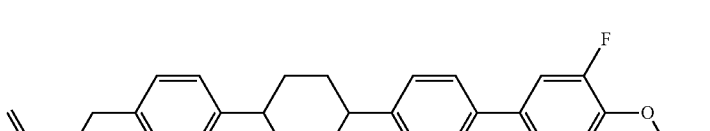 |
| 71  |
| 72 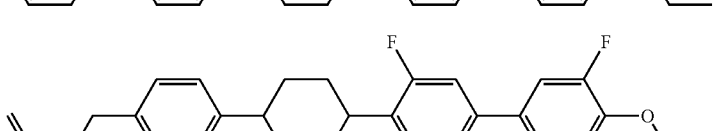 |

-continued
| No. | |
|---|---|
| 73 | 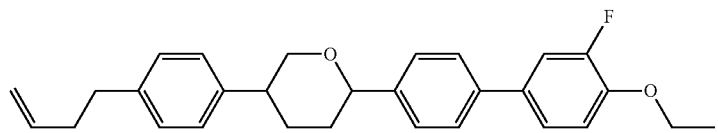 |
| 74 | 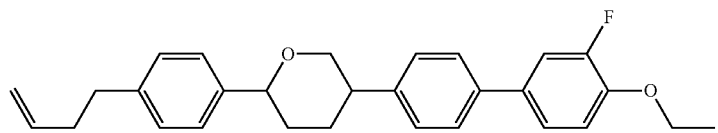 [SMILES: C=CCCc1ccc(C2CCC(c3ccc(-c4ccc(OCC)c(F)c4)cc3)CO2)cc1] |
| 75 | 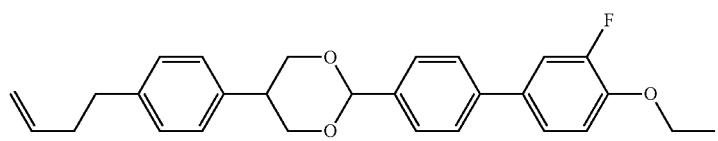 [SMILES: C=CCCc1ccc(C2COC(c3ccc(-c4ccc(OCC)c(F)c4)cc3)OC2)cc1] |
| 76 | 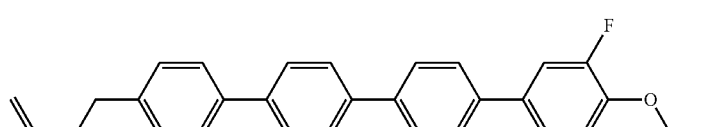 |
| 77 | 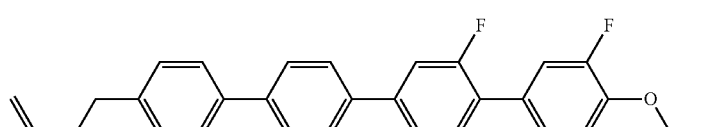 |
| 78 | 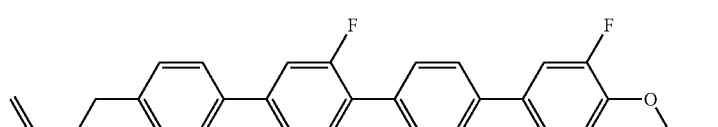 |
| 79 | 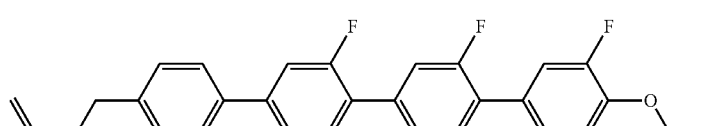 |
| 80 | 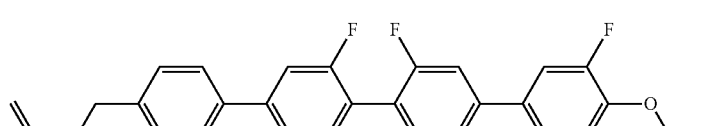 |
| 81 | 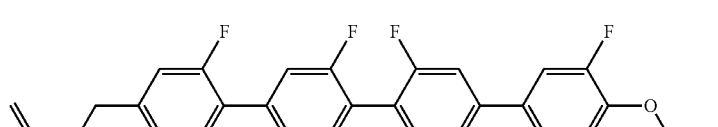 |
| 82 | 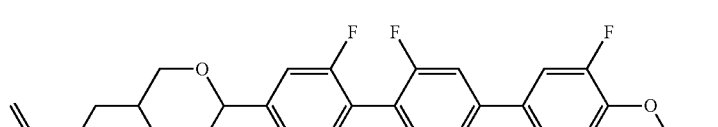 |
| 83 | 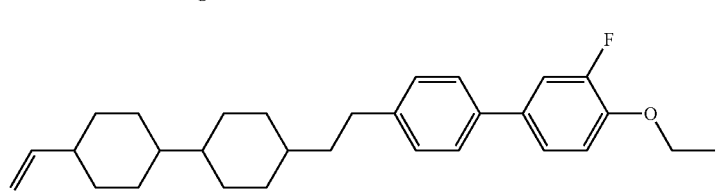 |

| No. | |
|---|---|
| 84 | 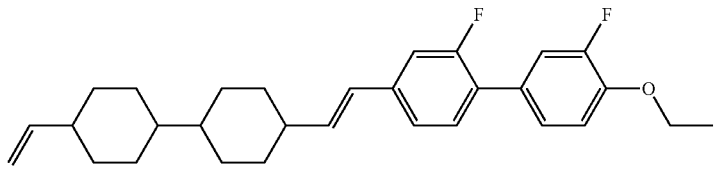 |
| 85 | 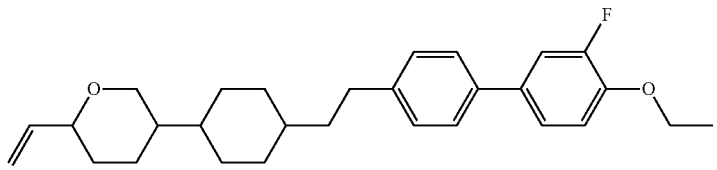 [SMILES: C=CC1CCC(C2CCC(CCc3ccc(-c4ccc(OCC)c(F)c4)cc3)CC2)CC1] |
| 86 | 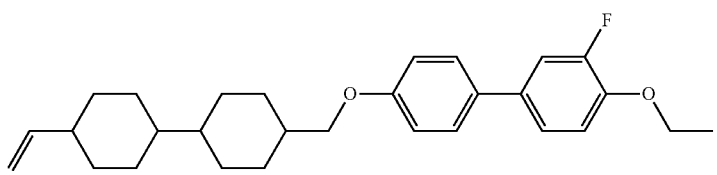 |
| 87 | 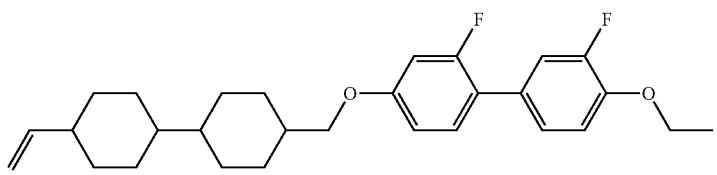 [SMILES: C=CC1CCC(C2CCC(COc3ccc(-c4ccc(OCC)c(F)c4)cc3)CC2)CC1] |
| 88 | 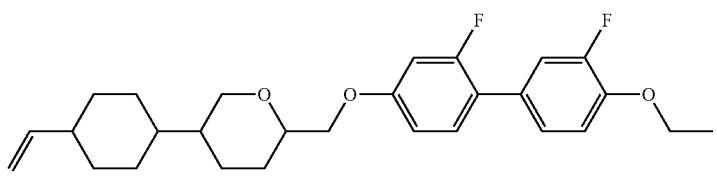 |
| 89 | 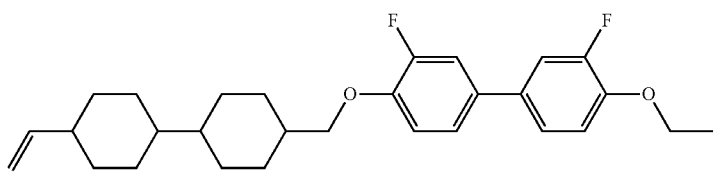 |
| 90 | 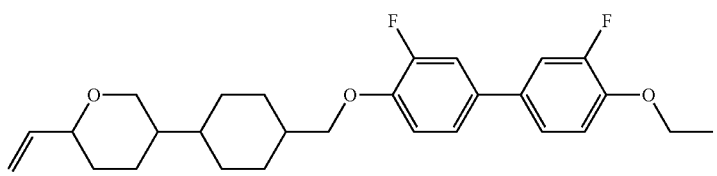 |
| 91 | 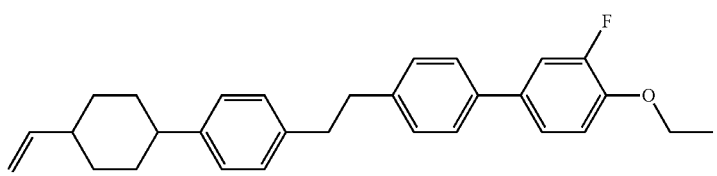 [SMILES: C=CC1CCC(c2ccc(CCc3ccc(-c4ccc(OCC)c(F)c4)cc3)cc2)CC1] |

| No. |
|---|
| 92 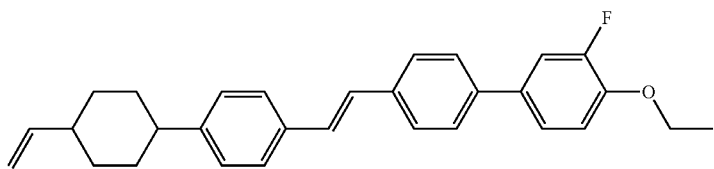 |
| 93 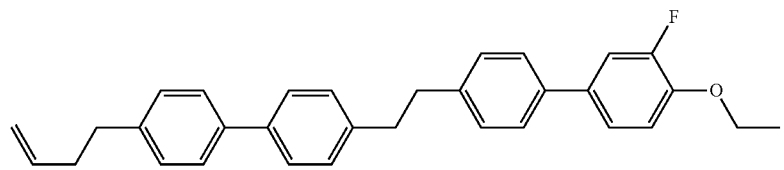 |
| 94 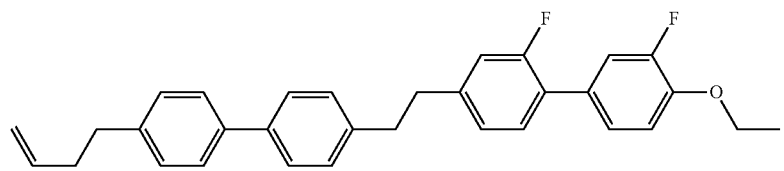 |
| 95 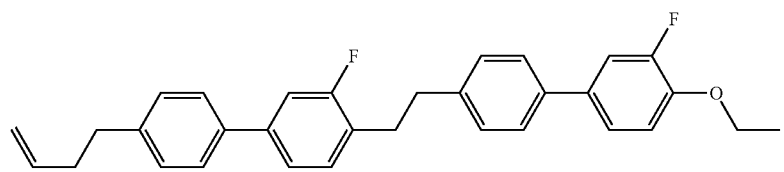 [SMILES: C=CCCc1ccc(-c2ccc(CCc3ccc(-c4ccc(OCC)c(F)c4)cc3)cc2)cc1] |
| 96 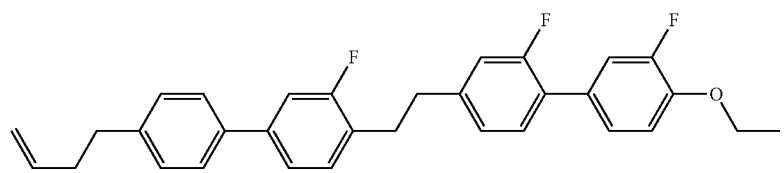 [SMILES: C=CCCc1ccc(-c2ccc(CCc3ccc(-c4ccc(OCC)c(F)c4)c(F)c3)c(F)c2)cc1] |
| 97 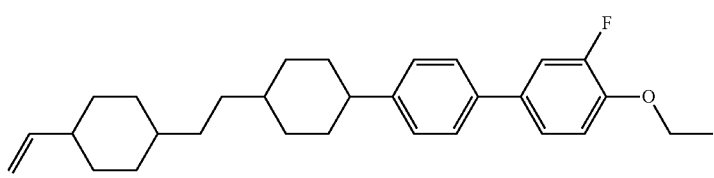 [SMILES: C=CC1CCC(CCC2CCC(c3ccc(-c4ccc(OCC)c(F)c4)cc3)CC2)CC1] |
| 98 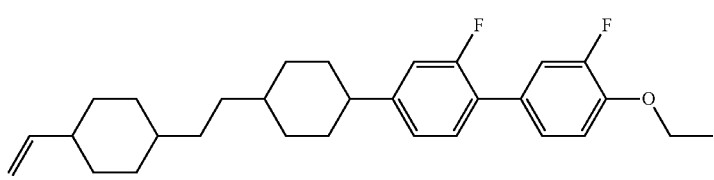 [SMILES: C=CC1CCC(CCC2CCC(c3ccc(-c4ccc(OCC)c(F)c4)c(F)c3)CC2)CC1] |
| 99 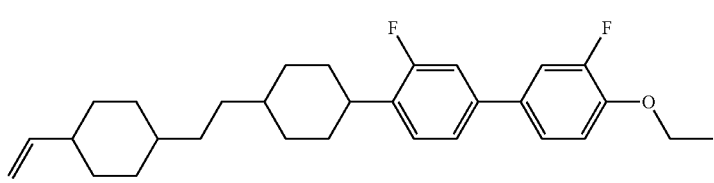 [SMILES: C=CC1CCC(CCC2CCC(c3ccc(-c4ccc(OCC)c(F)c4)cc3F)CC2)CC1] |
| 100 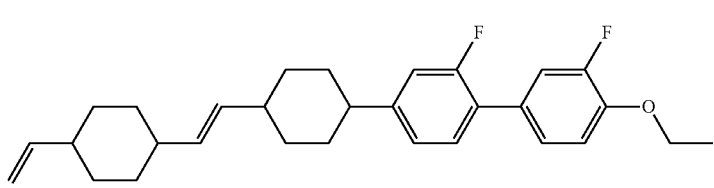 [SMILES: C=CC1CCC(/C=C/C2CCC(c3ccc(-c4ccc(OCC)c(F)c4)c(F)c3)CC2)CC1] |

-continued
| No. |
|---|
| 101 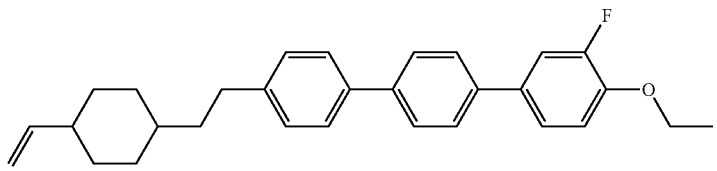 [SMILES: C=CC1CCC(CCc2ccc(-c3ccc(-c4ccc(OCC)c(F)c4)cc3)cc2)CC1] |
| 102 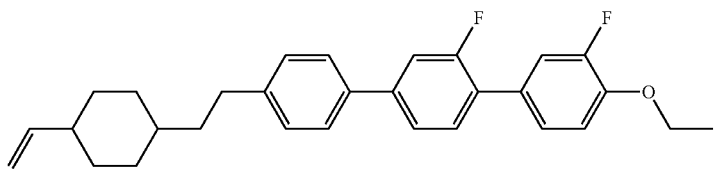 |
| 103 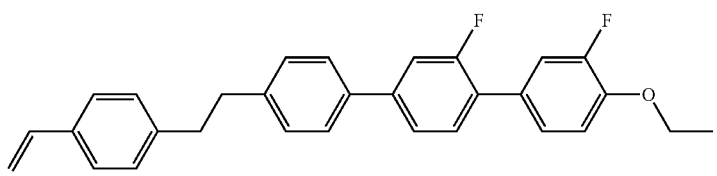 [SMILES: C=CC1CCC(CCc2ccc(-c3ccc(-c4ccc(OCC)c(F)c4)c(F)c3)cc2)CC1] |
| 104 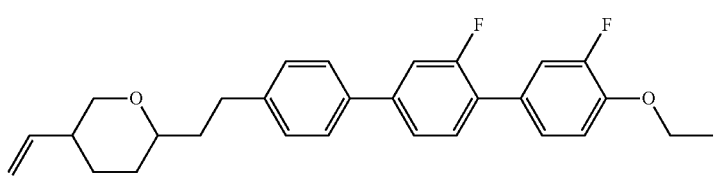 |
| 105 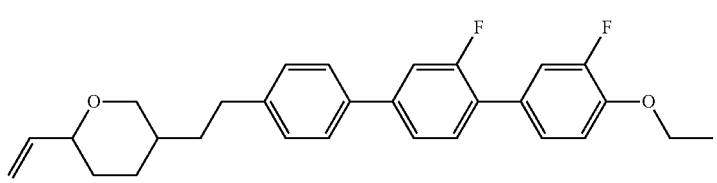 [SMILES: C=CC1CCC(CCc2ccc(-c3ccc(-c4ccc(OCC)c(F)c4)c(F)c3)cc2)CO1] |
| 106 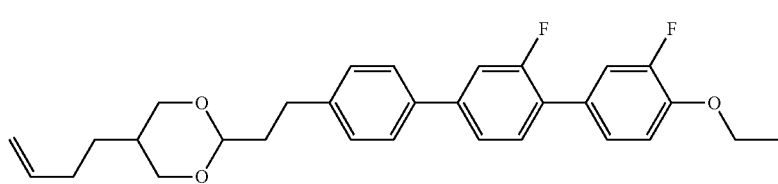 [SMILES: C=CCCC1COC(CCc2ccc(-c3ccc(-c4ccc(OCC)c(F)c4)c(F)c3)cc2)OC1] |
| 107 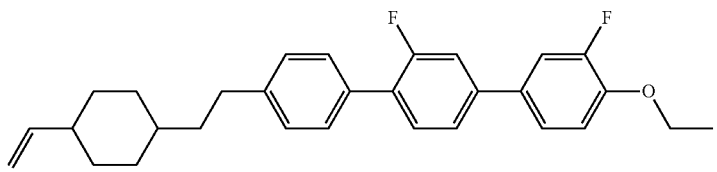 |
| 108 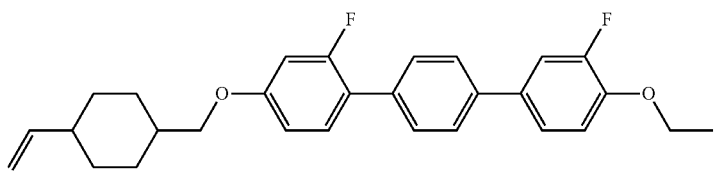 [SMILES: C=CC1CCC(COc2ccc(-c3ccc(-c4ccc(OCC)c(F)c4)cc3)c(F)c2)CC1] |

| No. |
|---|
| 109 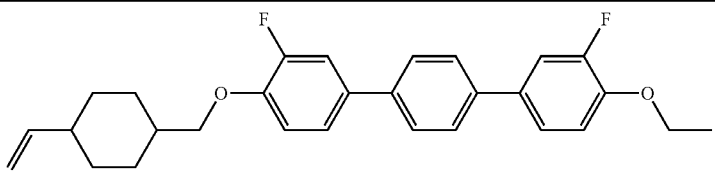 |
| 110 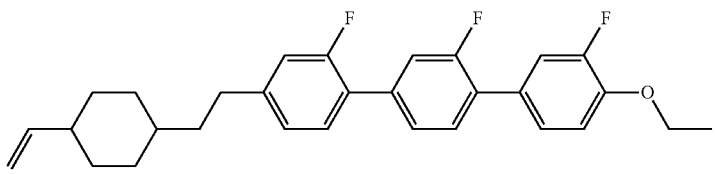 |
| 111 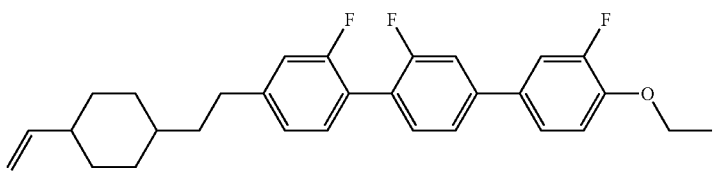 |
| 112 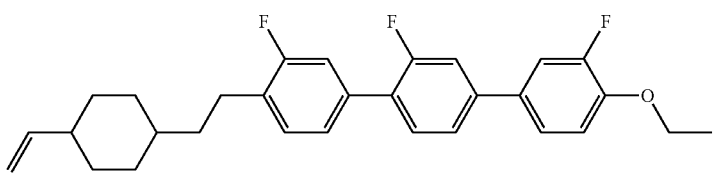 [SMILES: C=CC1CCC(CCc2ccc(-c3ccc(-c4ccc(OCC)c(F)c4)cc3F)cc2F)CC1] |
| 113 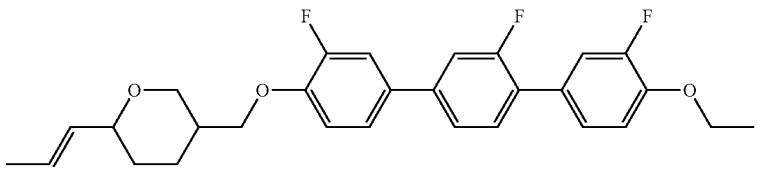 [SMILES: C/C=C/C1CCC(COc2ccc(-c3ccc(-c4ccc(OCC)c(F)c4)c(F)c3)cc2F)CO1] |
| 114 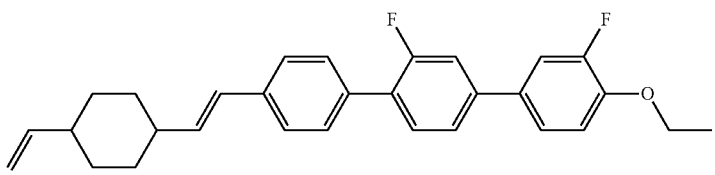 |
| 115 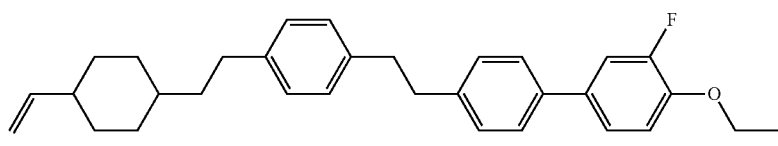 |
| 116 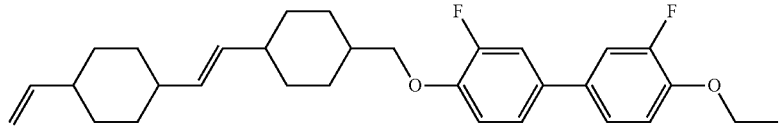 [SMILES: C=CC1CCC(/C=C/C2CCC(COc3ccc(-c4ccc(OCC)c(F)c4)cc3F)CC2)CC1] |

2. Examples of Composition

The disclosure will be described in further detail with reference to examples. Since the examples are typical examples, the disclosure is not limited by the examples. For example, the disclosure includes a mixture of the composition of Usage Example 1 and the composition of Usage Example 2 in addition to the composition of these usage examples. The disclosure includes a mixture prepared by mixing at least two compositions of these usage examples. The compounds in the usage examples are indicated by symbols on the basis of definitions in the following Table 2. In Table 2, the configuration related to 1,4-cyclohexylene is trans. In the usage example, a number in parentheses after a symbol indicates a chemical formula to which the compound belongs. The symbol (—) refers to a liquid crystalline compound different from Compounds (1) to (15). A proportion (percentage) of the liquid crystalline compound is a weight percentage (weight %) on the basis of the weight of the liquid crystal composition containing no additives. Finally, values of physical properties of the compositions are summarized. The physical properties were measured according to the methods described above and measured values (without extrapolation) were shown without change.

TABLE 6

Method of representing compound using symbols
R—(A$_1$)—Z$_1$— . . . — Z$_n$—(A$_n$)—R'

1) Left terminal group R—  symbols

| | |
|---|---|
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |

2) Right terminal group —R'  symbols

| | |
|---|---|
| —C$_n$H$_{2n+1}$ | -n |
| —OC$_n$H$_{2n+1}$ | —On |
| —COOCH$_3$ | —EMe |
| —CH=CH$_2$ | —V |
| —CH=CH—C$_n$H$_{2n+1}$ | —Vn |
| —C$_n$H$_{2n}$—CH=CH$_2$ | —nV |
| —C$_m$H$_{2m}$—CH=CH—C$_n$H$_{2n+1}$ | —mVn |
| —CH=CF$_2$ | —VFF |
| —F | —F |
| —Cl | —CL |
| —OCF$_3$ | —OCF3 |
| —OCF$_2$H | —OCF2H |
| —CF$_3$ | —CF3 |
| —OCH=CH—CF$_3$ | —OVCF3 |
| —C≡N | —C |

3) Bond group —Z$_n$—  symbols

| | |
|---|---|
| —C$_n$H$_{2n}$— | n |
| —COO— | E |
| —CH=CH— | V |
| —CH$_2$O— | 1O |
| —OCH$_2$— | O1 |
| —CF$_2$O— | X |
| —C≡C— | T |

4) Ring structure —A$_n$—  symbols

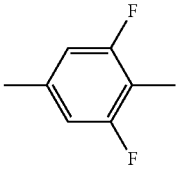   H

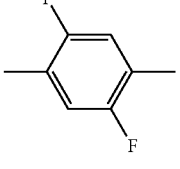   B

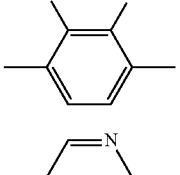   B(F)

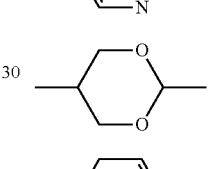   B(2F)

TABLE 6-continued

Method of representing compound using symbols
R—(A$_1$)—Z$_1$— . . . — Z$_n$—(A$_n$)—R'

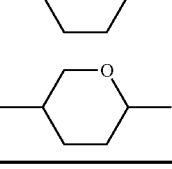   B(F,F)

B(2F,5F)

B(2F,3F)

Py

G ch dh

5) Representative examples

Example 1 V—HBB(F)—O2

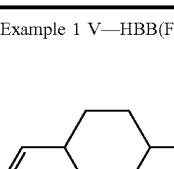

Example 2 3-BB(F,F)XB(F,F)—F

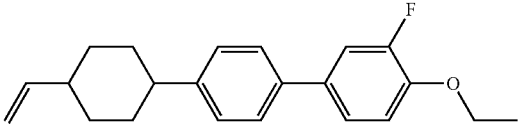

Example 3 3-HB—O2

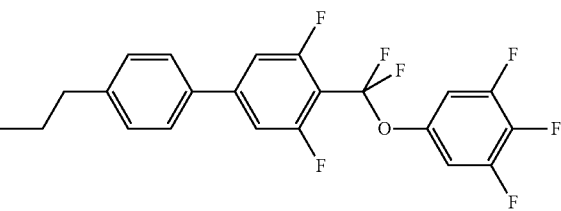 [SMILES: CCCc1ccc(-c2cc(F)c(C(F)(F)Oc3cc(F)c(F)c(F)c3)c(F)c2)cc1]

TABLE 6-continued

Method of representing compound using symbols
R—(A₁)—Z₁— . . . —Zₙ—(Aₙ)—R'

Example 4  3-HBB(2F,3F)—O2

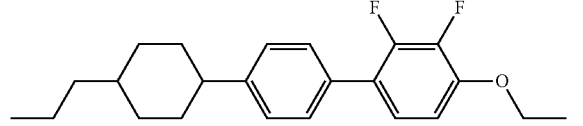 [SMILES: CCCC1CCC(c2ccc(-c3ccc(OCC)c(F)c3F)cc2)CC1]

Usage Example 1

| | | |
|---|---|---|
| V-HBB(F)-O2 | (No. 2) | 10% |
| 3-HB-O2 | (2-5) | 11% |
| 2-BTB-1 | (2-10) | 3% |
| 3-HHB-1 | (3-1) | 6% |
| 3-HHB-O1 | (3-1) | 5% |
| 3-HHB-3 | (3-1) | 10% |
| 3-HHB-F | (13-1) | 4% |
| 2-HHB(F)-F | (13-2) | 7% |
| 3-HHB(F)-F | (13-2) | 7% |
| 5-HHB(F)-F | (13-2) | 7% |
| 3-HHB(F,F)-F | (13-3) | 5% |
| 3-HHEB-F | (13-10) | 4% |
| 5-HHEB-F | (13-10) | 4% |
| 2-HB-C | (15-1) | 5% |
| 3-HB-C | (15-1) | 12% |

NI = 105.9° C.;
η = 22.4 mPa · s;
Δn = 0.112;
Δε = 4.2.

NI=105.9° C.; η=22.4 mPa·s; Δn=0.112; Δε=4.2.

Usage Example 2

| | | |
|---|---|---|
| 1V-HBB(F)-O2 | (No. 5) | 8% |
| 3-HH-4 | (2-1) | 12% |
| 3-HB-O2 | (2-5) | 8% |
| 5-HBB(F)B-2 | (4-5) | 6% |
| 5-HBB(F)B-3 | (4-5) | 5% |
| 3-HB-CL | (12-2) | 10% |
| 3-HHB(F,F)-F | (12-3) | 3% |
| 3-HBB(F,F)-F | (13-24) | 25% |
| 5-HBB(F,F)-F | (13-24) | 23% |

Usage Example 3

| | | |
|---|---|---|
| V2-HBB(F)-O2 | (No. 6) | 9% |
| 3-HB-O2 | (2-5) | 6% |
| 7-HB(F,F)-F | (12-4) | 3% |
| 2-HHB(F)-F | (13-2) | 9% |
| 3-HHB(F)-F | (13-2) | 9% |
| 5-HHB(F)-F | (13-2) | 9% |
| 2-HBB-F | (13-22) | 4% |
| 3-HBB-F | (13-22) | 4% |
| 5-HBB-F | (13-22) | 3% |
| 2-HBB(F)-F | (13-23) | 9% |
| 3-HBB(F)-F | (13-23) | 9% |
| 5-HBB(F)-F | (13-23) | 12% |
| 3-HBB(F,F)-F | (13-24) | 5% |
| 5-HBB(F,F)-F | (13-24) | 9% |

Usage Example 4

| | | |
|---|---|---|
| V2-BB(F)B(F)-O2 | (No. 18) | 7% |
| 3-HH-4 | (2-1) | 12% |
| 3-HH-5 | (2-1) | 4% |
| 1O1-HBBH-5 | (4-1) | 3% |
| 5-HB-CL | (12-2) | 11% |
| 3-HHB-F | (13-1) | 4% |
| 3-HHB-CL | (13-1) | 3% |
| 4-HHB-CL | (13-1) | 4% |
| 3-HHB(F)-F | (13-2) | 8% |
| 4-HHB(F)-F | (13-2) | 9% |
| 5-HHB(F)-F | (13-2) | 9% |
| 7-HHB(F)-F | (13-2) | 8% |
| 5-HBB(F)-F | (13-23) | 4% |
| 3-HHBB(F,F)-F | (14-6) | 2% |
| 4-HHBB(F,F)-F | (14-6) | 3% |
| 5-HHBB(F,F)-F | (14-6) | 3% |
| 3-HH2BB(F,F)-F | (14-15) | 3% |
| 4-HH2BB(F,F)-F | (14-15) | 3% |

Usage Example 5

| | | |
|---|---|---|
| V-dhBB(F)-O2 | (No. 25) | 11% |
| 1O1-HBBH-4 | (4-1) | 4% |
| 1O1-HBBH-5 | (4-1) | 4% |
| 3-HHB(F,F)-F | (13-3) | 9% |
| 3-H2HB(F,F)-F | (13-15) | 8% |
| 4-H2HB(F,F)-F | (13-15) | 8% |
| 5-H2HB(F,F)-F | (13-15) | 8% |
| 3-HBB(F,F)-F | (13-24) | 16% |
| 5-HBB(F,F)-F | (13-24) | 17% |
| 3-H2BB(F,F)-F | (13-27) | 7% |
| 5-HHBB(F,F)-F | (14-6) | 3% |
| 3-HH2BB(F,F)-F | (14-15) | 3% |
| 5-HHEBB-F | (14-17) | 2% |

Usage Example 6

| | | |
|---|---|---|
| V-H1OB(2F)B(F)-O2 | (No. 43) | 8% |
| 5-HBBH-3 | (4-1) | 3% |
| 3-HB(F)BH-3 | (4-2) | 3% |
| 5-HB-F | (12-2) | 12% |
| 6-HB-F | (12-2) | 9% |
| 7-HB-F | (12-2) | 7% |
| 2-HHB-OCF3 | (13-1) | 7% |
| 3-HHB-OCF3 | (13-1) | 7% |
| 4-HHB-OCF3 | (13-1) | 7% |
| 5-HHB-OCF3 | (13-1) | 5% |
| 3-HHB(F,F)-OCF2H | (13-3) | 4% |
| 3-HHB(F,F)-OCF3 | (13-3) | 5% |
| 3-HH2B-OCF3 | (13-4) | 4% |
| 5-HH2B-OCF3 | (13-4) | 4% |
| 3-HH2B(F)-F | (13-5) | 3% |
| 3-HBB(F)-F | (13-23) | 6% |
| 5-HBB(F)-F | (13-23) | 6% |

Usage Example 7

| | | |
|---|---|---|
| V-HBB(F)B(F)-O2 | (No. 59) | 9% |
| 3-HH-4 | (2-1) | 8% |
| 3-HHB-1 | (3-1) | 5% |
| 5-HB-CL | (12-2) | 9% |
| 3-HHB(F,F)-F | (13-3) | 8% |
| 3-HHEB(F,F)-F | (13-12) | 10% |

-continued

| | | |
|---|---|---|
| 4-HHEB(F,F)-F | (13-12) | 3% |
| 5-HHEB(F,F)-F | (13-12) | 3% |
| 3-HBB(F,F)-F | (13-24) | 15% |
| 5-HBB(F,F)-F | (13-24) | 13% |
| 2-HBEB(F,F)-F | (13-39) | 3% |
| 3-HBEB(F,F)-F | (13-39) | 5% |
| 5-HBEB(F,F)-F | (13-39) | 3% |
| 3-HHBB(F,F)-F | (14-6) | 6% |

Usage Example 8

| | | |
|---|---|---|
| V-H2BBB(F)-O2 | (No. 101) | 10% |
| 3-HB-CL | (12-2) | 4% |
| 5-HB-CL | (12-2) | 3% |
| 3-HHB-OCF3 | (13-1) | 5% |
| 3-HHB(F)-F | (13-2) | 5% |
| 5-HHB(F)-F | (13-2) | 5% |
| V-HHB(F)-F | (13-2) | 5% |
| 3-H2HB-OCF3 | (13-13) | 5% |
| 5-H2HB(F,F)-F | (13-15) | 4% |
| 5-H4HB-OCF3 | (13-19) | 15% |
| 3-H4HB(F,F)-CF3 | (13-21) | 8% |
| 5-H4HB(F,F)-CF3 | (13-21) | 10% |
| 5-H4HB(F,F)-F | (13-21) | 7% |
| 2-H2BB(F)-F | (13-26) | 5% |
| 3-H2BB(F)-F | (13-26) | 5% |
| 3-HBEB(F,F)-F | (13-39) | 4% |

Usage Example 9

| | | |
|---|---|---|
| V-HBB(F)-O2 | (No. 2) | 8% |
| 2-HH-3 | (2-1) | 10% |
| 3-HH-5 | (2-1) | 5% |
| 3-HB-O2 | (2-5) | 10% |
| 3-HHB-1 | (3-1) | 8% |
| 3-HHB-O1 | (3-1) | 5% |
| 5-HB-CL | (12-2) | 14% |
| 7-HB(F,F)-F | (12-4) | 3% |
| 2-HHB(F)-F | (13-2) | 7% |
| 3-HHB(F)-F | (13-2) | 7% |
| 5-HHB(F)-F | (13-2) | 7% |
| 3-HHB(F,F)-F | (13-3) | 6% |
| 3-H2HB(F,F)-F | (13-15) | 5% |
| 4-H2HB(F,F)-F | (13-15) | 5% |

NI = 82.2° C.;
η = 18.3 mPa · s;
Δn = 0.085;
Δε = 2.4.

Usage Example 10

| | | |
|---|---|---|
| 1V-HBB(F)-O2 | (No. 5) | 6% |
| V2-HBB(F)-O2 | (No. 6) | 4% |
| 3-HH-4 | (2-1) | 9% |
| 3-HH-5 | (2-1) | 10% |
| 3-HB-O2 | (2-5) | 7% |
| 5-HB-CL | (12-2) | 3% |
| 7-HB(F)-F | (12-3) | 4% |
| 2-HHB(F,F)-F | (13-3) | 4% |
| 3-HHB(F,F)-F | (13-3) | 5% |
| 3-HHEB-F | (13-10) | 8% |
| 5-HHEB-F | (13-10) | 8% |
| 3-HHEB(F,F)-F | (13-12) | 9% |
| 4-HHEB(F,F)-F | (13-12) | 5% |
| 3-GHB(F,F)-F | (13-109) | 5% |
| 4-GHB(F,F)-F | (13-109) | 6% |
| 5-GHB(F,F)-F | (13-109) | 7% |

Usage Example 11

| | | |
|---|---|---|
| V2-BB(F)B(F)-O2 | (No. 18) | 8% |
| 5-HH-VFF | (2-1) | 30% |
| 2-BTB-1 | (2-10) | 6% |
| 3-HHB-1 | (3-1) | 4% |
| VFF-HHB-1 | (3-1) | 8% |
| VFF2-HHB-1 | (3-1) | 11% |
| 3-H2BTB-2 | (3-17) | 5% |
| 3-H2BTB-3 | (3-17) | 4% |
| 3-H2BTB-4 | (3-17) | 4% |
| 3-HB-C | (15-1) | 14% |
| 1V2-BEB(F,F)-C | (15-15) | 6% |

Usage Example 12

| | | |
|---|---|---|
| V-dhBB(F)-O2 | (No. 25) | 9% |
| 3-HH-V | (2-1) | 40% |
| 3-HH-V1 | (2-1) | 5% |
| 3-HHB-1 | (3-1) | 6% |
| V-HHB-1 | (3-1) | 5% |
| V2-BB(F)B-1 | (3-6) | 5% |
| 3-HHEH-5 | (3-13) | 3% |
| 1V2-BB-F | (12-1) | 3% |
| 3-BB(F)B(F,F)-F | (13-69) | 5% |
| 3-HHBB(F,F)-F | (14-6) | 3% |
| 5-HB(F)B(F,F)XB(F,F)-F | (14-41) | 5% |
| 3-BB(F)B(F,F)XB(F,F)-F | (14-47) | 3% |
| 4-BB(F)B(F,F)XB(F,F)-F | (14-47) | 5% |
| 5-BB(F)B(F,F)XB(F,F)-F | (14-47) | 3% |

Usage Example 13

| | | |
|---|---|---|
| V-H1OB(2F)B(F)-O2 | (No. 43) | 7% |
| 3-HH-V | (2-1) | 35% |
| 3-HH-V1 | (2-1) | 7% |
| 3-HHB-1 | (3-1) | 4% |
| V-HHB-1 | (3-1) | 5% |
| V2-BB(F)B-1 | (3-6) | 5% |
| 3-HHEH-5 | (3-13) | 3% |
| 1V2-BB-F | (12-1) | 3% |
| 3-BB(F,F)XB(F,F)-F | (13-97) | 5% |
| 3-GB(F,F)XB(F,F)-F | (13-113) | 5% |
| 3-HHBB(F,F)-F | (14-6) | 3% |
| 3-BB(F)B(F,F)XB(F,F)-F | (14-47) | 3% |
| 4-BB(F)B(F,F)XB(F,F)-F | (14-47) | 7% |
| 5-BB(F)B(F,F)XB(F,F)-F | (14-47) | 3% |
| 3-GB(F)B(F,F)XB(F,F)-F | (14-57) | 5% |

Usage Example 14

| | | |
|---|---|---|
| V-HBB(F)B(F)-O2 | (No. 59) | 6% |
| 3-HH-V | (2-1) | 33% |
| 3-HH-V1 | (2-1) | 5% |
| 3-HHB-1 | (3-1) | 4% |
| V-HHB-1 | (3-1) | 4% |
| V2-BB(F)B-1 | (3-6) | 4% |

-continued

| | | |
|---|---|---|
| 3-HHEH-5 | (3-13) | 4% |
| 1V2-BB-F | (12-1) | 3% |
| 3-BB(F,F)XB(F,F)-F | (13-97) | 5% |
| 3-GB(F,F)XB(F,F)-F | (13-113) | 5% |
| 3-HHBB(F,F)-F | (14-6) | 3% |
| 3-BB(F)B(F,F)XB(F,F)-F | (14-47) | 3% |
| 4-BB(F)B(F,F)XB(F,F)-F | (14-47) | 3% |
| 5-BB(F)B(F,F)XB(F,F)-F | (14-47) | 3% |
| 3-GB(F)B(F,F)XB(F,F)-F | (14-57) | 4% |
| 4-GB(F)B(F,F)XB(F,F)-F | (14-57) | 4% |
| 5-GB(F)B(F,F)XB(F,F)-F | (14-57) | 4% |
| 3-GBB(F,F)XB(F,F)-F | (14-58) | 3% |

Usage Example 15

| | | |
|---|---|---|
| V-H2BBB(F)-O2 | (No. 101) | 11% |
| 3-HH-V | (2-1) | 35% |
| 3-HH-V1 | (2-1) | 6% |
| 3-HHB-1 | (3-1) | 4% |
| V-HHB-1 | (3-1) | 5% |
| V2-BB(F)B-1 | (3-6) | 5% |
| 3-HHEH-5 | (3-13) | 3% |
| 1V2-BB-F | (12-1) | 3% |
| 3-BB(F,F)XB(F,F)-F | (13-97) | 5% |
| 3-HHBB(F,F)-F | (14-6) | 3% |
| 3-HBB(F,F)XB(F,F)-F | (14-38) | 3% |
| 3-BB(F)B(F,F)XB(F,F)-F | (14-47) | 3% |
| 4-BB(F)B(F,F)XB(F,F)-F | (14-47) | 3% |
| 5-BB(F)B(F,F)XB(F,F)-F | (14-47) | 3% |
| 2-dhBB(F,F)XB(F,F)-F | (14-50) | 5% |
| 3-dhBB(F,F)XB(F,F)-F | (14-50) | 3% |

Usage Example 16

| | | |
|---|---|---|
| V-HBB(F)-O2 | (No. 2) | 9% |
| 3-HH-V | (2-1) | 34% |
| 3-HH-V1 | (2-1) | 7% |
| 3-HHB-1 | (3-1) | 4% |
| V-HHB-1 | (3-1) | 3% |
| V2-BB(F)B-1 | (3-6) | 3% |
| 3-HHEH-5 | (3-13) | 3% |
| 1V2-BB-F | (12-1) | 3% |
| 3-BB(F,F)XB(F,F)-F | (13-97) | 3% |
| 3-GB(F,F)XB(F,F)-F | (13-113) | 3% |
| 3-HHBB(F,F)-F | (14-6) | 3% |
| 3-HBBXB(F,F)-F | (14-32) | 3% |
| 3-BB(F)B(F,F)XB(F,F)-F | (14-47) | 3% |
| 4-BB(F)B(F,F)XB(F,F)-F | (14-47) | 3% |
| 5-BB(F)B(F,F)XB(F,F)-F | (14-47) | 3% |
| 3-GB(F)B(F,F)XB(F,F)-F | (14-57) | 3% |
| 3-GBB(F,F)XB(F,F)-F | (14-58) | 4% |
| 4-GBB(F,F)XB(F,F)-F | (14-58) | 3% |
| 5-GBB(F,F)XB(F,F)-F | (14-58) | 3% |

NI = 95.3° C.;
η = 23.0 mPa · s;
Δn = 0.116;
Δε = 7.5.

The liquid crystalline compound of the disclosure has favorable physical properties. The liquid crystal composition including this compound can be widely used for liquid crystal display elements such as personal computers and televisions.

What is claimed is:

1. A compound represented by Formula (1),

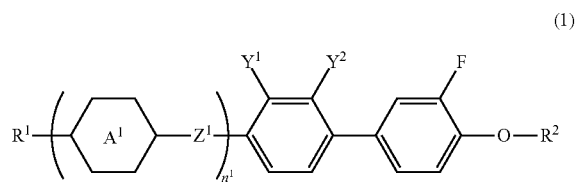

(1)

in Formula (1),
$R^1$ is an alkyl group having 2 to 10 carbon atoms in which one $-CH_2CH_2-$ is substituted with $-CH=CH-$, at least one $-CH_2-$ is optionally substituted with $-O-$, and one hydrogen atom is optionally substituted with fluorine or chlorine;
$R^2$ is an alkyl group having 1 to 8 carbon atoms or an alkenyl group having 2 to 8 carbon atoms;
ring $A^1$ is 1,4-cyclohexylene, tetrahydropyran-2,5-diyl, 1,3-dioxane-2,5-diyl, 1,4-phenylene, or 2-fluoro-1,4-phenylene;
$Y^1$ and $Y^2$ are both hydrogen, or alternatively, one of $Y^1$ and $Y^2$ is hydrogen and the other is fluorine;
$Z^1$ is a single bond, $-CH_2CH_2-$, $-CH_2O-$, $-OCH_2-$, or $-CH=CH-$; and $n^1$ is 1 or 2.

2. The compound according to claim 1 represented by any one of Formulae (1-1) to (1-3),

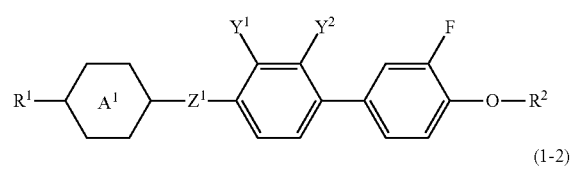

(1-1)

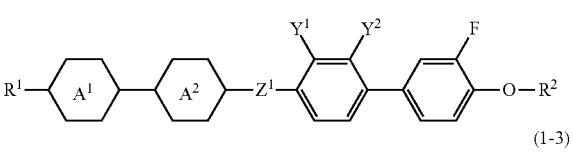

(1-2)

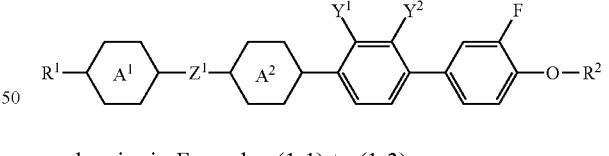

(1-3)

wherein, in Formulae (1-1) to (1-3),
$R^1$ is an alkyl group having 2 to 10 carbon atoms in which one $-CH_2CH_2-$ is substituted with $-CH=CH-$, at least one $-CH_2-$ is optionally substituted with $-O-$, and one hydrogen atom is optionally substituted with fluorine or chlorine;
$R^2$ is an alkyl group having 1 to 8 carbon atoms or an alkenyl group having 2 to 8 carbon atoms;
ring $A^1$ and ring $A^2$ are independently 1,4-cyclohexylene, tetrahydropyran-2,5-diyl, 1,4-phenylene, or 2-fluoro-1,4-phenylene;
$Y^1$ and $Y^2$ are both hydrogen, or alternatively, one of $Y^1$ and $Y^2$ is hydrogen and the other is fluorine; and
$Z^1$ is a single bond, $-CH_2CH_2-$, $-CH_2O-$, $-OCH_2-$, or $-CH=CH-$.

3. The compound according to claim 2, wherein, in Formulae (1-1) to (1-3), $R^1$ is an alkyl group having 2 to 8 carbon atoms in which one —CH$_2$CH$_2$— is substituted with —CH═CH—.

4. The compound according to claim 1 represented by Formula (1-4) or (1-5),

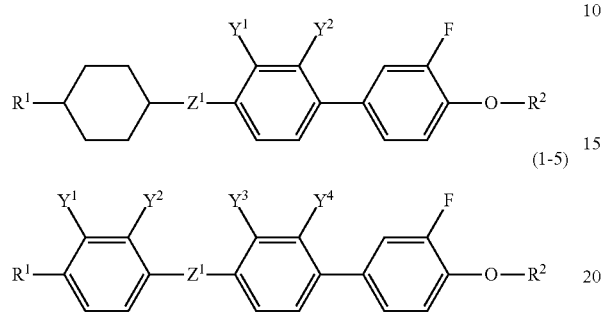

wherein, in Formulae (1-4) and (1-5),
$R^1$ is an alkyl group having 2 to 8 carbon atoms in which one —CH$_2$CH$_2$— is substituted with —CH═CH—;
$R^2$ is an alkyl group having 1 to 6 carbon atoms or an alkenyl group having 2 to 6 carbon atoms;
$Y^1$, $Y^3$, and $Y^4$ are all hydrogen, or alternatively, one of $Y^1$ and $Y^2$ is hydrogen and the other is fluorine, or one of $Y^3$ and $Y^4$ is hydrogen and the other is fluorine; and
$Z^1$ is a single bond, —CH$_2$CH$_2$—, —CH$_2$O—, or —CH═CH—.

5. The compound according to claim 4, wherein, in Formula (1-4) and (1-5), $Z^1$ is a single bond.

6. The compound according to claim 1 represented by Formula (1-6),

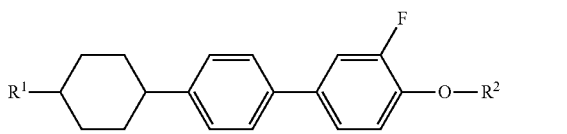

wherein, in Formula (1-6),
$R^1$ is an alkyl group having 2 to 8 carbon atoms in which one —CH$_2$CH$_2$— is substituted with —CH═CH—; and
$R^2$ is an alkyl group having 1 to 6 carbon atoms.

7. A liquid crystal composition comprising at least one compound according to claim 1.

8. The liquid crystal composition according to claim 7, further comprising at least one compound selected from the group consisting of the compounds represented by Formulae (2) to (4),

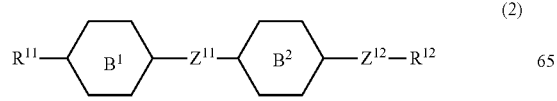

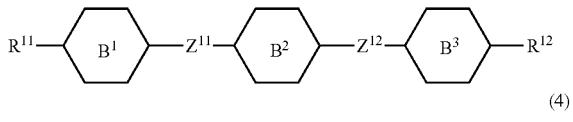

wherein, in Formulae (2) to (4),
$R^{11}$ and $R^{12}$ are independently an alkyl group having 1 to 10 carbon atoms or an alkenyl group having 2 to 10 carbon atoms, and at least one —CH$_2$— is optionally substituted with —O— in the alkyl group and the alkenyl group and in these groups, at least one hydrogen atom is optionally substituted with fluorine;

ring $B^1$, ring $B^2$, ring $B^3$, and ring $B^4$ are independently 1,4-cyclohexylene, 1,4-phenylene, 2-fluoro-1,4-phenylene, 2,5-difluoro-1,4-phenylene, or pyrimidine-2,5-diyl;

$Z^{11}$, and $Z^{13}$ are independently a single bond, —COO—, —CH$_2$CH$_2$—, —CH═CH—, or —C≡C—, here, in Formula (3), when $R^{11}$ has a double bond and the ring $B^3$ is 2-fluoro-1,4-phenylene, then the ring $B^2$ is 1,4-cyclohexylene, 2,5-difluoro-1,4-phenylene, or pyrimidine-2,5-diyl;

in Formula (4), when $R^{11}$ has a double bond and the ring $B^4$ is 2-fluoro-1,4-phenylene, then the ring $B^3$ is 1,4-cyclohexylene, 2,5-difluoro-1,4-phenylene, or pyrimidine-2,5-diyl; and in Formulae (3) and (4), when $R^{12}$ has a double bond and the ring $B^1$ is 2-fluoro-1,4-phenylene, then the ring $B^2$ is 1,4-cyclohexylene, 2,5-difluoro-1,4-phenylene, or pyrimidine-2,5-diyl.

9. The liquid crystal composition according to claim 7, further comprising:
at least one compound selected from the group consisting of the compounds represented by Formulae (12) to (14),

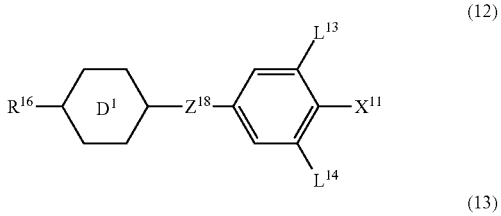

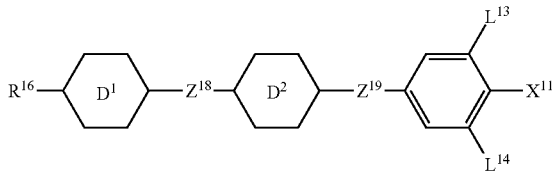

-continued

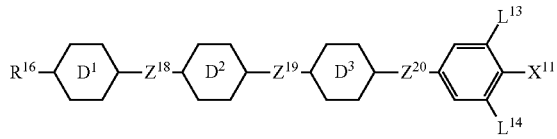
(14)

wherein, in Formulae (12) to (14),
$R^{16}$ is an alkyl group having 1 to 10 carbon atoms or an alkenyl group having 2 to 10 carbon atoms, and at least one —$CH_2$— is optionally substituted with —O— in the alkyl group and the alkenyl group and in these groups, at least one hydrogen atom is optionally substituted with fluorine;
$X^{11}$ is fluorine, chlorine, —$CF_3$, —$CH_2F$, —$OCF_3$, —$OCHF_2$, —$OCF_2CHF_2$, or —$OCF_2CHFCF_3$;
ring $D^1$, ring $D^2$, and ring $D^3$ are independently 1,4-cyclohexylene, or 1,4-phenylene, tetrahydropyran-2,5-diyl, 1,3-dioxane-2,5-diyl, or pyrimidine-2,5-diyl in which at least one hydrogen atom is optionally substituted with fluorine;
$Z^{18}$, $Z^{19}$, and $Z^{20}$ are independently a single bond, —COO—, —$CH_2O$—, —$CF_2O$—, —$OCF_2$—, —$CH_2CH_2$—, —CH=CH—, —C≡C—, or —$(CH_2)_4$—; and
$L^{13}$ and $L^{14}$ are independently hydrogen or fluorine.

10. The liquid crystal composition according to claim 8, further comprising:
at least one compound selected from the group consisting of the compounds represented by Formulae (12) to (14),

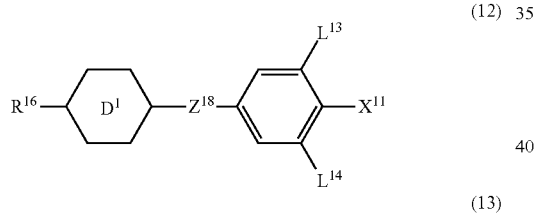
(12)

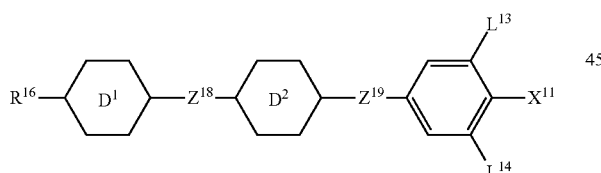
(13)

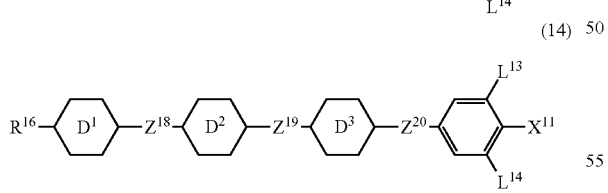
(14)

wherein, in Formulae (12) to (14),
$R^{16}$ is an alkyl group having 1 to 10 carbon atoms or an alkenyl group having 2 to 10 carbon atoms, and at least one —$CH_2$— is optionally substituted with —O— in the alkyl group and the alkenyl group and in these groups, at least one hydrogen atom is optionally substituted with fluorine;
$X^{11}$ is fluorine, chlorine, —$CF_3$, —$CHF_2$, —$CH_2F$, —$OCF_3$, —$OCHF_2$, —$OCF_2CHF_2$, or —$OCF_2CHFCF_3$;

ring $D^1$, ring $D^2$, and ring $D^3$ are independently 1,4-cyclohexylene, or 1,4-phenylene, tetrahydropyran-2,5-diyl, 1,3-dioxane-2,5-diyl, or pyrimidine-2,5-diyl in which at least one hydrogen atom is optionally substituted with fluorine;
$Z^{18}$, $Z^{19}$, and $Z^{20}$ are independently a single bond, —COO—, —$CH_2O$—, —$CF_2O$—, —$OCF_2$—, —$CH_2CH_2$—, —CH=CH—, or —$(CH_2)_4$—; and
$L^{13}$ and $L^{14}$ are independently hydrogen or fluorine.

11. The liquid crystal composition according to claim 7, further comprising at least one compound selected from the group consisting of the compounds represented by Formula (15),

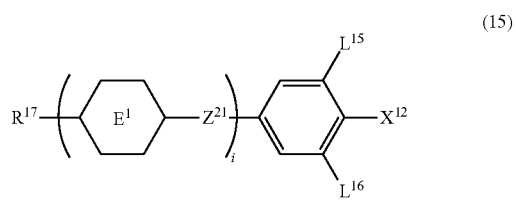
(15)

wherein, in Formula (15),
$R^{17}$ is an alkyl group having 1 to 10 carbon atoms or an alkenyl group having 2 to 10 carbon atoms, and at least one —$CH_2$— is optionally substituted with —O— in the alkyl group and the alkenyl group, and in these groups, at least one hydrogen atom is optionally substituted with fluorine;
$X^{12}$ is —C≡N or —C≡C—C≡N;
ring $E^1$ is 1,4-cyclohexylene or 1,4-phenylene, tetrahydropyran-2,5-diyl, 1,3-dioxane-2,5-diyl, or pyrimidine-2,5-diyl in which at least one hydrogen atom is optionally substituted with fluorine;
$Z^{21}$ is a single bond, —COO—, —$CH_2O$—, —$CF_2O$—, —$OCF_2$—, —$CH_2CH_2$—, or —C≡C—;
$L^{15}$ and $L^{16}$ are independently hydrogen or fluorine; and
i is 1, 2, 3, or 4.

12. The liquid crystal composition according to claim 8, further comprising at least one compound selected from the group consisting of the compounds represented by Formula (15),

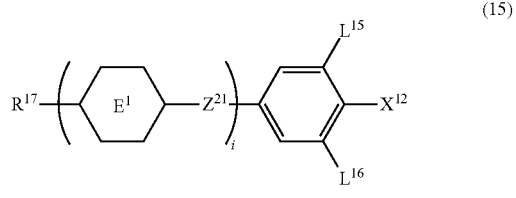
(15)

wherein, in Formula (15),
$R^{17}$ is an alkyl group having 1 to 10 carbon atoms or an alkenyl group having 2 to 10 carbon atoms, and at least one —$CH_2$— is optionally substituted with —O— in the alkyl group and the alkenyl group, and in these groups, at least one hydrogen atom is optionally substituted with fluorine;
$X^{12}$ is —C≡N or —C≡C—C≡N;
ring $E^1$ is 1,4-cyclohexylene or 1,4-phenylene, tetrahydropyran-2,5-diyl, 1,3-dioxane-2,5-diyl, or pyrimidine-2,5-diyl in which at least one hydrogen atom is optionally substituted with fluorine;

$Z^{21}$ is a single bond, —COO—, —CH$_2$O—, —CF$_2$O—, —OCF$_2$—, —CH$_2$CH$_2$—, or —C≡C—;

$L^{15}$ and $L^{16}$ are independently hydrogen or fluorine; and i is 1, 2, 3, or 4.

13. The liquid crystal composition according to claim 9, further comprising at least one compound selected from the group consisting of the compounds represented by Formula (15),

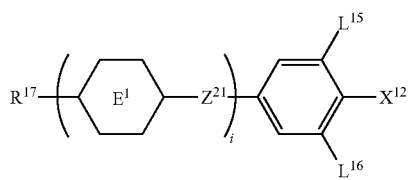
(15)

wherein, in Formula (15), $R^{17}$ is an alkyl group having 1 to 10 carbon atoms or an alkenyl group having 2 to 10 carbon atoms, and at least one —CH$_2$— is optionally substituted with —O— in the alkyl group and the alkenyl group, and in these groups, at least one hydrogen atom is optionally substituted with fluorine;

$X^{12}$ is —C≡N or —C≡C—C≡N;

ring $E^1$ is 1,4-cyclohexylene or 1,4-phenylene, tetrahydropyran-2,5-diyl, 1,3-dioxane-2,5-diyl, or pyrimidine-2,5-diyl in which at least one hydrogen atom is optionally substituted with fluorine;

$Z^{21}$ is a single bond, —COO—, —CH$_2$O—, —CF$_2$O—, —OCF$_2$—, —CH$_2$CH$_2$—, or $L^{15}$ and $L^{16}$ are independently hydrogen or fluorine; and i is 1, 2, 3, or 4.

14. A liquid crystal display element comprising the liquid crystal composition according to claim 7.

15. A liquid crystal display element comprising the liquid crystal composition according to claim 8.

16. A liquid crystal display element comprising the liquid crystal composition according to claim 9.

17. A liquid crystal display element comprising the liquid crystal composition according to claim 11.

18. A liquid crystal composition comprising at least one compound according to claim 2.

19. A liquid crystal composition comprising at least one compound according to claim 3.

20. A liquid crystal composition comprising at least one compound according to claim 4.

* * * * *